US008074415B2

(12) United States Patent  (10) Patent No.: US 8,074,415 B2
Terada et al.  (45) Date of Patent: Dec. 13, 2011

(54) SPACE STRUCTURE

(75) Inventors: Naoki Terada, Tokyo (JP); Takashi Kunishita, Tokyo (JP); Hideki Tachikawa, Tokyo (JP); Tetsuya Matsuda, Tokyo (JP)

(73) Assignee: Uchida Yoko Co., Ltd., Tokyo (JP)

( * ) Notice: Subject to any disclaimer, the term of this patent is extended or adjusted under 35 U.S.C. 154(b) by 0 days.

(21) Appl. No.: 11/793,999

(22) PCT Filed: Apr. 18, 2006

(86) PCT No.: PCT/JP2006/308125
§ 371 (c)(1),
(2), (4) Date: Jan. 9, 2008

(87) PCT Pub. No.: WO2007/055039
PCT Pub. Date: May 18, 2007

(65) Prior Publication Data
US 2008/0110127 A1  May 15, 2008

(30) Foreign Application Priority Data

Nov. 11, 2005 (JP) ................. 2005-328113
Nov. 11, 2005 (JP) ................. 2005-328118
Nov. 11, 2005 (JP) ................. 2005-328123
Nov. 11, 2005 (JP) ................. 2005-328147

(51) Int. Cl.
*E04H 1/00* (2006.01)

(52) U.S. Cl. ........................ 52/239; 52/282.1

(58) Field of Classification Search ............ 52/239, 52/282.2, 282.1, 36.1, 220.1, 284; 403/286, 403/327, 397
See application file for complete search history.

(56) References Cited

U.S. PATENT DOCUMENTS
3,261,625 A * 7/1966 Cripe ................ 403/173
(Continued)

FOREIGN PATENT DOCUMENTS
JP  30-6615  5/1955
(Continued)

OTHER PUBLICATIONS
Notice of Reason for Rejection dated Feb. 17, 2009 for Japan Appl. No. 2005-328123.
(Continued)

*Primary Examiner* — Eileen D Lillis
*Assistant Examiner* — James Ference
(74) *Attorney, Agent, or Firm* — Alston & Bird LLP

(57) ABSTRACT

A space structure is composed of a post member and a horizontal beam member. The post member has a post member groove portion that constitutes a semi-closed space having an opening portion in a cross section of the post member and extends along its axial direction. The horizontal beam member has one or plurality of horizontal beam member groove portions each of which constitutes a semi-closed space having an opening portion in a cross section of the horizontal beam member and extends along its axial direction. Connection of the post member and the horizontal beam member is achieved by connecting connection means that can be moved inside the post member groove portion that the post member has or the horizontal beam member groove portion that the horizontal beam member has to an arbitrary position along its axial direction and can be fixed at that position, with the post member or the horizontal beam member through the opening portion of the post member groove portion or the horizontal beam member groove portion. Thus, it is possible to design a new space structure easily to flexibly adapt it to newly developed information apparatuses or replacement of information apparatuses.

9 Claims, 41 Drawing Sheets

U.S. PATENT DOCUMENTS

| | | | |
|---|---|---|---|
| 3,451,183 A * | 6/1969 | Lespagnol et al. | 52/656.1 |
| 3,486,287 A * | 12/1969 | Guillon | 52/775 |
| 3,706,169 A * | 12/1972 | Rensch | 52/263 |
| 3,837,128 A * | 9/1974 | O'Brien | 52/241 |
| 4,597,231 A * | 7/1986 | Quest | 52/239 |
| RE32,890 E * | 3/1989 | DeFouw et al. | 52/239 |
| 5,003,741 A * | 4/1991 | Yeh | 52/280 |
| 5,155,955 A * | 10/1992 | Ball et al. | 52/126.4 |
| 6,112,472 A * | 9/2000 | Van Dyk et al. | 52/36.1 |
| 6,115,977 A * | 9/2000 | Hornberger et al. | 52/238.1 |
| 6,250,025 B1 * | 6/2001 | Darby | 52/137 |
| 6,250,032 B1 * | 6/2001 | Davis et al. | 52/239 |
| 6,349,516 B1 * | 2/2002 | Powell et al. | 52/239 |
| 6,493,995 B2 * | 12/2002 | McKenzie | 52/36.4 |
| 6,634,824 B2 * | 10/2003 | Liu | 403/217 |
| 6,807,776 B2 * | 10/2004 | Girdwood et al. | 52/36.1 |
| 2001/0004099 A1 | 6/2001 | Onishi | |
| 2001/0025460 A1 * | 10/2001 | Auer et al. | 52/282.2 |
| 2001/0029713 A1 * | 10/2001 | Beck et al. | 52/239 |

FOREIGN PATENT DOCUMENTS

| | | |
|---|---|---|
| JP | 62 1987 225638 | 10/1987 |
| JP | 04 1992 128460 | 4/1992 |
| JP | 06-62013 | 9/1994 |
| JP | 10 1998 102580 | 4/1998 |
| JP | 10-271649 | 10/1998 |
| JP | 2003-138771 | 5/2003 |
| JP | 2004-84231 | 3/2004 |
| JP | 3515754 | 4/2004 |
| JP | 2004-140998 | 5/2004 |
| JP | 2004-293082 | 10/2004 |

OTHER PUBLICATIONS

Notice of Reason for Rejection issued by the Japanese Patent Office; Date of Mailing: Nov. 11, 2008.

The International Search Report for PCT Application No. PCT/JP2006/308125; Filed Apr. 18, 2006; Date of Completion Jun. 13, 2006; Date of Mailing Jun. 27, 2006.

* cited by examiner (a)

(b)

(a)

(b)

(a)

(b)

(a)

(b)

(a)

(b)

(a)

(b)

(c)

(a)

(b)

(a)

(b)

(c)

(a)

(b)

(c)

(a)

(b)

(a)

(b)

(c)

(a)

(b)

(a)

(b)

(c)

SPACE STRUCTURE

TECHNICAL FIELD

The present invention relates to a space structure that defines a space used to exhibit information apparatuses and panels etc. in a place such as an office or an exhibition hall and a connecting device for connecting members in such a space structure.

BACKGROUND ART

Various technologies for constructing a space to facilitate utilization of the space by many people in, for example, an office or the like have been laid open. For example, a technology of constructing a sturdy space structure constructed by connecting poles and frame members without damaging an office or the like has been laid open (see, for example, Japanese Patent Application Laid-open No. 2003-138771). This technology teaches a minimum common space structure constructed by three poles and two frame members, where the frame members form an inner angle of 120 degrees.

To use information apparatuses in a space in an office or the like, it is important to arrange wiring such as power supply lines and signal lines. In connection with this, a technology concerning a tapping apparatus for a power supply line or a signal line that eliminates use of a wiring duct and a tap from wiring has been disclosed (see, for example, Japanese Patent Application Laid-Open Nos. 10-271649 and 2004-140998). This technology teaches to construct a structure using posts and beams, provide a power supply cable and a signal cable in the interior of the posts and beams and provide a connector for allowing connection to an information apparatus at some position on a beam.

Japanese Patent Application Laid-Open No. 2004-293082 also discloses a technology concerning a space structure.

DISCLOSURE OF THE INVENTION

When constructing in an office or an exhibition hall etc., a common space, such as a conference space or an exhibition space, in which information apparatuses are used, the space structure is designed normally taking into consideration specifications, such as the size and the weight, of the information apparatuses etc. used therein. For example, in the case of providing displays as information apparatuses, the size, weight and number of them vary depending on the intended purpose of the space, and the shape of the space structure is designed taking into consideration these conditions.

However, with rapid development of information apparatuses in recent years, new information apparatuses emerge one after another or existing information apparatuses are replaced by updated apparatuses with addition of new functions or downsizing. Consequently, it is necessary to redesign the space structure in which such information apparatuses are used in accordance with changes in the size and shape of the information apparatuses, when, for example, a new information apparatuses are used. However, conventional space structures have been designed taking into consideration specific information apparatuses as described above, and it is very difficult to redesign them.

The present invention has been made in view of the above described problems, and has as an object to make it possible to flexibly adapt a space structure in which information apparatuses are used to newly emerging information apparatuses and replacement of information apparatuses and to design a new space structure easily.

To achieve the above object, according to the present invention, each of post members and transverse beam members that constitute a space structure has a groove that is formed in the interior thereof and extends along the axial direction, and connection means that can be moved to and fixed at an arbitrary position in the aforementioned groove is provided. By constructing a space structure in this way, the configuration of the space structure can be adjusted as desired, whereby it is possible to adapt the space structure to replacement of information apparatuses flexibly.

Specifically, according to the present invention, there is provided a space structure composed of one or plurality of post members extending upwardly from a floor and one or plurality of horizontal beam members extending parallel to the floor, the post members and the horizontal beam members being connected with each other and/or the horizontal beam members being connected with each other, wherein each of said post members has one or plurality of post member groove portions each of which constitutes a semi-closed space having an opening portion in a cross section of the post member and extends along its axial direction all or partly along said post member, each of said horizontal beam members has one or plurality of horizontal beam member groove portions each of which constitutes a semi-closed space having an opening portion in a cross section of the horizontal beam member and extends along its axial direction all or partly along said horizontal beam member, connection of said post member and said horizontal beam member is achieved by connecting connection means that can be moved inside the post member groove portion that the post member has or the horizontal beam member groove portion that the horizontal beam member has to an arbitrary position along its axial direction and can be fixed at that position, with the post member or the horizontal beam member in which said connection means is not present through the opening portion of the post member groove portion or the horizontal beam member groove portion in which said connection means is present, and connection of said horizontal beam members with each other is achieved by connecting connection means that can be moved inside the horizontal beam member groove portion that either one of the horizontal beam members has to an arbitrary position along its axial direction and can be fixed at that position, with the horizontal beam member in which said connection means is not present through the opening portion of the horizontal beam member groove portion in which said connection means is present.

The above described space structure is composed of a combination of the post members and the horizontal beam members. The configuration of the space structure is designed appropriately according to various factors such as the intended purpose of it and the required strength of it. The overall shape of the space structure is not limited to a rectangular shape, but it may have various shapes such as a polygonal shape, a radial shape and a linear shape.

The post member used in the space structure has a post member groove portion. The post member may have a plurality of such post member groove portions. If this is the case, it is preferred that each post member groove portion be provided in each of a plurality of evenly divided sections as seen in cross sections of the post member, along the longitudinal direction of the post member. With this feature, it is possible in the space structure to connect horizontal beam members to the post member regularly utilizing the post member groove portions. This also contributes in making the space structure as a unit and improving the design thereof. The horizontal beam member used in the space structure also has a horizontal beam member groove portion. The horizontal beam member may also have a plurality of horizontal beam member groove portions provided in a similar manner as the post member groove portions.

The post member groove portion and the horizontal beam member groove portion have an opening portion in their cross section. The opening portion extends along the direction in which the corresponding groove portion extend. The opening portion is not needed to extend all along the length of the post member or the horizontal beam member, but it may extends over a part of the length of them.

A characterizing feature of the space structure according to the present invention composed of the above described post members and horizontal beam members resides in a way of connecting these members. In the space structure according to the present invention, members are connected by connection means. The connection of members in this space structure includes two types of connection, namely, connection of a post member and a horizontal beam member and connection of two horizontal beam members. However, this does not eliminate possibility of the use of a member(s) other than the post member and the horizontal beam member in this space structure. Information apparatuses and other members are built in this space structure, so that a space for a specific purpose etc. is realized.

The aforementioned connection means can be moved to an arbitrary position in the post member groove portion or in the horizontal member groove portion, and it can be fixed at that position. Therefore, the position of each of the post members and the horizontal beam members that compose the space structure can be changed with movement of the connection means, whereby modifications to the size and the shape of the space structure can be made upon replacement of information apparatuses according to circumstances. By providing additional connection means in a post member groove portion(s) and/or a horizontal beam member groove portion(s), it is possible to further connect an additional horizontal beam member(s) to the post member(s) and/or an additional horizontal beam member(s) to the horizontal beam member(s). Thus, enlargement of the space structure and/or reinforcement of the space structure can be realized easily.

The opening portion is provided for the purpose of allowing access of a post member or a horizontal beam member to be connected, to connection means that is fixed in the post member groove portion or the horizontal beam member groove portion so that they can be connected to the connection means. Therefore, the shape and the dimension of the opening portion is determined in such a way that at least the above mentioned purpose is sufficiently achieved. The connection means may be set in the interior of the post member groove portion or the horizontal beam member groove portion through this opening portion, or alternatively, it may be placed into their interior through an insertion opening that is separately provided.

According to another aspect of the present invention, there is provided a space structure comprising one or plurality of post members extending upwardly from a floor and having one or plurality of post member groove portions each of which constitutes a semi-closed space having an opening portion in a cross section of the post member and extends along its axial direction all or partly along said post member, one or plurality of horizontal beam members extending parallel to the floor having one or plurality of horizontal beam member groove portions each of which constitutes a semi-closed space having an opening portion in a cross section of the horizontal beam member and extends along its axial direction all or partly along said horizontal beam member, and connection means that can be moved inside the post member groove portion that said post member has or the horizontal beam member groove portion that said horizontal beam member has to an arbitrary position along its axial direction and can be fixed at that position, wherein in the case where said connection means is present in said post member groove portion, it is connected to said horizontal beam member through the opening portion of the post member groove portion, and/or in the case where said connection means is present in said horizontal beam member groove portion, it is connected to said post member or another horizontal beam member that is different from said horizontal beam member through the opening portion of the horizontal beam member groove portion.

According to this space structure, it is possible to design a specific space structure by connecting post members and horizontal beam members in an appropriate combination according to the intended purpose thereof etc., as is the case with the previously described space structure. Connection of the post members and the horizontal beam members is achieved by the connection means that composes the space structure. Thus, the connection means composes the space structure of the present invention in accordance with the number of combinations of a post member and the number of combinations of horizontal beam members.

In this space structure also, with the use of the connection means, the position of each of the post members and the horizontal beam members that compose the space structure can be changed with movement of the connection means in the post member groove portion or in the horizontal member groove portion, whereby modifications to the size and the shape of the space structure can be made upon replacement of information apparatuses according to circumstances. By providing additional connection means in a post member groove portion(s) and/or a horizontal beam member groove portion(s), it is possible to further connect an additional horizontal beam member(s) to the post member(s) and/or an additional horizontal beam member(s) to the horizontal beam member(s). Thus, enlargement of the space structure and/or reinforcement of the space structure can be realized easily.

In the above described space structure, in the case where an optional member other than the aforementioned post members and horizontal beam members is further used as a constituent part of the space structure, when said connection means is present in said post member groove portion, it may be connected to said optional member through the opening portion of the post member groove portion, and/or when said connection means is present in said horizontal beam member groove portion, it may be connected to said optional member through the opening portion of the horizontal beam member groove portion.

The aforementioned optional member may be, for example, a member for fixing or holding an information apparatus or a ornamental part etc. that are built in the space structure and remains in the finished space structure as its constituent part. In mounting the optional member in the space structure, it is possible to use the above described connection means to connect the optional member with a post member or a horizontal beam member. In this way, the connection means is useful in connecting all the members that directly or indirectly compose the space structure.

In particular, in the case where said optional member is a member suspended vertically downwardly and said horizontal beam member has a horizontal beam member groove portion whose opening portion opens vertically downwardly, said connection means may be placed in said horizontal beam member groove portion and connected to the optional member through the opening portion of the horizontal beam member groove portion. Such optional members include, for example, a projector for projecting an image on a personal computer onto a screen, a lighting apparatus, and a display such as a liquid crystal display. Since such optional members are suspended vertically downwardly, the horizontal beam members that support them are required to have a sufficient strength. In the space structure according to the present invention, when, for example, an optional member is replaced by a heavier member, an appropriate design modification can be made, for example, by replacing the horizontal beam member to which the optional member is connected with one having a higher strength and connecting the optional means using the aforementioned connection means.

In the above described space structure, said connection means may have a base member that can move in the interior of said post member groove portion or in the interior of said horizontal beam member groove portion and a biasing member for biasing said base member against a portion of said post member groove portion or said horizontal beam member groove portion in the vicinity of the opening portion thereof, and said base member and said biasing member may be constructed as parts that can be separated from each other.

By moving the base member in the post member groove portion or in the horizontal beam member groove portion, the connection means can be moved to an arbitrary position in that groove portion. In addition, the biasing member can bias the base member against the groove portion in the vicinity of the opening portion, whereby the connection means is fixed at that arbitrary position. In the case where the base member and the biasing member are made as separate members that can be separated from each other, when these member are in a separated state, the base member can be moved smoothly in the groove portion, while when the biasing member is in contact with the base member, a biasing force is exerted on the base member by the biasing member, so that the connection means can be steadily kept in the fixed state.

In the space structure according to the present invention, said connection means may include a first contact portion that is in contact with one end face that constitutes one end of the opening portion of said post member groove portion or said horizontal beam member groove portion, a second contact portion that is in contact with another end face that constitutes the other end opposed to said one end of the opening portion and urging means for urging said first contact portion against said one end face and simultaneously urging said second contact portion against said other end face.

As described before, the opening portion extends along the axial direction of the post member or the horizontal beam member. In other words, it is defined by the above mentioned first end face and the above mentioned second end face that are opposed to each other with the opening portion between. Thus, when the connection means can be moved in the post member groove portion or in the horizontal beam member groove portion, the urging means is adapted not to exercise the urging effect, while when the connection means is in the fixed state, the urging means is adapted to exercise the urging effect.

In the space structures described in the foregoing, said horizontal beam member may have at least two horizontal beam member groove portions with said opening portions opening in two directions, namely vertically upward direction and vertically downward direction, and each of said horizontal beam member groove portions may have opposed walls that are opposed to each other and extending along the axial direction of said horizontal beam member and project beyond said horizontal beam member groove portions, In this case, the height of the opposed walls of the horizontal beam member groove portion that opens vertically upwardly may be designed to be higher than the height of the opposed walls of the horizontal beam member groove portion that opens vertically downwardly.

The space between the opposed walls of the groove portion that opens vertically upwardly may accommodate wirings for information apparatuses etc. that are built in the space structure. On the other hand, the space between the opposed walls of the groove portion that opens vertically downwardly may accommodate a lighting apparatus having a shape extending along the horizontal beam member. When the opposed walls of the groove portion that opens vertically upwardly are made higher than the opposed walls of the groove portion that opens vertically downwardly, a larger number of cables can be accommodated therein without deteriorating appearance.

In the following, a description will be made of a slide connection device that also functions as a connecting portion in the space structure according to the present invention. The slide connection device can be set in a groove surrounded by an inner wall that has a partial opening portion in its cross section, can be moved along the groove to an arbitrary position and can be fixed at that position. The slide connection device is comprised of a base member having a connecting portion to be connected with an external member and biasing member for biasing, in said groove, said base member against a portion of the inner wall in the vicinity of said opening portion. When said base member is urged by said biasing member, said connecting portion is in a state in which it can be connected to said external member through said opening portion.

By moving the base member in the groove, it is possible to move the slide connection device to an arbitrary position in the groove portion. In addition, the biasing member can bias the base member against the inner wall in the vicinity of the opening portion, whereby the slide connection device is fixed at that arbitrary position. Since the base member and the biasing member are made as separate members that can be separated from each other, when these member are in a separated state, the slide connection device can be moved smoothly in the groove, while when the biasing member is in contact with the base member, a biasing force is exerted on the base member by the biasing member, so that the slide connection device can be steadily kept in the fixed state. When the slide connection device is in the fixed state, the connecting portion of the base member is positioned in the opening portion so that it can be connected with an external member. The external member mentioned herein is, for example, the above described post member, horizontal member and optional member.

In the above descried slide connection device, said biasing member may have a biasing portion that generates a biasing force exerted on said base member, a first projecting portion that projects from said biasing portion toward said opening portion and a second projecting portion that projects from said biasing portion toward the bottom of said groove opposite to said opening portion. When said base member is on the first projecting portion side of said biasing portion, the biasing portion may exert a biasing force on the base member, and when said base member is displaced from the biased position on the first projecting portion side, the base member may be in a state in which it can move in the groove with a restriction of movement within the groove being imposed thereon.

With the above described structure, the biasing portion of the biasing member exerts the biasing force in the direction in which the first projecting portion projects. When the biasing member and the base member are separated, namely when the base member is displaced from the biased position on the first projecting portion side, the biasing force of the biasing member is no longer exerted on the base member. In this state, it is possible to adjust the position of the base member from the outside through the biasing member by handling the first projecting portion that projects toward the opening portion. On the other hand, since no biasing force is exerted on the base member in this state, it can be moved relatively freely in the groove. In some cases, there is a risk that the base member can be separated from the biasing member so greatly as to hinder the function of the slide connection device. In view of this, the second projecting portion is provided to restrict the movement of the base member in the groove to prevent the base member from being separated greatly from the biasing member. Especially, when the groove extends vertically, there always is a risk that the base member falls vertically downwardly due to gravitation acting thereon. The second projecting portion is useful in such a case.

In the above described slide connection device, when said base member is on the first projecting portion side of said biasing portion, the biasing portion may be adapted to flex in said groove to a larger extent than when said base member is not on the first projecting portion side, to exert a biasing force on the base member. The way in which the biasing portion exerts the biasing force is not limited to what is described here.

Said first projecting portion may be provided at a position opposite, with respect to the longitudinal direction of said groove, to the position of said second projecting portion with said biasing portion between. By arranging the projecting portions in this way, it is possible to prevent movement of the base member in the groove more reliably when it is displaced from said biased position.

Use of braces have been conventionally known as a technique of reinforcing a space structure. A brace can reinforce a rectangular frame structure when it is attached by its both ends to diagonal corners of the rectangular frame structure. Typically, two braces are used as a pair in such a way that they are set crosswise on adjacent posts or poles. When braces are used, they are attached by their end portions to diagonal corners of a rectangular frame structure. Since they are arranged crosswise, it is necessary, in attaching the braces to the corners of the rectangular frame structure, that the positions at which the braces are attached to the rectangular structure be offset from each other between the front brace and the rear brace. Unless two braces are attached to the posts with a predetermined positional offset therebetween, they are in contact with each other. Then, they will be worn or deformed, and there arises a problem that they cannot exercise their intended function of reinforcing the rectangular frame structure.

Objects to which braces are applied are not limited to pillars of the above mentioned wooden buildings and scaffoldings. For example, in recent years, information apparatuses are replaced relatively rapidly, and a space in an office or the like is sometimes rebuilt using members such as posts and beams according to replacement of information apparatuses. The members used in rebuilding such an office space are required to have not only sufficient strength but also ease of use and excellent design. It is required that assembling of the members that constitute the office space can be easily done by ordinary users, unlike with building of scaffoldings that is done by professionals. Thus, when attaching braces to posts, it is necessary to fixedly attaching two braces used as a pair with an positional offset from each other to prevent them from coming into contact with each other. Accordingly, development of a brace structure free from this problem or development of a connection member that eliminates the problem of the brace structure have been desired.

The present invention has been made in view of the above described problem and has as an object to eliminate troublesomeness in determining the fixing position of braces necessitated by the need of providing a predetermined offset between the positions at which the braces are attached on the posts in order to prevent contact of the braces and to provide a brace structure in which the braces can exercise their intended function of reinforcing a rectangular frame structure and a connection member with which the above described problem of braces can be eliminated.

To achieve the above object, according to the present invention, there is provided a brace structure provided between posts, comprising a pair of braces arranged crosswise, brace connection members connected to both ends of each of said braces, brace receiving members connected to said connection members and fixedly attached to said posts. Each of said braces has mating portions, each having a spiral thread, at both ends, each of said brace receiving members has a base plate fixedly attached to said post and hooks provided on a top surface of said base plate, and each of said brace connection members has an engagement portion to be hooked on one of the hooks of said brace member and a length adjusting portion connected to one of the mating portions of one of said braces that can adjust the axial length of said brace by its connection length with the mating portion. Said hooks are arranged on the top surface of said base plate side by side with a predetermined distance therebetween and oriented in the same direction.

According to the brace structure of the present invention, by connecting a brace with one of the hooks arranged on a brace receiving member fixedly attached on a post with a predetermined distance via a brace connection member, positioning of the brace on the post is successfully achieved. Consequently, deterioration of the braces due to wearing or deformation caused by mutual contact of the braces is prevented, and the braces can sufficiently exercise the function of reinforcing a rectangular frame structure. Here, the post refers to one that composes a rectangular frame structure.

According to the present invention, there is provided a brace receiving member for mounting a brace on a post, comprising a base plate to be fixedly attached on said post and hooks provided on a top surface of said base plate. The hooks are arranged on the top surface of said base plate with a predetermined distance therebetween and oriented in the same direction.

As per the above, in the brace receiving member according to the present invention, hooks to be connected with a brace are arranged on the top surface of a base plate with a predetermined distance therebetween and oriented in the same direction. Therefore, in the case where said brace receiving members are disposed at four corners of a rectangular frame structure respectively, the braces can be disposed on the posts that composes the rectangular frame structure easily by using front hooks for diagonally arranged brace receiving members and rear hooks for other diagonally arranged brace receiving members. According to the brace receiving member of the present invention, it is possible to attach braces to posts easily, and positioning of the braces is achieved successfully. Consequently sufficient strength of the structure is ensured irrespective of the skill of the person who builds the structure. It is preferred that the brace receiving member according to the present invention have a symmetrical configuration. If the brace receiving member is symmetrical, the same members can be used on the right and left posts without any distinction, and the members can be used as both the upper member and the lower member on the posts only by changing their orientations when they are fixed. This makes handling of them easier.

There is no particular limitation on the shape and the material of the base plate. Any material that has a sufficient strength that does not diminish the reinforcing effect of the brace may be used. Furthermore, there is no particular limitation on the material of the hooks, and any material having a sufficient strength may be used as with the base plate. The hook may be shaped, for example, as follows. The hook may have a base portion provided on the base plate, a curved portion that extends from the base portion to an end portion in a curved manner. In addition, an open portion extending toward the curved portion may be provided between the base portion and the end portion. The hook can hook, for example, an annular member when said end portion is made to pass through the hollow portion of the annular member. The end portion of the hook may be inclined relative to the base plate by an angle of 10 to 20 degrees, whereby dislocation of the member hooked by the hook can be prevented. The base plate and the hooks may be formed integrally, or alternatively, they may be formed separately and fastened together using a fastening member. A predetermined number of holes may be provided on the base plate so that it may fixedly attached on a post using bolts or other fastening members that are made to pass through said holes. The predetermined number of holes may be designed as appropriate so that it can fix the brace reliably.

The hooks are arranged on the top surface of the base plate with a predetermined distance therebetween and oriented in the same direction. This means that the hooks are disposed on the base plate in such a way that the end portions of the hooks are directed to the same direction and there is a space between the hooks. Said predetermined distance is such a distance that prevents contact of the brace attached to the hook with another brace. Such a distance can be determined according to the diameter of the brace. Specifically, contact of the braces can be prevented by making the aforementioned predetermined distance larger than the diameter of the brace.

The brace receiving member according to the present invention may have tongues provided on the bottom surface of said base plate at an longitudinal end portion of said base plate.

If for example, recesses corresponding to said tongues are formed with a predetermined distance therebetween along the longitudinal direction on the post on which the brace receiving member is to be attached, the position at which the brace receiving member on the post can be determined easily, namely positioning is achieved easily. Therefore, it is preferred that recesses be formed horizontally on the surface of the post, and said tongues corresponding to the recesses be provided in a direction substantially perpendicular to the direction of the end of said hooks. Alternatively, positioning of the brace receiving member on the post can be facilitated by providing grooves in the vertical direction along the post.

In addition, the brace receiving member according to the present invention may have a U-shaped open portion provided in the longitudinally upper portion of said base plate.

By providing the U-shaped open portion in the longitudinally upper portion of said base plate, the weight of the brace receiving member can be reduced. In addition, by providing the U-shaped open portion on the side toward which the ends of the aforementioned hooks are directed, the orientation of the brace receiving member can be easily determined upon fixedly attaching it on the post. In addition, this improves the design of the brace receiving member.

Furthermore, according to the present invention, there is provided a brace connection member for connecting a brace receiving member described above and a brace. The brace has, at its both ends, mating portions each of which is provided with a spiral thread. Said brace connection member has an engagement portion to be hooked on one of the hooks of said brace receiving member and a length adjusting portion, connected to one of the mating portions of said brace, that can adjust the axial length of said brace by its connection length with the mating portion.

The above described brace connection members are attached to both ends of the brace, the connection members are hooked on the hooks of said brace receiving members, and the axial length of the brace is adjusted by the length adjusting portion. Thus, the rectangular frame structure in which the brace is set can be reinforced.

The engagement portion may have any shape that can be hooked on a hook on the brace receiving member. The simplest shape thereof is, for example, a ring-like shape. Alternatively, it may be composed of a pair of plate members and a rod member attached between the plate members perpendicularly thereto. In this case, said brace and said brace receiving member can be connected by hooking said rod member by said hook. There is no particular limitation on the material of the brace connection member, but any material that has a sufficient strength that does not diminish the reinforcing effect of the brace may be used.

Said adjusting portion is used for adjusting the length of the brace. The length of the brace including the brace connection members is adjusted to be larger than the distance between the diagonal hooks in advance, and after hooking the engagement portions of the brace connection members coupled to both ends of the brace on the hooks, said length adjusting potion is operated to shorten the length of the brace to an appropriate length that is suitable for reinforcement of the rectangular frame structure. Length adjustment by said length adjusting portion may be done by rotating said brace and said brace connection member relative to each other.

In the brace connection member according to the present invention, the spiral thread of said mating portion may be formed on the outer side surface of said brace, and the length adjusting portion of said brace connection member may be a bore into which said mating portion is to be inserted, and a spiral thread complementary to the spiral thread of said mating portion may be formed on the inner surface of said bore.

With the above described structure, it is possible to adjust the length of the brace by rotating said brace and said brace connection member relative to each other. The present invention is not limited to the above described structure in which spiral threads are formed on the outer side surfaces of both end portions of the brace and the adjusting portion of said brace connection member has a configuration complementary to them, but their features may be reversed. Specifically, bores extending along the axial direction may be provided at both ends of the brace, and a spiral thread may be formed on the inner surface of each bore, and the adjusting portion of said brace connection member may have a rod-like shape complementary to the bore, and a spiral thread may be formed on the outer surface of the rod-like adjusting portion. In connection with the above, it is preferred that the spiral threads of the mating portions at both ends of said brace have spiral directions opposite to each other.

According to the present invention it is possible to fixedly attach braces on posts appropriately while preventing them from coming into contact with each other. Thus, the braces can successfully exercise their intended function of reinforcing the rectangular frame structure.

It is sometimes required to attach a flat object such as a glass panel to a space structure. In connection with this, in the case where a new space structure is to be built in a space such as an office, it is required that the fixed position of a wall or a partition can be changed as desired. For example, in the case where posts are used as structural members and flat plate members are fixed on the posts to construct a space structure, if the fixed positions of the flat plates can be changed without changing the fixed positions of the posts to build a new space structure, it is possible to save the effort of changing the position of the posts, and the degree of freedom of design of the space is increased.

In the case where a space structure is rebuilt to adapt it to updated information apparatuses, one may wish to change the fixed position of a flat panel that functions as a wall or a partition according to some later situation. There may be various such later situations, but in any event, even if a wall is to be moved only by several centimeters, it may be necessary to move a post(s) with the wall in some cases, if members having an adjusting function are not used. Such a situation will be very troublesome.

The present invention has been made in view of the above described problem and has as an object to provide a mounting apparatus for a flat panel member of a space structure with which the fixing position can be changed freely.

To achieve the above object, according to the present invention, there is provided a flat plate fixing device for fixing a flat plate on a post, comprising a flat plate holding member for holding said flat plate by two plates, a bracket fixed on said post for supporting said flat plate via said flat plate holding member, an adjuster connected between said flat plate holding member and said bracket for adjusting the distance between said post and said flat plate. Said flat plate holding member includes a front plate disposed on the front surface of said flat plate and the back plate disposed on the back surface of said flat plate, and said back plate is provided with adjusting means for adjusting the fixing position of said flat plate.

According to the flat plate fixing device according to the present invention, the fixing position of a flat plate fixed on a post can be freely changed using said adjusting means and said adjuster. In addition, since said adjusting means, said adjuster and said bracket are separate members, it is possible to change the fixing position of said flat plate freely without changing the position of the bracket fixed on the post. The shape of the post is not limited to a specific shape, but when the cross sectional shape thereof is substantially rectangular, it is possible to change the fixing position of the flat plate with reference to a plane of the post.

The flat plate according to the present invention is a member that composes a space structure and functions as a wall or a partition. There is no particular limitation on the material of the flat plate, and the present invention is suitably applied also to a glass panel that needs to be handled particularly carefully.

The flat plate holding member according to the present invention is composed of two plates, namely a front plate disposed on the front surface of said flat plate and a back plate disposed on the back surface of said flat plate. For example, said two plates are disposed and fixed on an upper corner of said flat plate in such a way as to hold the flat plate the plates on both the surfaces thereof. Holes through which a fastening member(s) such as a screw(s) is made to pass are provided on said two plates, and a hole(s) corresponding to them is also provided on the flat plate, whereby it is possible to fasten the flat plate holding members and the flat plate together.

The back plate that composes said flat plate holding member has adjusting means for adjusting the fixing position of the flat plate. With the adjusting means, it is possible to change the fixing position of the flat plate freely. In the flat plate fixing device according to the present invention, the flat plate is supported by the bracket fixedly attached to the post. Since the bracket and the flat plate holding member are separate members, it is possible to change the fixing position of the flat plate while leaving the bracket in the fixed state on the post, in other words without changing the fixing position of the bracket.

The adjusting means is used for adjusting the connection position of the adjuster connected to said back plate. By changing the connection position with the adjuster, the position of the flat plate can be changed in a direction perpendicular to the axis of the adjuster. Therefore, in the case where the direction of axis of the adjuster is parallel to the lateral side surfaces of the post to which the bracket is attached, the flat plate held by the back plate and the front plate can be moved in the direction parallel to the front side surface of the post, that is, in the lateral direction. The adjusting means may be adapted to fix the position stepwise with a reference being set or designed to be slidable to allow fixing at an arbitrary position. For example, in the case where the fixing position of the flat plate is to be adjusted stepwise, holes formed on the back plate at predetermined intervals may serve as the adjusting means. In this case, it is possible to fix the flat plate by connecting it with the adjuster with a fastening member such as a bolt using a hole thus provided on the back plate. On the other hand, in the case where the adjusting means is to be designed slidable to allow fixing at an arbitrary position, a linear slot extending along the longitudinal direction of the back plate may be provided as the adjusting means so that a fastening member such as a bolt is inserted through that slot and said back plate can be slid via said fastening member. Thus, it is possible to fix the glass panel at an arbitrary position.

The bracket is a member that supports said flat plate via said holding member, and has, for example, the structure described below. It may be provided with a fixed portion fixed on a post, a connection portion to be connected with another member, and an arm portion provided between said fixed portion and said connection portion. The arm portion may have a right-angled portion, or the arm portion and the connection portion may be disposed to form a right angle, whereby said flat plate can be fixed in such a way as to extend in the direction perpendicular to the surface of said post on which said bracket is fixed. In other words, when said bracket is fixed on a lateral side surface of said post, the flat plate can be fixed in front of said post. The arm portion and the connection portion of the bracket may form a T-shape, the connection portion provided at the end of the arm portion may be horizontally symmetrical with respect to the axis of the arm portion, and the fixed portion adjacent to the arm portion may also be vertically symmetrical with respect to the axis of the arm portion. With these features, it is possible to use the bracket without paying attention to its orientation when attaching it to the post.

A hole through which a fastening member such as a bolt is to be inserted may be provided on the fixed portion of said bracket, whereby the bracket can be fixed on said post. A groove(s) extending in the vertical direction and/or the horizontal direction may be provided on said post, and in addition a projecting portion(s) corresponding to said grooves may be provided on the surface of said fixed portion that is to be in contact with the post. This facilitate positioning of the bracket on the post.

The connection portion of the bracket may have a cylindrical shape, and a hole may be provided on the center axis of the cylinder. A fastening member such as a bolt may be inserted into the hole of the cylinder so that the end of the fastening member is fastened to said flat plate holding member with an adjuster between, whereby the flat plate can be fixed. The above described adjusting means of the flat plate holding member allows to change the fixing position of the connection portion of said bracket and said flat plate member relatively. Consequently, the fixing position of the flat plate member can be changed.

The adjuster is connected between said flat plate holding member and said bracket. By changing the axial length of the adjuster, it is possible to change the position of the flat plate without changing the fixed state of said bracket on said post. The adjuster itself may be provided with a length adjusting mechanism that can change the axial length of the adjuster. Alternatively, a plurality of adjusters having different axial lengths may be prepared, whereby the distance between said post to said flat plate can be adjusted by a simple structure. There is no particular limitation on the shape of the adjuster, but for example in the case that the connection portion of said bracket is cylindrical as described above, it is preferred that the adjuster have a similar shape. In the case where said bracket and said flat plate holding member are fixedly connected using a fastening member such as a bolt, a hole through which said fastening member is to be inserted is provided also on the center axis of said adjuster.

A projection may be provided on the surface of said adjuster. A recess complementary to the projection of said adjuster may be provided on the connection portion of said bracket, which facilitates positioning in connecting the bracket and the adjuster. Alternatively, a recess may be provided on the surface of the adjuster instead of the projection, and a projection may be provided on the connection portion of the bracket.

In the present invention, said bracket may be fixed on a lateral side surface of said post, said flat panel supported by said bracket may be disposed substantially parallel to the front side surface of said post, and said adjusting means may achieve a first fixing position of said flat plate in which a lateral edge of said flat plate is located in front of said post and a second fixing position of said flat plate in which the lateral edge of said flat plate is located in the side of said post.

As described above, the flat plate holding member according to the present invention has the adjusting means that can change the fixing position at least between two positions, so that it can change the position of the flat plate without changing the position of the bracket fixed on said post. In the present invention, since the bracket is fixed on a lateral side surface of the post and the flat plate is disposed substantially parallel to the front side surface of the post, it is possible to move the flat plate in a lateral direction by changing the position using the adjusting means. To make it possible to fix the bracket on the lateral side surface of the post and arrange the flat plate substantially parallel to the front surface of the post, the arm portion may have a right-angled portion, or the arm portion and the connection portion may be disposed to form a right angle.

Fixation of the flat plate in said first fixing position will be achieved by making the distance from one end of said back plate to the position at which said adjuster is connected thereto equal to the distance from the center axis of said post to the center axis of said adjuster. By aligning the lateral edge of said flat plate and the lateral edge of said holding member, and arranging the position at which the back plate is connected with the adjuster in the above described manner, it is possible to realize the first fixing position in fixing the flat plate.

Fixation of the flat plate in said second fixing position will be achieved by making the distance from one end of said back plate to the position at which said adjuster is connected thereto shorter than the distance from the center axis of said post to the center axis of said adjuster. More specifically, by making the distance from one end of said back plate to the position at which said adjuster is connected thereto shorter than the distance from the center axis of said post to the center axis of said adjuster by a length at least equal to the width of the post, it is possible to realize the second fixing position in fixing the flat plate.

In the present invention, one said adjuster may be selected from a multiple types of adjusters having different axial lengths according to the fixing position that said adjusting means assumes.

While said adjusting means makes displacement in a direction perpendicular to the surface of the flat plate possible, said adjuster makes displacement in the direction of the surface of the flat plate. Therefore, by using said adjusting means and said adjuster in combination, it is possible to displace the flat plate in the frontward/backward direction and the left/right direction.

For example, fixation of the flat plate in said first fixing position will be achieved by making the axial length of the adjuster longer than the distance from the contact surface of said back plate with the adjuster to the contact surface of said bracket with the adjuster. Fixation of the flat plate in said second fixing position will be achieved by making the axial length of the adjuster shorter than the distance from the contact surface of said back plate with the adjuster to the contact surface of said bracket with the adjuster. In this way, by preparing an adjuster having a predetermined axial length that is suitable for the fixing position that the adjusting means of the above described holding member assumes, it is possible to change the fixing position of the flat plate without replacing the bracket.

In the present invention, said adjusting means may be a plurality of through holes provided on a horizontal center axis of said back plate.

By using the through holes as the adjusting means and fixing the back plate with the adjuster using a fastening member such as a bolt, it is possible to fix the flat plate in accordance with the position of a through hole. Fixation of the flat plate in said first fixing position will be achieved by making the distance from one end of said back plate to the position at which said adjuster is connected thereto equal to the distance from the center axis of said post to the center axis of said adjuster, forming said through hole at this position, and achieving fixation using said fastening member. Fixation of the flat plate in said second fixing position will be achieved by making the distance from one end of said back plate to the position at which said adjuster is connected thereto shorter than the distance from the center axis of said post to the center axis of said adjuster, forming said through hole at this position, and achieving fixation using said fastening member.

In the present invention, a predetermined number of projections having a substantially rectangular cross section that are made to pass through said flat plate to support it may be provided on the surface of said back plate that is in contact with said flat plate.

As described above, said back plate is connected with said adjuster, the weight of the flat plate is transmitted to the back plate, and it is eventually supported by the bracket via the adjuster. With the structure in which a predetermined number of projections that are made to pass through the flat plate are provided on the back plate and the flat plate is held between the back plate and said front plate, the load on the back plate can be partly relieved.

In the present invention, lateral end portions of said flat plate holding member may have shapes different from each other.

With this feature, one can easily see the orientation of said flat plate holding member. For example, in the case where said flat plate holding member has a generally rectangular shape, one end thereof may be formed as a semi-circular end, whereby one can easily see the orientation of said flat plate holding member.

According to the flat plate fixing device according to the present invention, it is possible to freely change the fixing position of a flat plate, among members composing a space structure, that functions as a wall or partition.

THE BEST MODE FOR CARRYING OUT THE INVENTION

Figure 1:
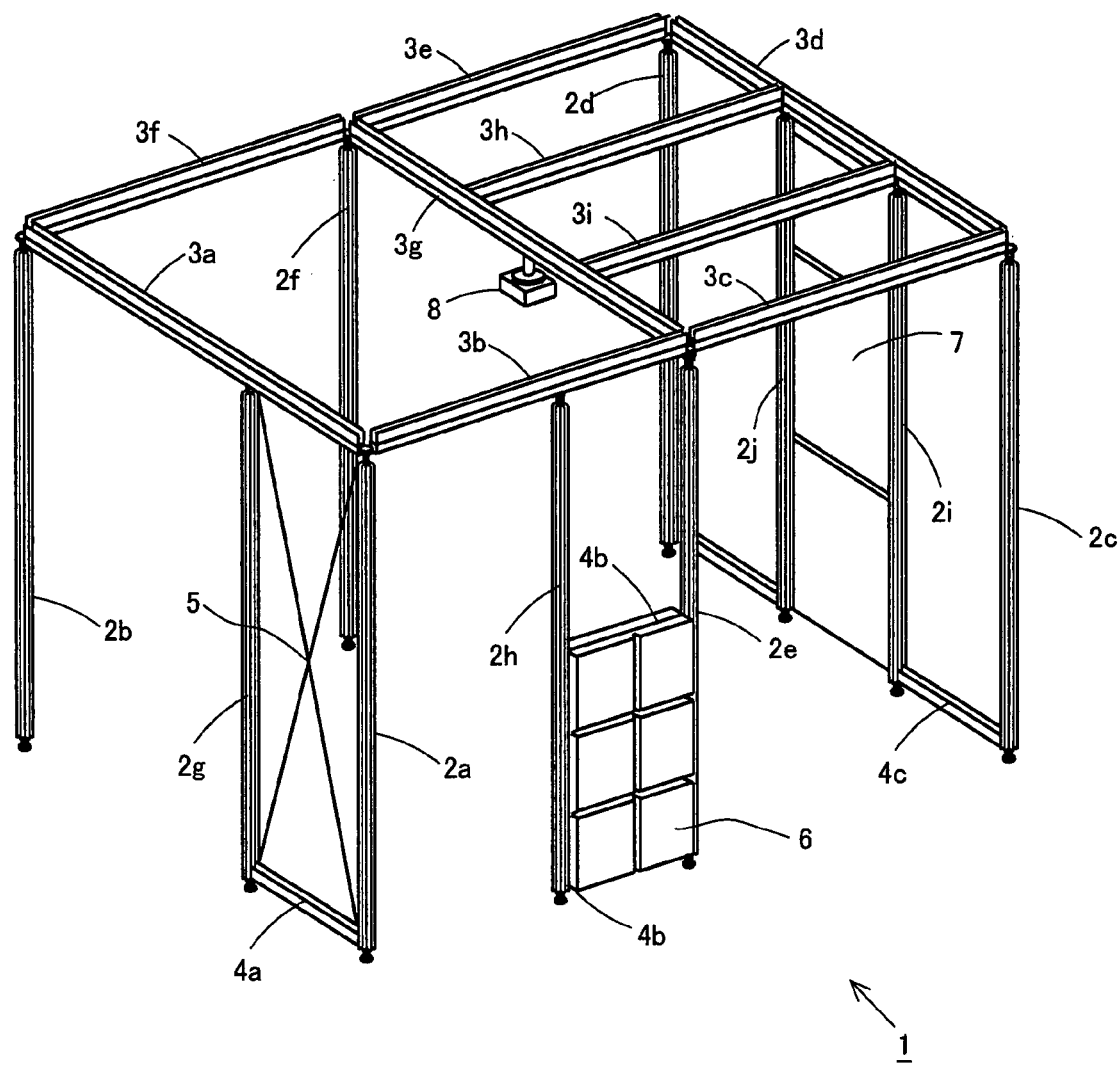
FIG. 1 schematically illustrates the configuration of a space structure according to an embodiment of the present invention.

In the following, embodiments of the space structure according to the present invention will be described with reference to the drawings. FIG. 1 schematically shows the overall configuration of a space structure 1. The space structure 1 is mainly constructed by a plurality of post members or poles 2a to 2j (which will also be collectively referred to as poles 2 hereinafter) and a plurality of transverse beam members or beams 3a to 3i (which will also be collectively referred to as beams 3 hereinafter) and short beams 4a to 4c (which will also be collectively referred to as short beams 4 hereinafter). The poles 2 extend vertically upwardly from the floor and support the space structure 1. The beams 3 and short beams 4 extend parallel to the floor and connect the poles 2 or beams 3.

More specifically, the space structure 1 illustrated in FIG. 1 has a rectangular shape and has six poles 2a to 2f that are provided at its four corners and near the centers of the longer sides. The top portions of these poles 2a to 2f are connected by seven beams 3a to 3g. In addition, pole 2g is provided at a position opposed to the frontmost pole 2a in FIG. 1, and braces 5 are attached between pole 2a and pole 2g. This pole 2g is connected to beam 3a. The bottom portions of pole 2a and pole 2g are connected by a short beam 4a that extends parallel to the floor. The above mentioned short beam 4a, pole 2a, pole 2g, beam 3 and braces 5 are intended to enhance the strength of the space structure 1.

Pole 2h is provided at a position opposed to pole 2e. This pole 2h is connected to beam 3b. Two short beams 4b are attached between pole 2e and pole 2h, and a rack 6 is provided in a space defined by short beams 4b and poles 2e and 2h. Between pole 2c and pole 2d are provided two poles 2i and 2j, which are connected to beam 3d. The bottom portions of poles 2c, 2i, 2j and 2d are connected by short beams 4c. A screen 7 is provided between pole 2i and pole 2j. The screen 7 serves as a projection screen for a projector 8 that is suspended from beam 3g. In view of the load applied on beam 3g due to the weight of the projector 8, beams 3h and 3i are provided between beam 3g and beam 3d to add strength. Signals for the projector 8 are supplied by a computer placed on the rack 6.

As described above, the space structure 1 is constructed by using poles, beams and short beams in an appropriate combination in accordance with the intended purpose thereof, and information apparatuses such as the computer and the projector 8 are set therein. In other words, the space structure 1 according to the present invention is not limited to one illustrated in FIG. 1 but may be designed in various ways in accordance with intended purposes or uses thereof. In the following, the structure of the pole, beam and short beam and how they are connected will be described in detail.

Figure 2:
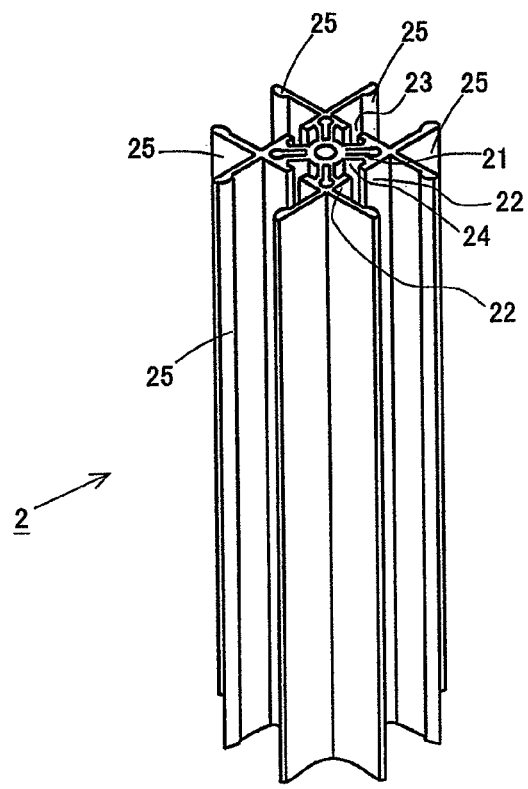
FIG. 2 is an external view of a pole that composes the space structure according to the embodiment of the present invention.
Figure 3:
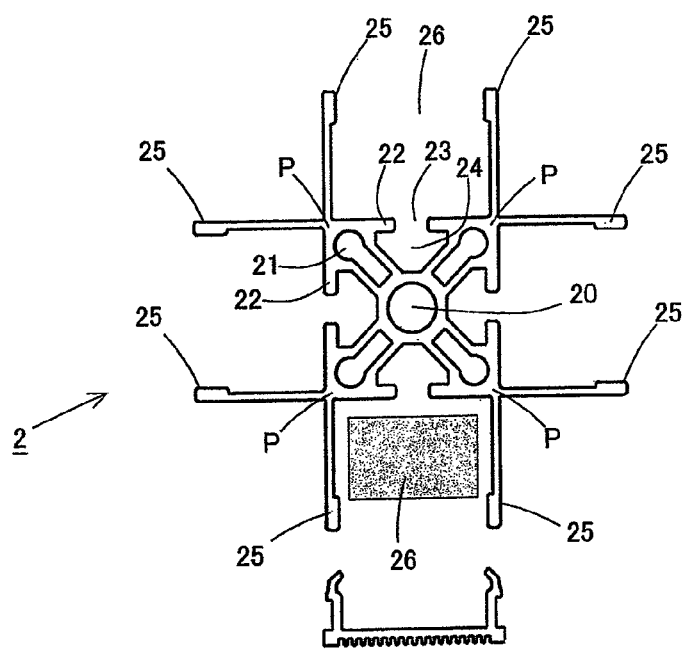
FIG. 3 is a cross sectional view of the pole shown in FIG. 2.

First, a description will be made of a pole 2 with reference to FIGS. 2 and 3. FIG. 2 is a perspective view of the pole 2, and FIG. 3 is a cross sectional view of the pole 2. The cross sectional shape of the pole 2 has rotational symmetry of order 4. Four partition walls 21 extend radially from the center portion 20 to form the apexes P of the square cross section of the pole 2. Walls 22 extend from each apex P toward the adjacent apexes P. A wall 22 extending from one apex P and a wall 22 extending from the adjacent apex P reach near the center of these apexes P but do not comes in contact with each other. Thus, an opening portion 23 is formed between the opposed walls 22, 22 (which will be hereinafter referred to as a pair of walls 22). In addition, a groove portion 24 is formed by a pair of walls 22, partition walls 21 and the center portion 20. The opening portion 23 and the groove portion 24 extend in the axial direction of the pole 2 all along its length.

In addition, extending from each apex P in the cross section of the pole 2 outwardly of the pole 2 are two external walls 25 that are respectively perpendicular to the two walls 22 extending from that apex P. Thus, an external wall 25 extending from one apex and an external wall 25 extending from another apex P adjacent thereto are opposed to each other. These opposed external walls 25 and the pair of walls 22 that are connected thereto form a groove portion for wiring 26 or a semi-closed space on the surface of the pole 2. The groove portion for wiring 26 can accommodate electric power cables and signal cables for information apparatuses used in the space structure 1. Since cables accommodated in the groove portions for wiring 26 might deteriorate the appearance, a wiring cover shown in FIG. 3 may be provided to cover the groove portions for wiring 26.

Figure 4:
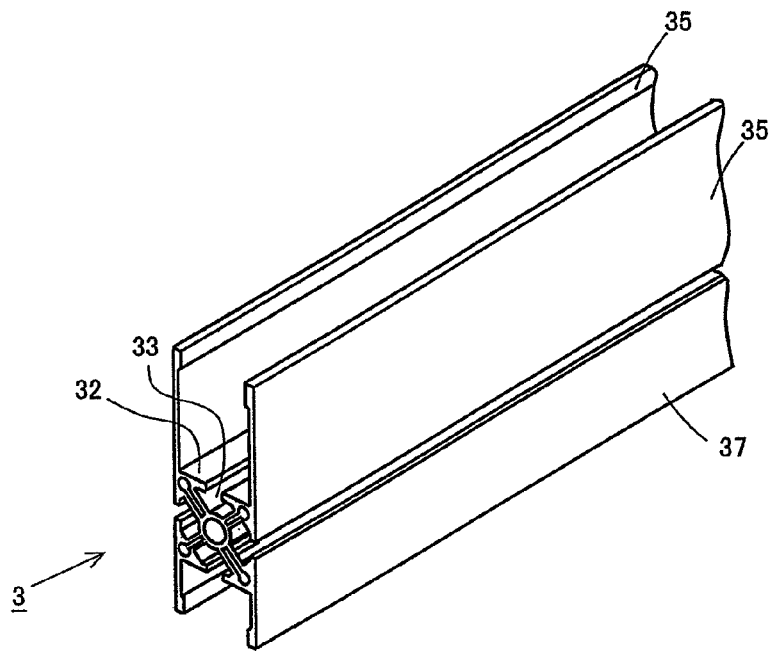
FIG. 4 is an external view of a beam that composes the space structure according to the embodiment of the present invention.
Figure 5:
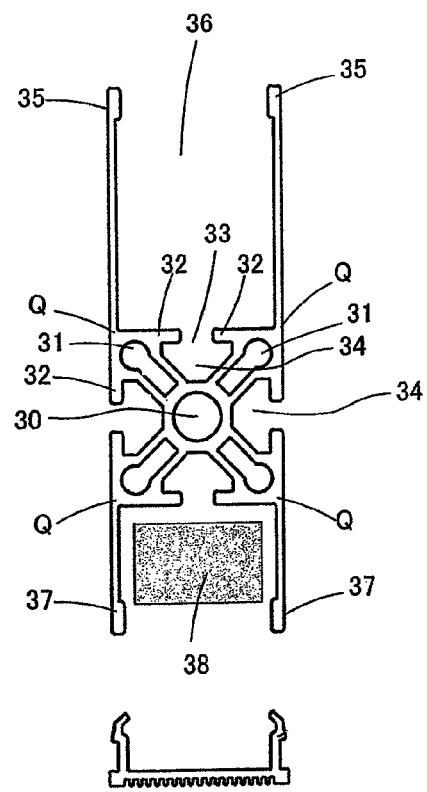
FIG. 5 is a cross sectional view of the beam shown in FIG. 4.

Next, a description will be made of the beam 3 with reference to FIGS. 4 and 5. FIG. 4 is a perspective view of the beam 3, and FIG. 5 is a cross sectional view of the beam 3. The cross sectional shape of the beam 3 is substantially the same as that of the pole 2. A center portion 30, partition walls 31, walls 32 (a pair of walls 32), opening portions 33, groove portions 34 and apexes Q of the beam 3 correspond respectively to the center portion 20, the partition walls 21, walls 22 (a pair of walls 22), the opening portions 23, the groove portions 24 and the apexes P of the pole 2, and detailed descriptions thereof will be omitted.

The beam 3 is different from the pole 2 in the configuration of the groove portions for wiring in which power supply cables and signal cables for information apparatuses used in the space structure 1 are to be accommodated. In the case of the beam 3, groove portions for wiring 36, 38 are provided only on two sides thereof, namely on the vertically upward side and the vertically downward side, as shown in FIG. 5. In connection with this, the height of the external walls 35 that define the vertically upward groove portion for wiring 36 (i.e. the vertical length of the external walls 35 measured from the apexes Q) is designed to be higher than the height of the external walls 37 that define the vertically downward groove portion for wiring 38 (i.e. the vertical length of the external walls 37 measured from the apexes Q). The reason why the beam 3 is designed in this way is that upward groove portion for wiring 36 opens vertically upwardly when the beam 3 is assembled in the space structure 1, and therefore it is preferred that a larger number of cables are accommodated in it. Cables can also be accommodated in the vertically downward groove portion for wiring 38 as a matter of course, but accommodation of cables in the downward groove portion for wiring 38 can deteriorate the appearance. In view of this, the wiring cover shown in FIG. 5 may be provided so as to cover the groove portion for wiring 38 in that case. No walls like the external walls 35, 37 are provided on the side surfaces of the beam 3, and there is not groove portion for wiring.

Figure 6:
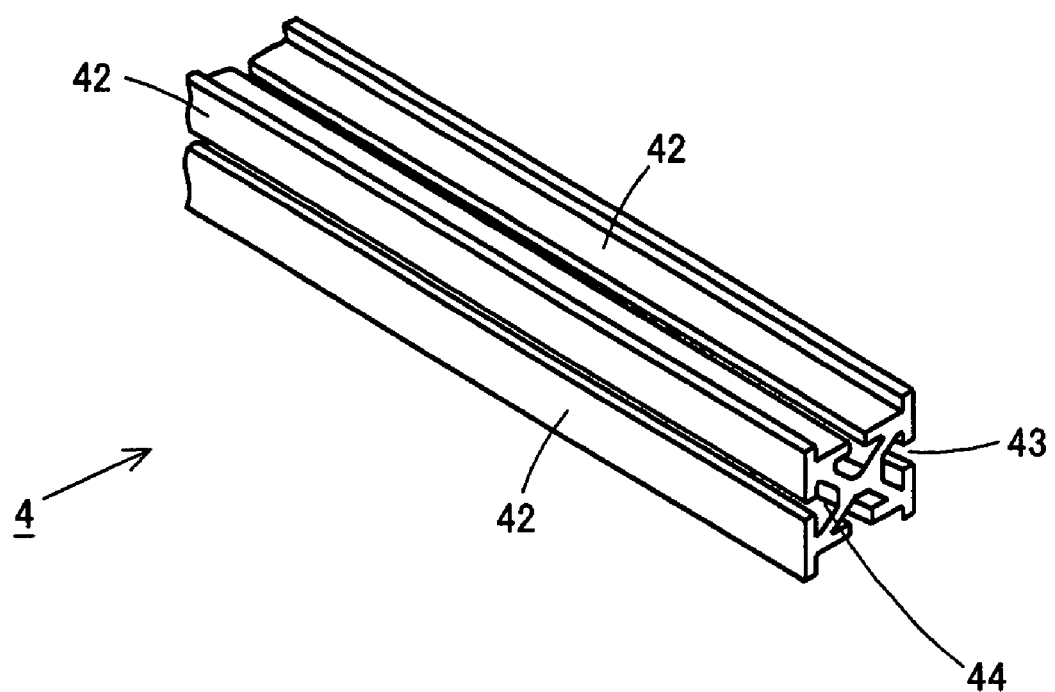
FIG. 6 is an external view of a short beam that composes the space structure according to the embodiment of the present invention.
Figure 7:
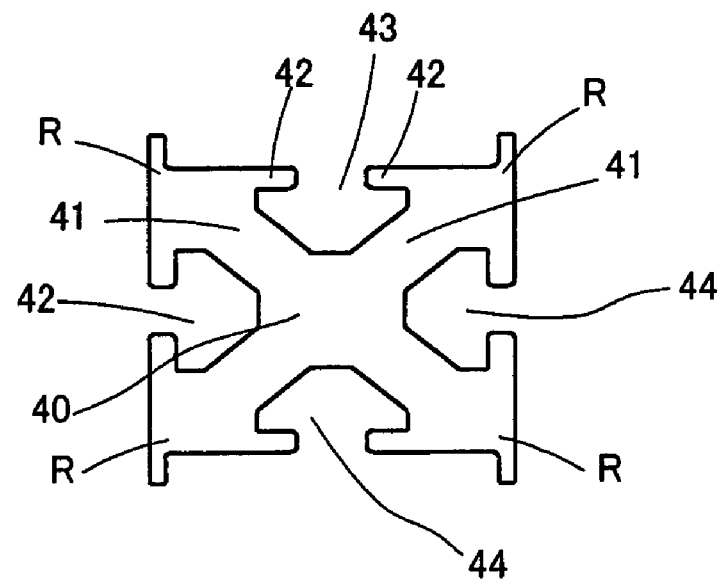
FIG. 7 is a cross sectional view of the short beam shown in FIG. 6.

Next, a description will be made of the short beam 4 with reference to FIGS. 6 and 7. FIG. 6 is a perspective view of the short beam 4, and FIG. 7 is a cross sectional view of the short beam 4. The short beam 4 has a cross sectional shape like that obtained by compressing the cross section of the beam 3 in the vertical direction while leaving it unchanged with respect to the horizontal direction. In other words, the small beam 4 is thinner beam as compared to the beam 3. A central portion 40, partition walls 41, walls 42 (a pair of walls 42), opening portions 43, the groove portions 44 and apexes R correspond respectively to the center portion 30, the partition walls 31, the walls 32 (a pair of walls 32), the opening portions 33, the groove portions 34 and the apexes Q of the beam 3. Spaces corresponding to the aforementioned groove portions for wiring 26, 36, 38 are not provided in the short beam 4.

Figure 8:
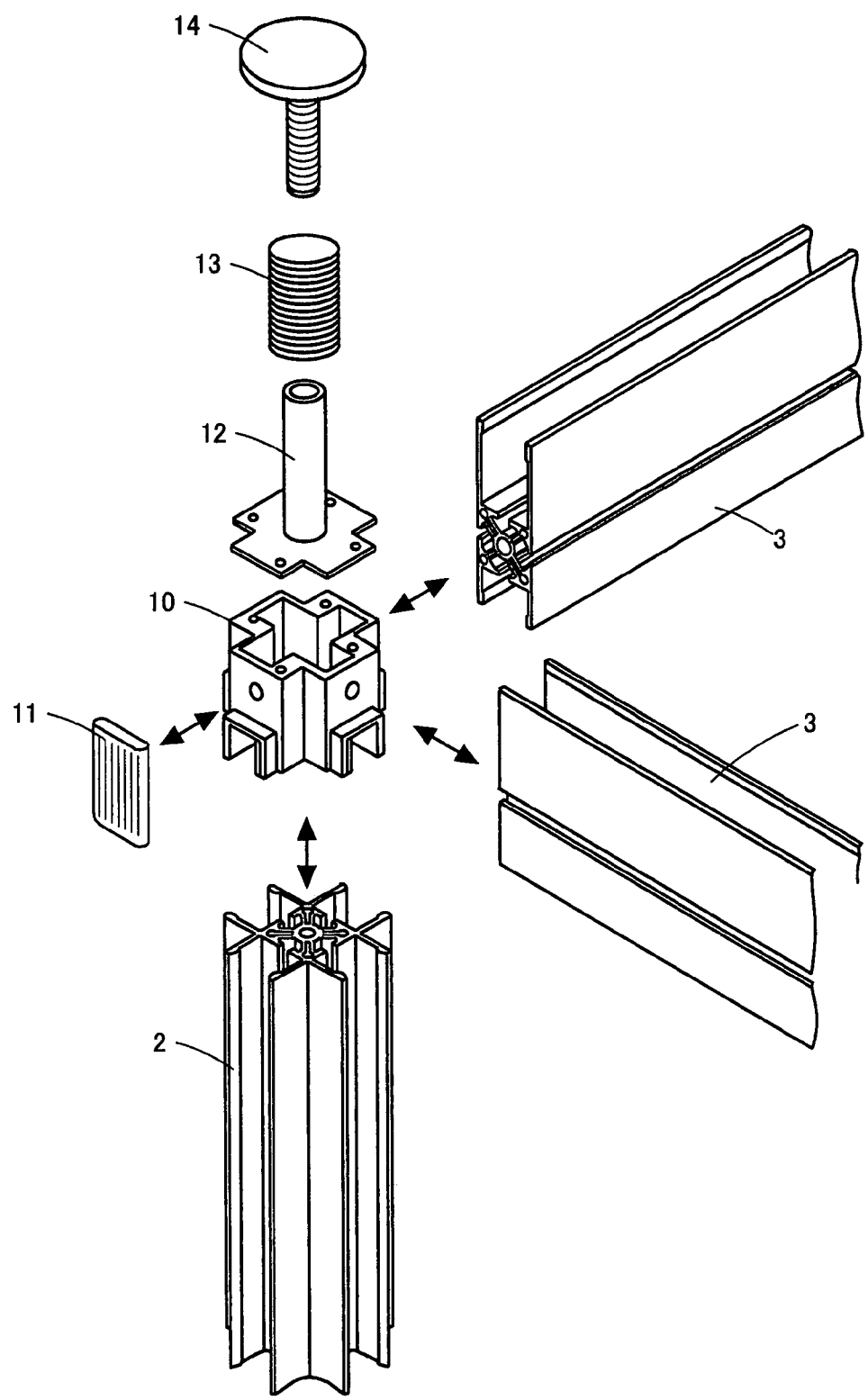
FIG. 8 illustrates how one pole and two beams are connected at a corner portion of the space structure according to the embodiment of the present invention.
Figure 9:
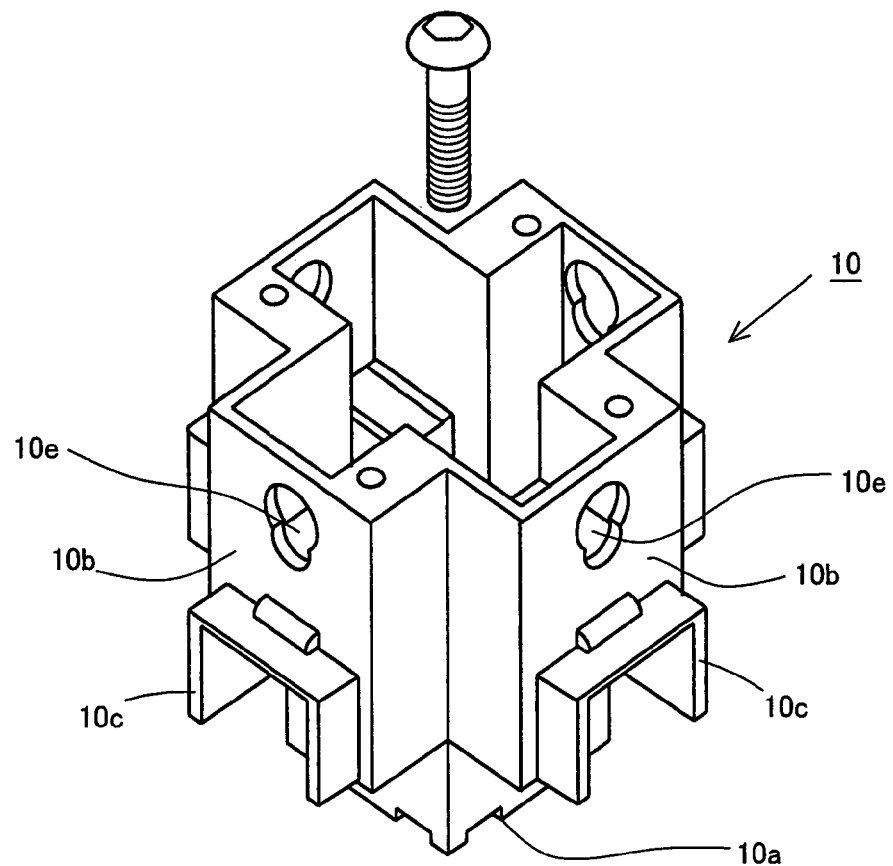
FIG. 9 shows the structure of a joint used in the connection shown in FIG. 8.
Figure 9:
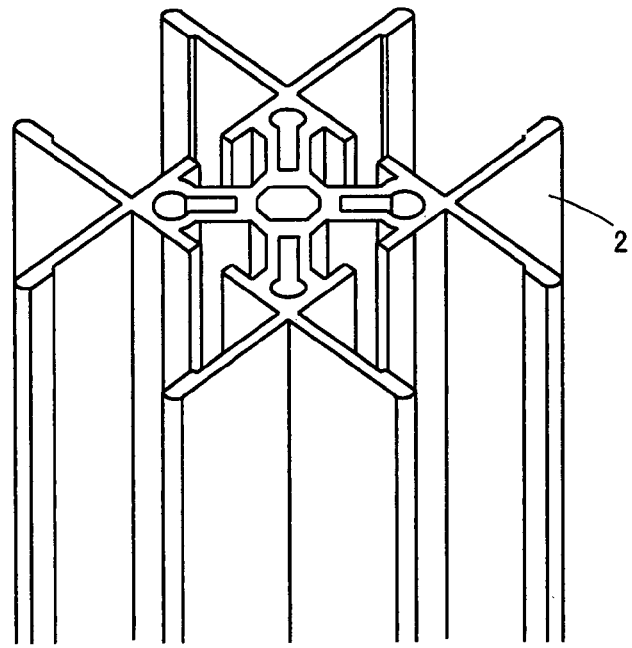
Figure 10:
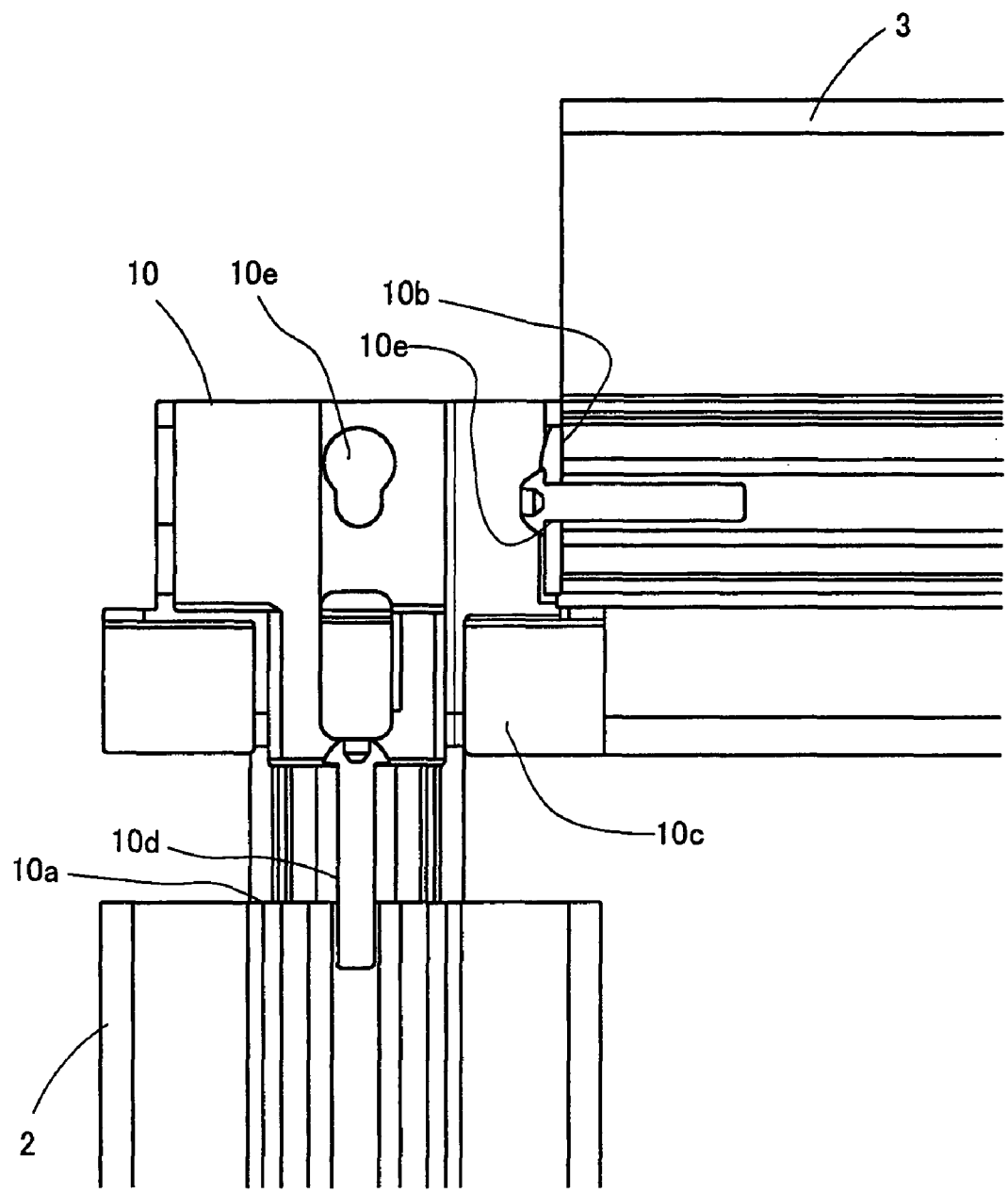
FIG. 10 is a cross sectional view illustrating the connection of the pole and the beam shown in FIG. 8.

Here, a description will be made how the poles 2, the beams 3 and the short beams 4 that constitute the space structure 1 are connected. First, connection of components at each corner of the space structure 1 will be described with reference to FIGS. 8, 9 and 10. FIG. 8 shows how two beams 3 and one pole 2 are connected at a corner (e.g. connection of pole 2a and beams 3a and 3b in the space structure 1). FIGS. 9 and 10 shows details of the way of connecting a pole 2 and a beam 3.

The connection of the pole 2 and the beam 3 at the corner portion is achieved by using a joint 10 provided therebetween. The joint 10 has an attachment surface 10a that is in contact with an end face of the pole 2 when the joint is set on the pole 2. The attachment surface 10a has a through hole 10d at its center. When the attachment surface 10a is set on the end face of the pole 2, the through hole 10d comes to a position aligned with a screw hole provided on the center portion 20 of the pole 2. The joint 10 is secured to the pole 2 using a screw as shown in FIG. 10.

The joint 10 also has an attachment surface 10b that is in contact with an end face of the beam 3 when the joint is set on the beam 3. The attachment surface 10b has a through hole 10e at its center. When the attachment surface 10b is in contact with the end face of the beam 3, the through hole 10e comes to a position aligned with a screw hole provided on the center portion 30 of the beam 3. The joint 10 is secured to the beam 3 using a screw as shown in FIG. 10. The joint 10 has a beam guide 10c, which is adapted to fit into an end of the groove portion for wiring 38 of the beam 38, when the attachment surface 10b comes in contact with the end face of the beam 3. Fitting of the beam guide portion 10c into the groove portion for wiring 38 facilitates the operation of attaching the joint 10 to the beam 3. The attachment surface 10b, the beam guide portion 10c and the through hole 10e are provided at four positions on the joint 10 in accordance with the shape of the pole 2.

When securing the joint 10 to the pole 2 using a screw, a securing operation is performed by inserting the screw from the upper opening of the joint 10, as shown in FIG. 9. When securing the joint 10 to the beam 3 also using a screw, a securing operation is performed by inserting the screw from the upper opening of the joint 10. Alternatively, the through hole 10e that is opposed to the through hole 10e used for securing may be utilized.

After connecting the pole 2 and the beam 3 using the joint 10, the opening of the joint 10 is closed by an adjuster support 12 as shown in FIG. 8. The adjuster support 12 has a cylinder portion inside which a female screw thread is provided. An adjuster cover 13 that covers the cylinder portion and an adjuster 14 having a screw portion that is to be screwed to the cylinder portion are also provided. The adjuster 14 is used to adjust the distance to the ceiling of the place such as an office in which the space structure 1 is constructed.

Figure 11:
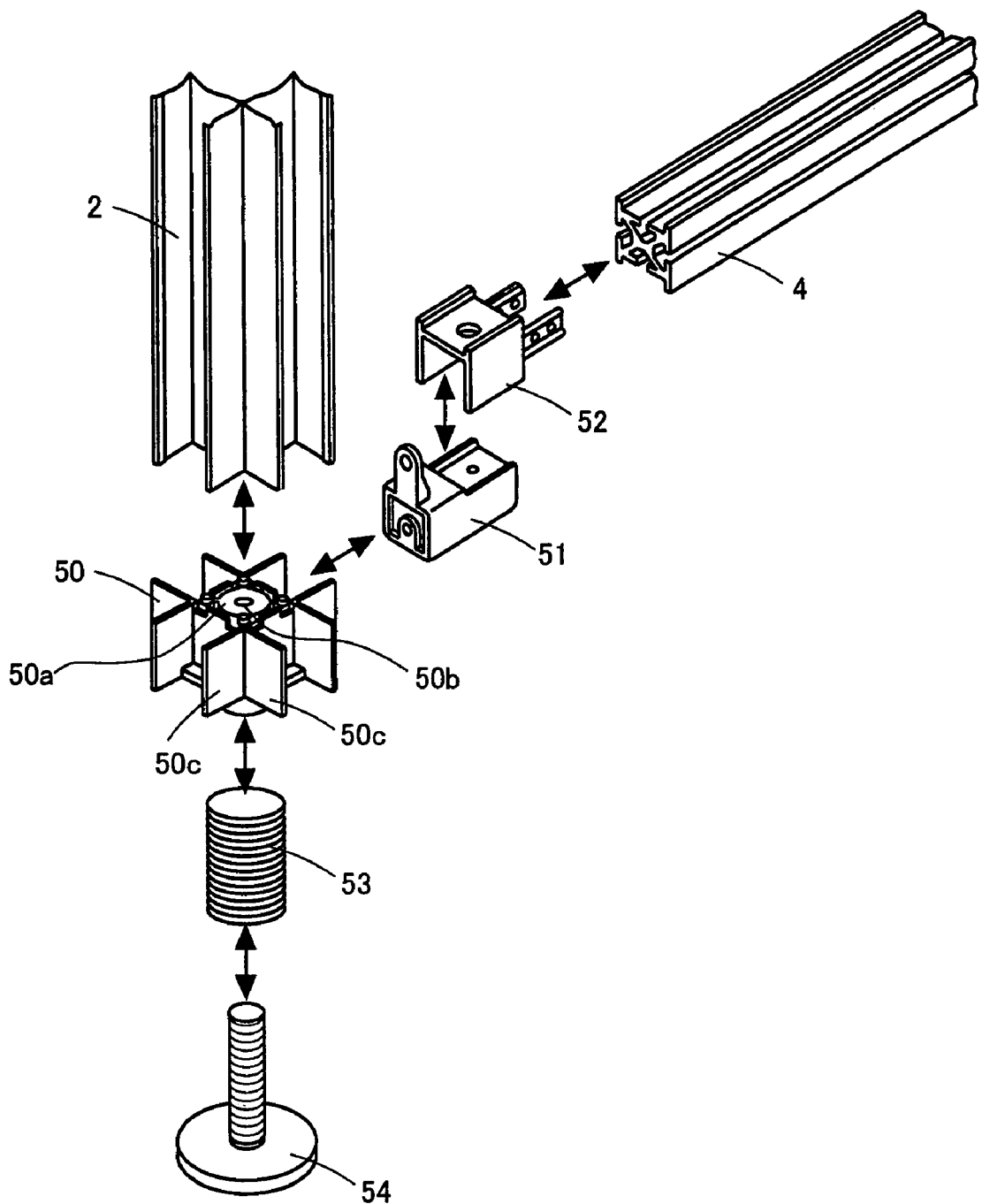
FIG. 11 illustrates the way of connecting a pole and a short beam at the bottom of the pole in the space structure according to the embodiment of the present invention.
Figure 12:
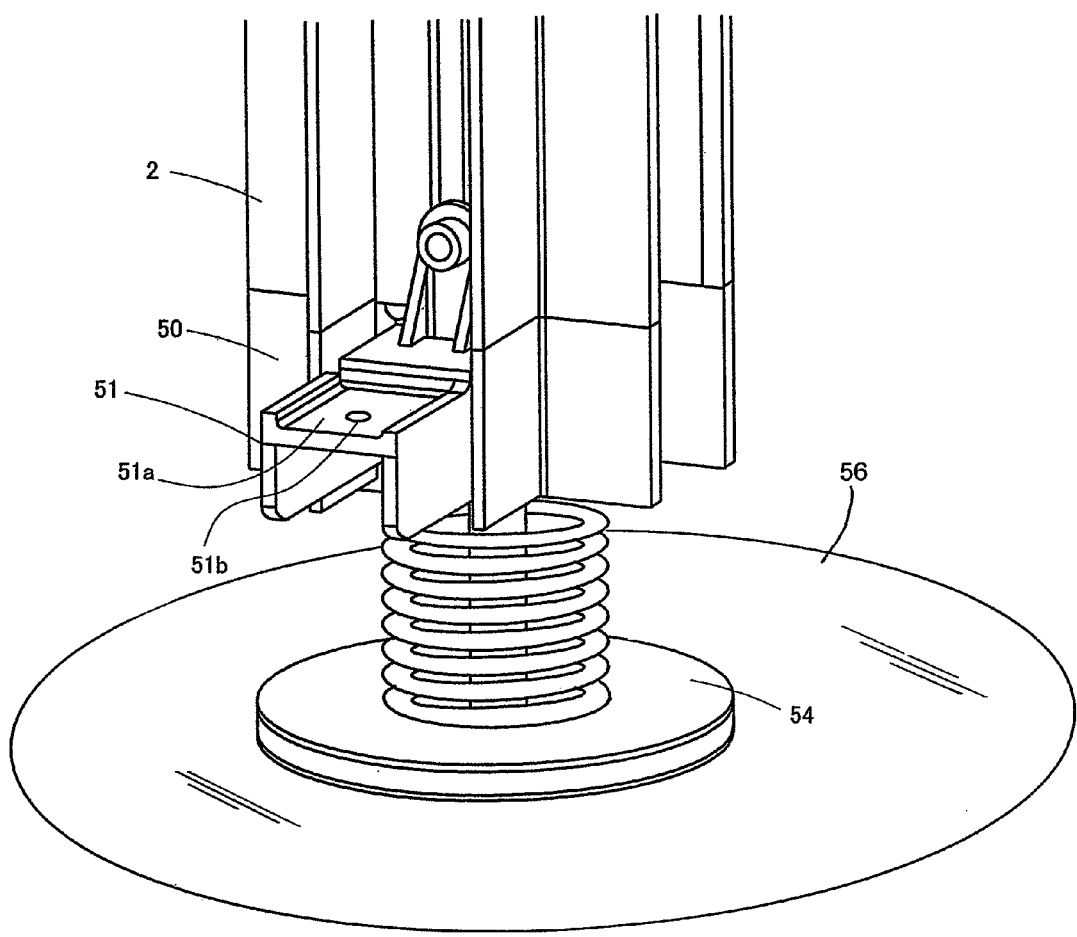
FIG. 12 illustrates two joints connected to the lower portion of the pole in the connection shown in FIG. 11.
Figure 13:
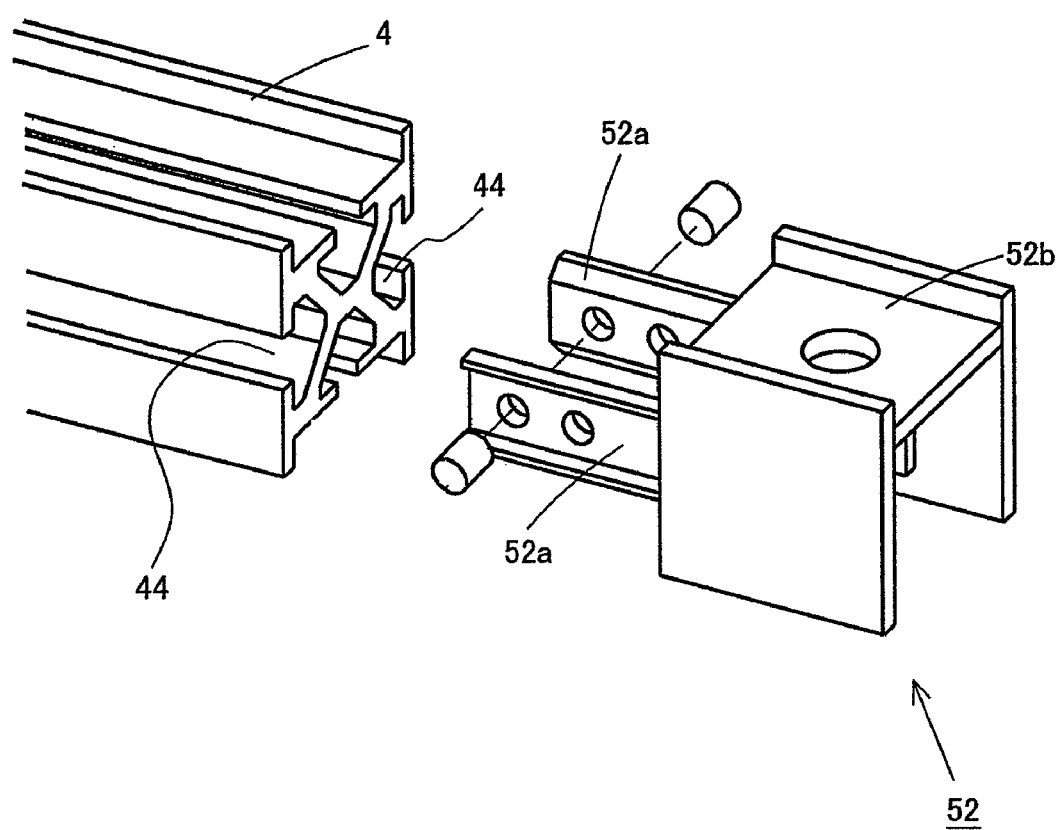
FIG. 13 illustrates the structure of a joint connected to the short beam in the connection shown in FIG. 11.

Next, a description will be made of how a short beam 4 that bridges lower portions of poles 2 is connected with reference to FIGS. 11 to 14. FIG. 11 illustrates the way of connecting a pole 2 and a short beam 4 (e.g. connection of pole 2a and short beam 4a in the space structure 1) at the bottom of the pole 2. FIGS. 11 to 13 show details of the way of connecting the pole 2 and the short beam 4.

The pole 2 and the short beam 4 are connected using joints 50, 51 and 52 provided therebetween. The joint 50 is attached to an end of the pole 2 as shown in FIG. 11. This joint 50 has a contact surface 50a having a through hole 50b to be aligned with a screw hole provided on the center portion 20 of the pole 2. The joint 50 has four sets of opposed external walls 50c that are similar to the opposed external walls 25 of the pole 2. Between the opposed external walls 50c, there is provided no opening like the opening 23 of the pole 2, but a screw hole (which will be described later) used for securing the joint 51.

After the joint 50 is attached to an end portion of the pole 2, another joint 51 is attached to the joint 50 utilizing a screw hole on the joint 50 used for securing the joint 51 and a through hole on the joint 51 as shown in FIG. 12. The joint 51 play a role of intermediating another joint 52 that will be described later and the joint 50. The joint 51 has a support portion 51a for supporting the joint 52 and a screw hole 51b provided on the support portion 51a for coupling with the joint 52.

Figure 14:
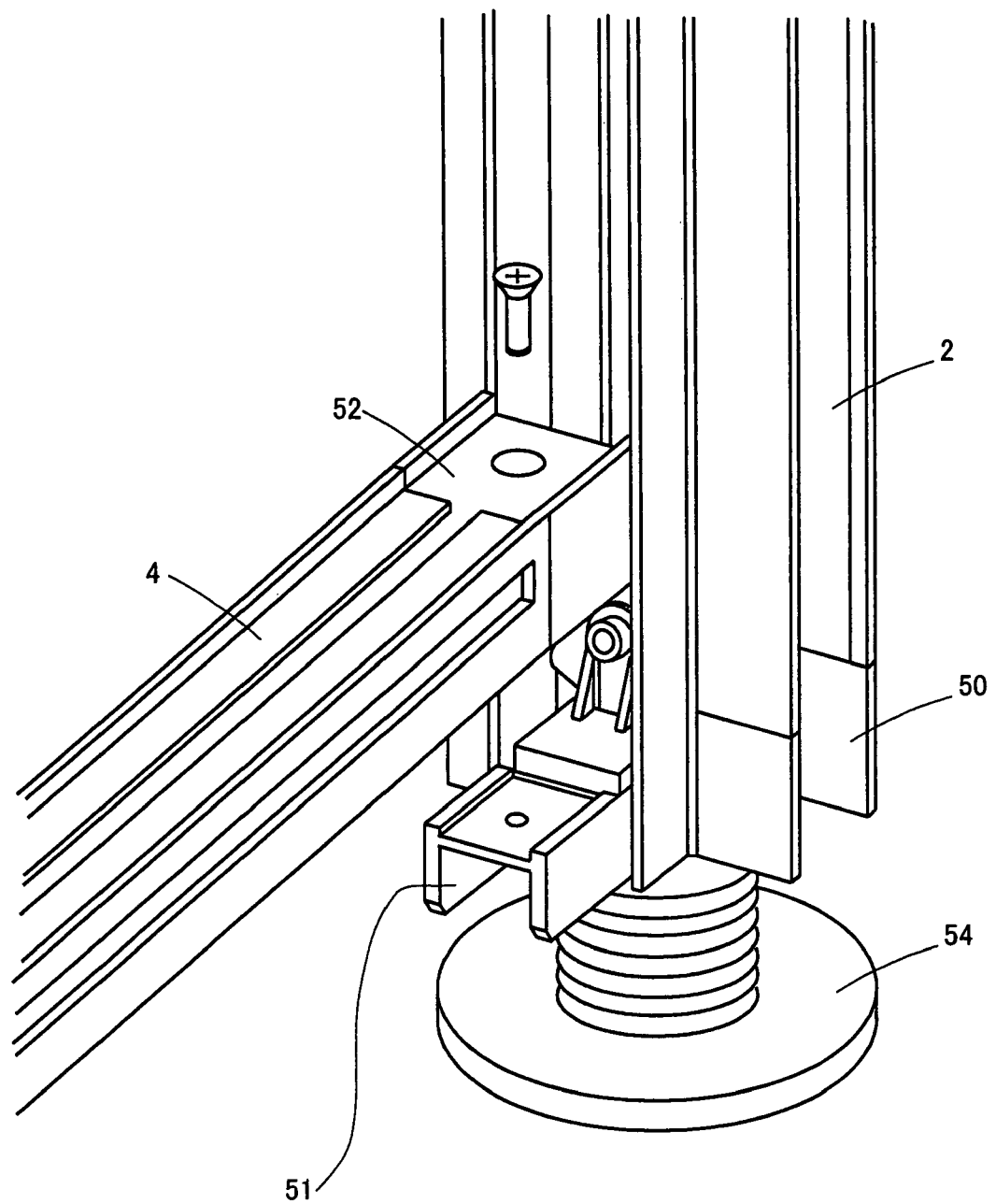
FIG. 14 illustrates the structure of the joint connected to the short beam in the connection shown in FIG. 11.

Next a description will be made of the joint 52 with reference to FIG. 13. The joint 52 is attached to the short beam 4 in advance. As shown in FIG. 13, the joint 52 is composed of a base portion 52b and two parallel leg portions 52a extending from the base portion 52b. A through hole 52c is provided at the center of the top portion of the base portion 52b. The parallel leg portions 52a are inserted into groove portions 44 of the short beam 4 and secured by screws. The short beam 4 on which the joint 52 is fixed in this way is connected to the pole 2 on which the joint 51 is fixed and to the joint 50 as shown in FIG. 14. In doing so, the joint 51 and the joint 52 are secured to each other by a screw in the state in which the screw hole 51b and the through hole 52c are aligned.

After the pole 2 and the short beam 4 are connected by means of the joints 50, 51 and 52, an adjuster cover 53 and an adjuster 54 are attached as shown in FIG. 11. The adjuster 54 is provided in order to adjust the distance to the floor 56 (FIG. 12) of the place such as an office in which the space structure 1 is constructed, and the adjuster cover 53 is provided in order to partly cover the adjuster 54.

Figure 15:
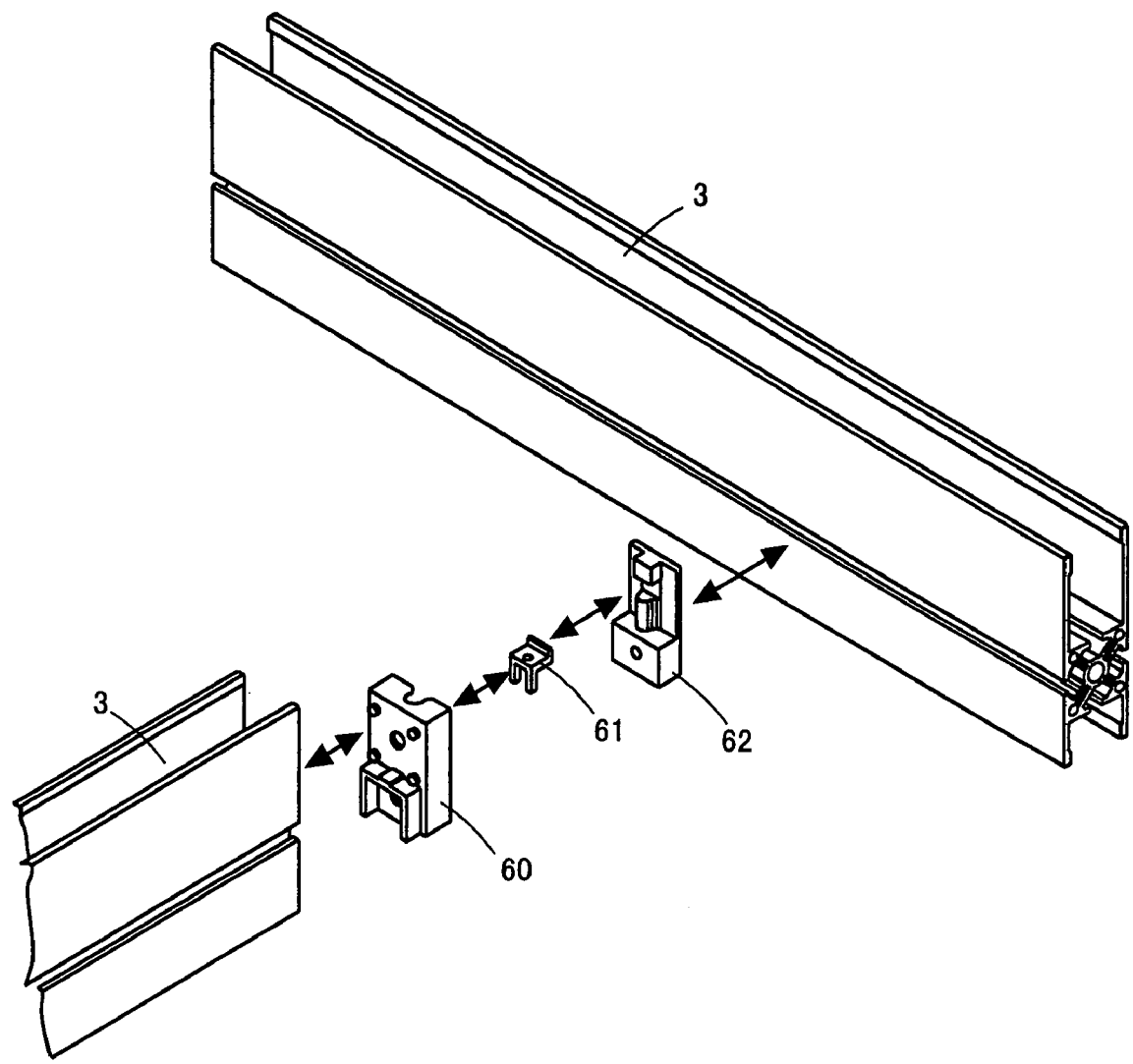
FIG. 15 illustrates how beams are connected to each other in the space structure according to the embodiment of the present invention.
Figure 16:
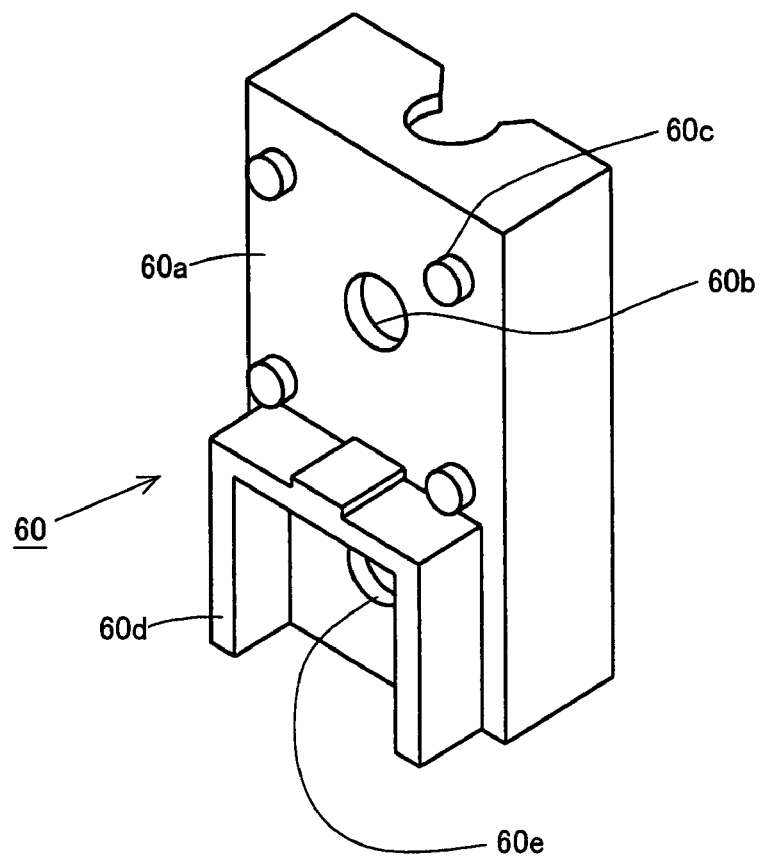
FIG. 16 shows the structure of a first joint used in the connection shown in FIG. 15.
Figure 17:
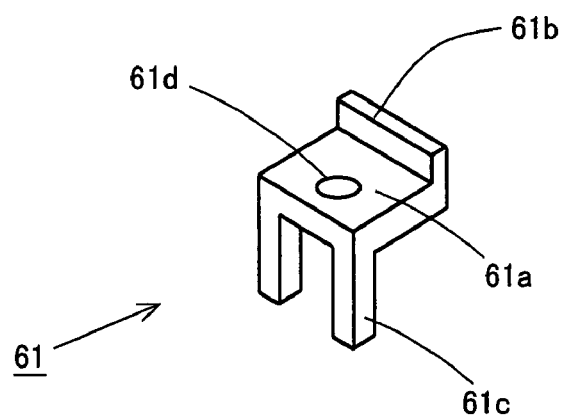
FIG. 17 shows the structure of a second joint used in the connection shown in FIG. 15.
Figure 18:
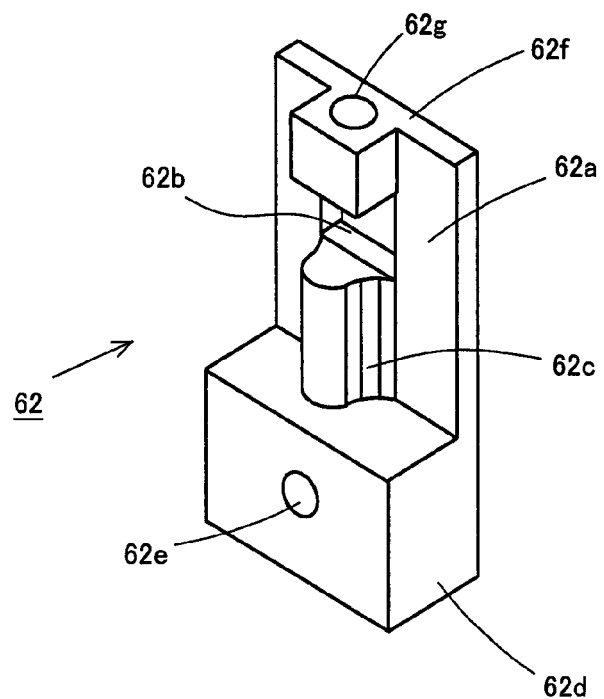
FIG. 18 shows the structure of a third joint used in the connection shown in FIG. 15.
Figure 19:
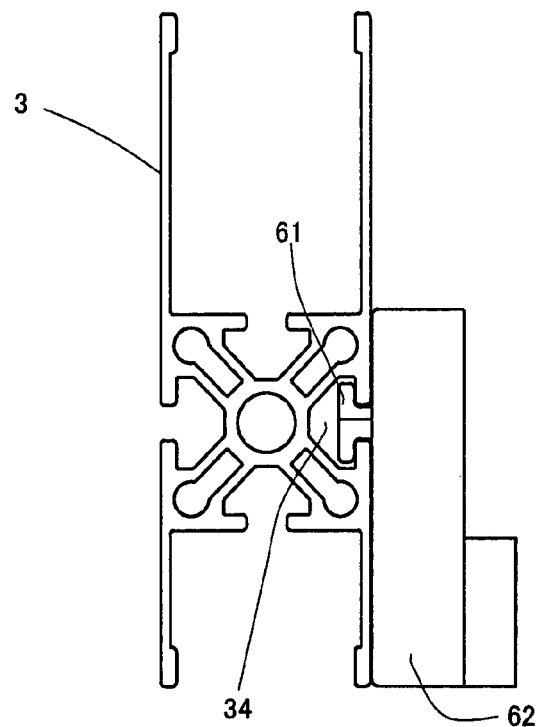
FIG. 19 is a first diagram showing how the second joint shown in FIG. 17 and the third joint shown in FIG. 18 function in cooperation with each other.
Figure 20:
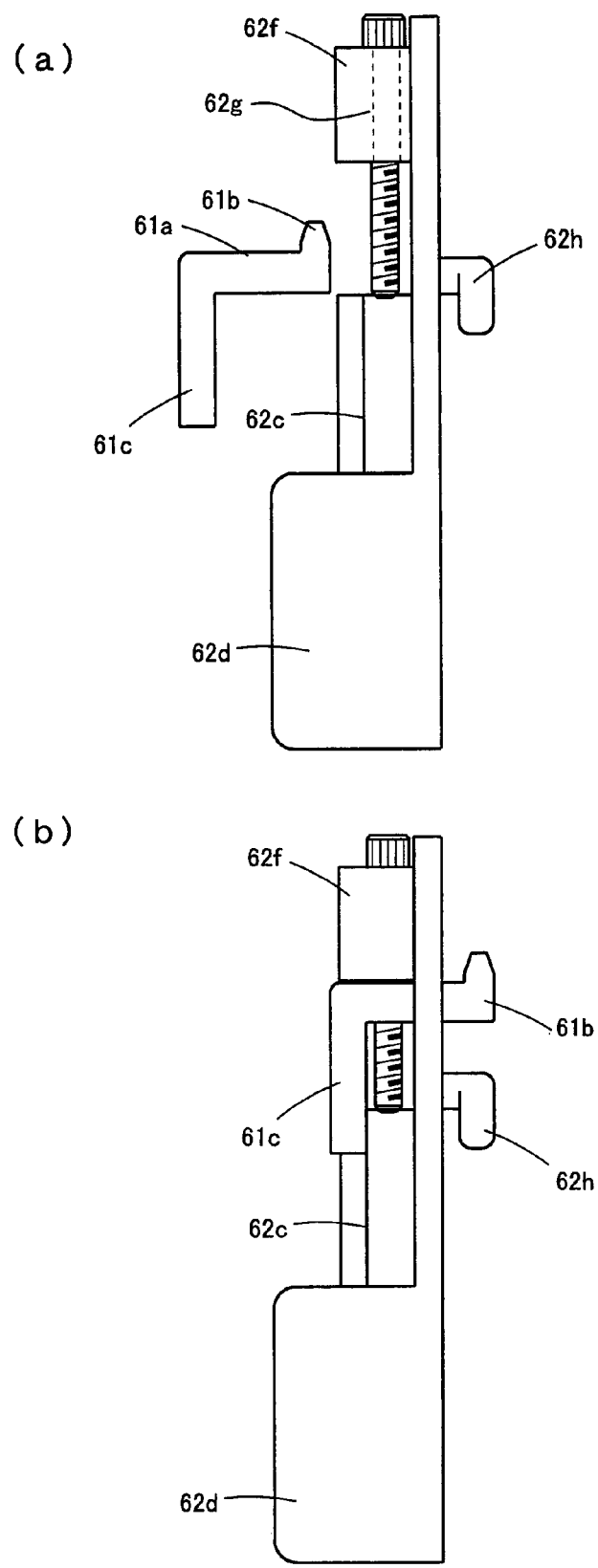
FIGS. 20(a) and 20(b) are a second diagram showing how the second joint shown in FIG. 17 and the third joint shown in FIG. 18 function in cooperation with each other.

Next, a description will be made of how a beam 3 and another beam 3 are connected with each other in the space structure 1 with reference to FIGS. 15 to 20. FIG. 15 illustrates the way of connecting beams 3 to each other (e.g. connection of beam 3d and beam 3h in the space structure 1). FIGS. 16 to 18 respectively show the structures of joints used in connecting the beams 3 to each other. FIGS. 19 and 20 illustrate the details of the way of connecting the beams 3 using the joints.

As shown in FIG. 15, the beams 3 are connected by means of joints 60, 61 and 62. The joint 60 is attached to an end portion of the beam 3, as shown in FIG. 15. FIG. 16 specifically illustrates the structure of this joint 60. The joint 60 has an attachment surface 60a that is in contact with an end face of the beam 3 when it is set on the beam 3. The attachment surface 60a has a through hole 60b at its center. When the attachment surface 60a is set on the end face of the beam 3, the through hole 60b comes to a position aligned with a screw hole provided on the center portion 30 of the beam 3. To facilitate alignment of the joint 60 with the end face of the beam 3, four projections 60c are provided on the attachment surface 60a at positions corresponding to the groove portion 34 of the beam 3. As shown in FIG. 15, the joint 60 is secured to the beam 3 with a screw.

Joint 60 is further provided with a beam guide portion 60d that is fitted into the end portion of the groove portion for wiring 38 of the beam 3 when the attachment surface 60a comes into contact with the end face of the beam 3. Fitting of the beam guide portion 60d in the groove portion for wiring 38 facilitates operation of attaching the joint 60 to the beam 3. Inside the beam guide portion 60d is provided a screw hole 60e used in coupling the joint 60 with another joint 62 that will be described later.

FIG. 17 shows the detailed structure of the joint 61. FIG. 18 shows the detailed structure of the joint 62. These joints 61 and 62 cooperate with each other in the manner shown in FIGS. 19 and 20. The joint 61 has a base portion 61a in the form of a flat plate, a claw portion 61b projecting upwardly from one end of the base portion 61a and guide portions 61c extending from the other end of the base portion 61a downwardly in the direction opposite to the claw portion 61b. A screw hole 61d is provided on the base portion 61a.

The joint 62 has a base portion 62a, on which a rectangular through hole 62b is provided near the center of the upper portion thereof. The horizontal width of the through hole 62b is large enough to receive joint 61. Below the through hole 62b are provided guide grooves 62c that extend in the vertical direction. Below the guide grooves 62c are provided lower base portion 62d. The lower base portion 62d projects frontward beyond the guide grooves 62c and has a through hole 62e provided thereon. A projecting portion 62f is provided above the rectangular through hole 62b. Inside the projecting portion 62f is provided a through hole 62g extending in the vertical direction (see FIG. 20). On the backside surface of the base portion 62a of the joint 62 is provided a claw portion 62h that extends downwardly (see FIG. 20).

These Joints 61 and 62 cooperate in the manner shown in FIG. 19. Specifically, the claw portion 61b of the joint 61 and the claw portion 62h of the joint 62 are inserted into the groove portion 34 on a lateral side surface of the beam 3. Thus, the claw portion 61b of the joint 61 engages the upper wall 32 that defines the groove portion 34 and the claw portion 62h of the joint 62 engages the lower wall 32 that defines the groove portion 34, whereby these joints are fixed at any desired portion on the side surface of the beam 3. The cooperative function of these joints 61 and 62 will be specifically described with reference to FIG. 20.

As shown in FIG. 20(a), the joint 61 is inserted into the through hole 62b in the state in which the claw portion 61b of the joint 61 is opposed to the through hole 62b. In that process, the joint 61 is inserted up to a position at which the guide portions 61c of the joint 61 will be in contact with the guide grooves 62c of the joint 62 when the claw portion 61b of the joint 61 and the claw portion 62h of the joint 62 are received in the guide groove 34 of the beam 3. In addition, the screw hole 61 of the joint 61 and the through hole 62g of the joint 62 are aligned along a vertical line. In this state, a screw is inserted into the through hole 62g toward the screw hole 61d, and the leading end of the screw comes in contact with an end of the guide grooves 62c. Accordingly, as the screw is turned, the joint 61 moves in the vertical direction relative to the joint 62 with the guide portions 61c sliding on the guide grooves 62c. Thus, the distance between the claw portion 61b of the joint 61 and the claw portion 62h of the joint 62 is adjusted with turn of the screw, so that the state of engagement of these claw portion with the groove portion 34 (or the walls 32 that define it) is controlled.

In addition, when the screw is adjusted in such a way as to decrease the engaging force acting between the two claw portions and the groove portion 34, the joint 61 and the joint 62 can slide along the opening portion 33 of the groove portion 34 on the lateral side surface of the beam 3 in cooperation with each other to move to an arbitrary position. At this state, by adjusting the screw in such a way as to increase the engaging force acting between the two claw portions and the groove portion 34, it is possible to fix the joints 61, 62 at that arbitrary position on the beam 3. These joints 61 and 62 serve as the connection means according to the present invention.

By coupling the joints 61, 62 attached on one beam 3 with the joint 60 attached on another beam 3, connection of said one beam and said another beam is achieved. Specifically, the joint 60 and the joint 62 are screwed together through the screw hole 60e on the joint 60 and the through hole 62e on the joint 62, so that the beams are connected at an arbitrary position.

Figure 21:
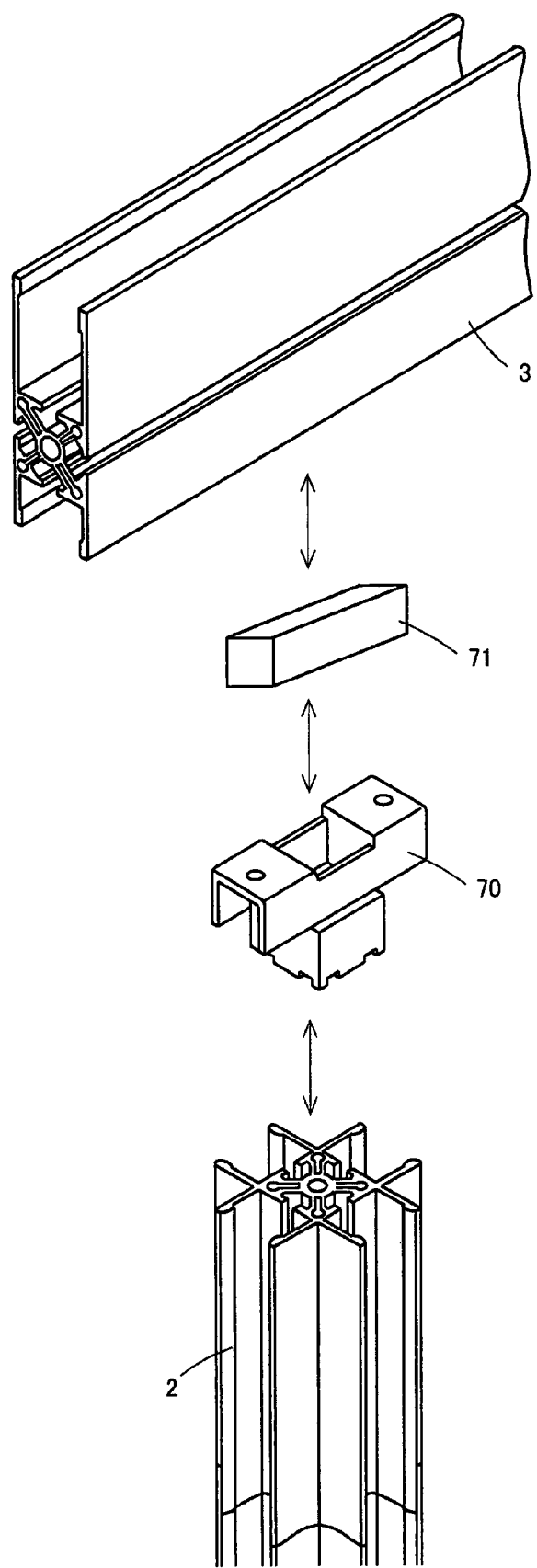
FIG. 21 illustrates how a beam and a pole is connected using a slide connection apparatus in the space structure according to the embodiment of the present invention.

Next, a description will be made of how a pole 2 is connected to a beam 3 at some position thereon in the space structure 1 with reference to FIGS. 21 to 26. FIG. 21 illustrates the way of connecting a beam 3 and a pole 2 (e.g. beam 3a and pole 2g in the space structure 1). FIGS. 22 to 26 illustrate the structures of joints and a slide connection device used in connecting the beam 3 and the pole 2.

Figure 22:
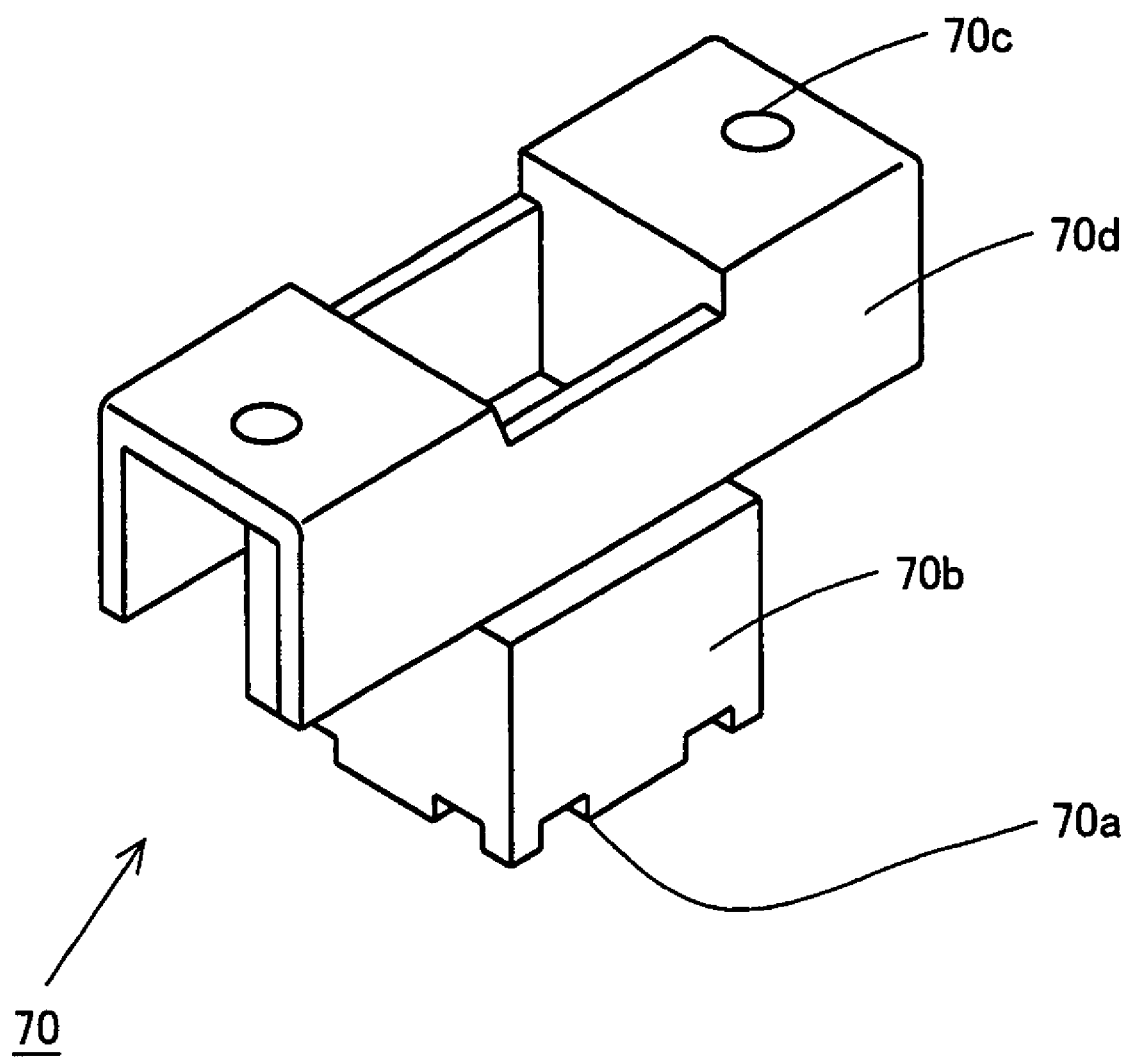
FIG. 22 shows the structure of a joint used in the connection shown in FIG. 21.
Figure 23:
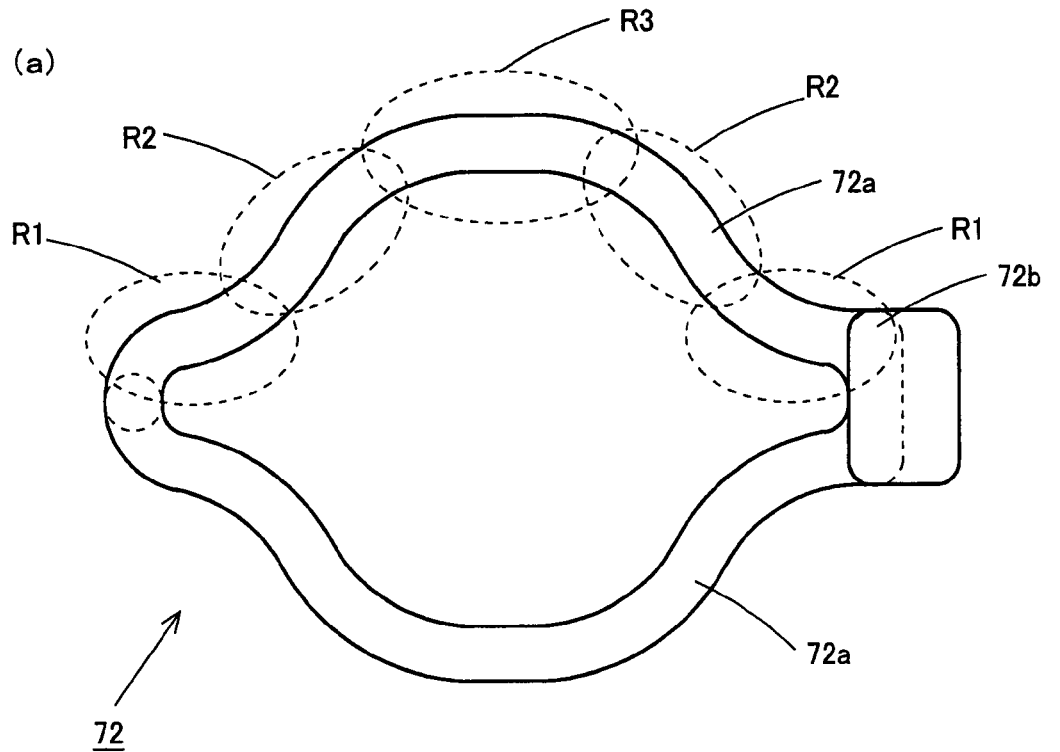
FIGS. 23(a) and 23(b) show the structure of a biasing member that composes the slide connection device used in the connection shown in FIG. 21.
Figure 23:
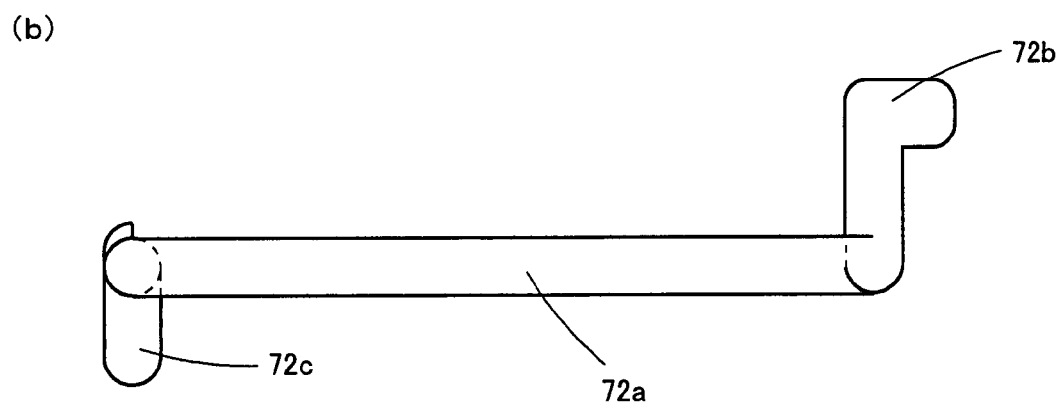

As shown in FIG. 21, the beam 3 and the pole 2 are connected by means of a joint 70 and a slide connection device 71. The joint 70 used herein is attached to an end portion of the pole 2. FIG. 22 illustrates the detailed structure of the joint 70. The joint 70 has an attachment surface 70a that is in contact with an end face of the pole 2 when it is set on the pole 2. The attachment surface 70a is provided on a base portion 70b in the lower portion of the joint 70. The base portion 70b has a through hole (not shown) that goes through the attachment surface 70a also. The joint 70 also has a support portion 70d provided on the base portion 70b having the attachment surface 70a. The support portion 70d has an opening at its center and through holes 70c arranged on both sides of the opening. The opening allows access to the aforementioned through hole provided on the base 70b. When the attachment surface 70a is set on the end face of the pole 2, the through hole comes to a position aligned with the screw hole provided on the center portion 20 of the pole 2. Thus, the joint 70 can be secured to the pole 2 using a screw.

The through hole 70c provided on the support portion 70d of the joint 70 are to be aligned with screw holes (i.e. two screw holes near the right and left ends thereof) provided on the slide connection device 71. The joint 70 and the slide connection device 71 are fastened to each other by screws using the through holes 70c and the screw holes. In the case where the slide connection device 71 is small in relation to the joint 70, two slide connection devices 71 may be attached to one joint 70.

In the following, details of the slide connection device 71 will be described. The slide connection device 71 is composed of a biasing member 72 shown in FIG. 23 and a base member 73 shown in FIG. 24. These two members are completely separate members. The biasing member 72 has a biasing portion 72a having a profile, a projecting portion 72b projecting from the biasing portion 72a in one direction and another projecting portion 72c projecting from the biasing portion 72a in the direction opposite to the projecting portion 72b. The biasing portion 72a has line symmetry with respect to the line connecting the points at which the projecting portion 72b and the projecting portion 72c are respectively provided. Specifically, the biasing portion 72a has such a shape that in the vicinity of each projecting portion (i.e., in the region designated by R1 in FIG. 23(a)), the biasing portion 72a runs somewhat near the line of symmetry. As it approaches toward the center thereof (i.e. in the region designated by R2), it runs away from the line of symmetry while showing an arc shape. In the vicinity of the center of the biasing portion 72a, it is substantially parallel to the line of symmetry. With the above described shape of the biasing portion 72a, the part of the biasing portion in the region designated by R3 is liable to flex in the direction perpendicular to the plane of the drawing sheet of FIG. 23 with the parts of the biasing portion in the regions designated by R1 being the pivot. With this flexure, the biasing portion 72a can exert biasing force in the direction perpendicular to the plane of the drawing sheet. The projecting portion 72c has a generally cylindrical projection shape, while the projecting portion 72b has a width a little larger than the projecting portion 72c. The width of the projecting portion 72b is a little smaller than the width of the respective opening portions 23, 33 of the pole 2 and the beam 3.

Figure 24:
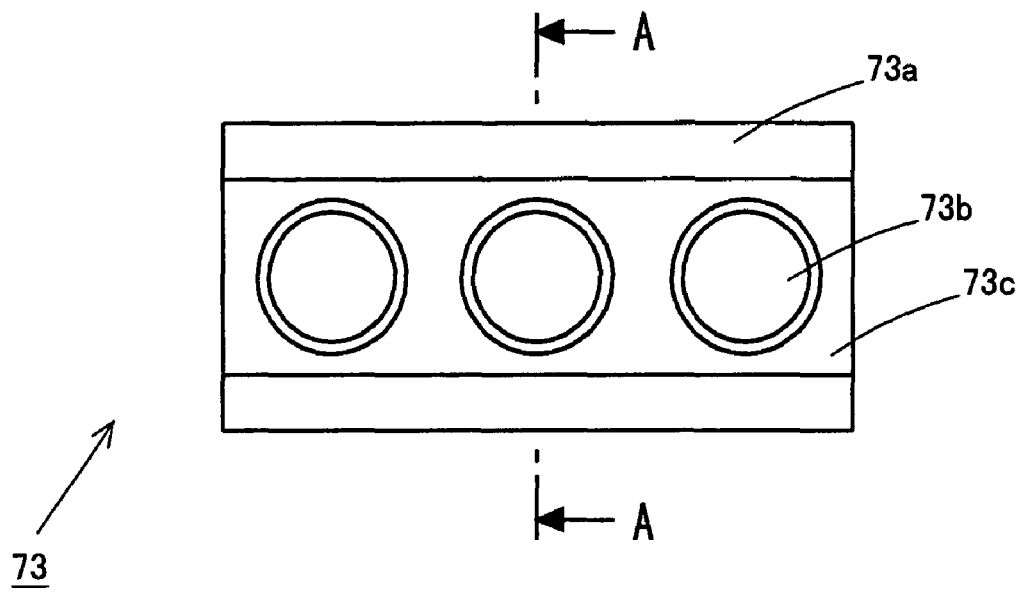
FIGS. 24(a) and 24(b) show the structure of a base member that composes the slide connection device used in the connection shown in FIG. 21.
Figure 24:
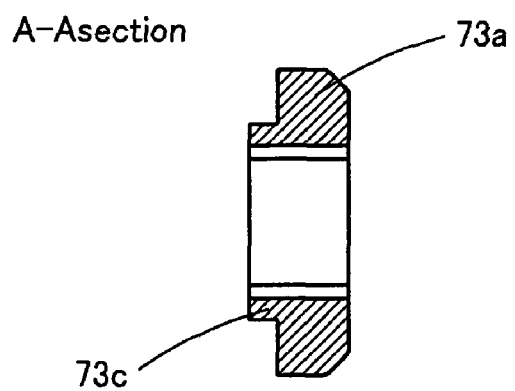

The base portion 73a of the base member 73 has tree screw holes 73b provided at its center as shown in FIG. 24. On one end face of the base portion 73a is provided a stepped portion 73c extending along the longitudinal direction of the base portion 73a. The width (or the length along the vertical direction in FIG. 24) of the stepped portion 73c is a little smaller than the width of the respective opening portions 23, 33 of the pole 2 and the beam 3.

Figure 25:
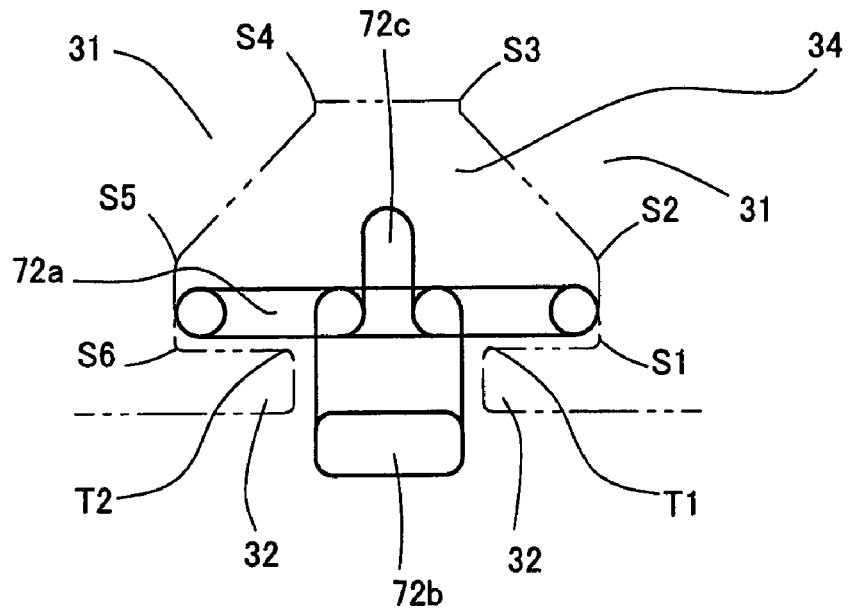
FIGS. 25(a) and 25(b) are a first set of diagrams illustrating movement of the slide connection device, used in the connection shown in FIG. 21, in a groove.
Figure 25:
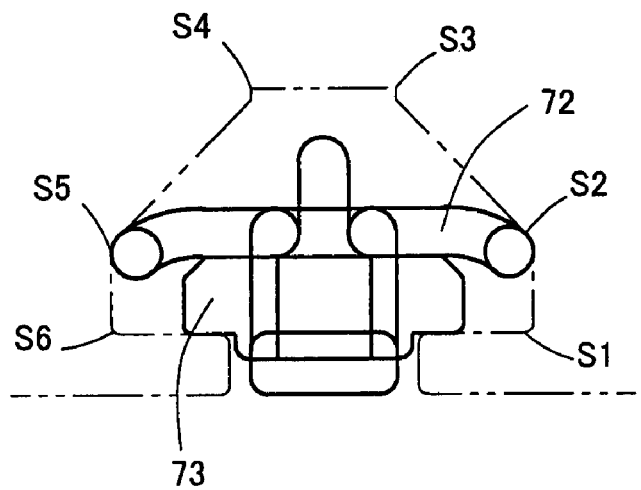
Figure 26:
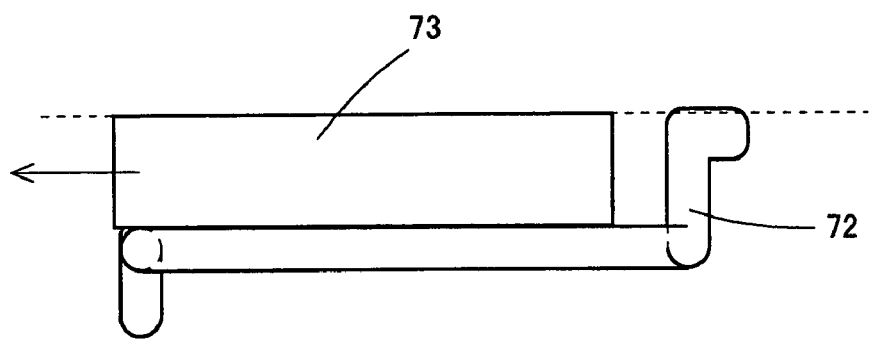
FIGS. 26(a) and 26(b) are a second set of diagrams illustrating movement of the slide connection device, used in the connection shown in FIG. 21, in a groove.
Figure 26:
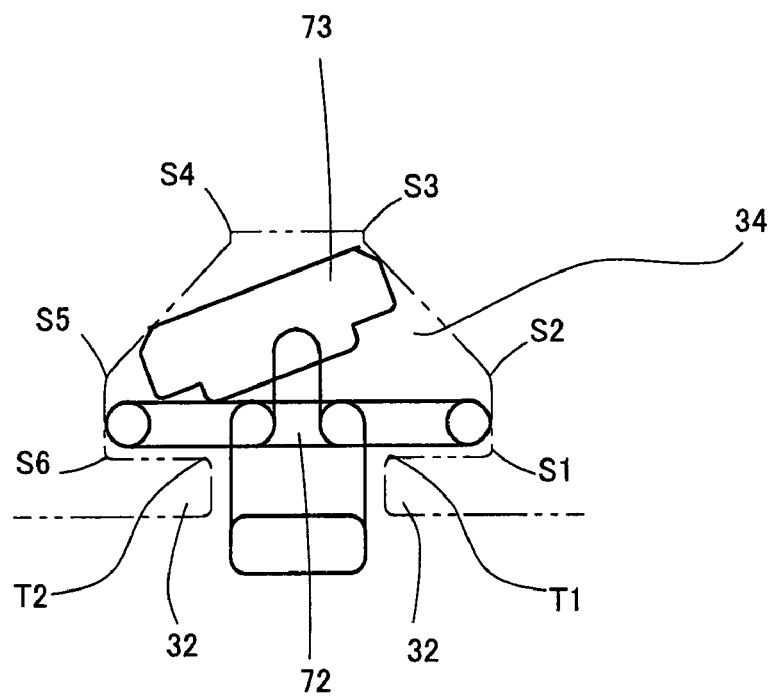

In the following, a description will be made of how the above described biasing member 72 and the base member 73 function as the slide connection device 71 in the groove portion 24, 34 of the pole 2 or the beam 3 with reference to FIGS. 25(a) and 25(b). FIGS. 25(a) ad 25(b) shows the slide connection device 71 set on a beam 3. The illustrated structure also applies to the case where the slide connection device 71 is set in a pole 2, and a description of that case will be omitted. As described before, the groove portion 34 of the beam 3 is defined by the inner surfaces of the partition walls 31 and the walls 32 extending from the center portion 30, and its cross sectional shape is substantially hexagonal. As indicated in FIG. 25, the apexes of the substantially hexagonal cross section of the groove portion 34 will be referred to as apexes S1 to S6, and the apexes that define the opening portion 33 will be referred to as apexes T1 and T2.

First, the biasing member 72 is slid into the groove portion 34 through the opening portion 33 as shown in FIG. 25(a). In this state, the projecting portion 72c is located near the bottom of the groove portion 34 (or near the apexes S3 and S4), while the projecting portion 72b is located near the opening portion 33 (or between the apexes T1 and T2). The part of the biasing portion 72a in the region R3 is located near the inner wall surface between the apexes S1 and S2 and the inner wall surface between the apexes S5 and S6 of the groove portion 34. In this state, a small clearance is present between the biasing portion 72a and the inner wall surfaces, and therefore the biasing portion 72a is not in a flexed state.

In the state illustrated in FIG. 25(a), it is possible to move the biasing member 72 as desired in the groove portion 34 of the beam 3 by handling the projecting portion 72b. After moving the biasing member 72 to an arbitrary position in the groove portion 34, the base member 73 is inserted into the groove portion 34 as shown in FIG. 25(b). In this state, the surface of the base member 73 on which the stepped portion 73c is not provided is in contact with the side of the biasing portion 72a of the biasing member 72 from which the projecting portion 72b projects, and the stepped portion 73c is located at the opening portion 33.

In the state shown in FIG. 25(b), the biasing portion 72a of the biasing member 72 has been pushed to the bottom portion of the groove 34 by the base member 73, and the part of the biasing portion 72a in the region R3 is in contact with the inner wall surfaces of the partition walls 31 (i.e. the inner wall surface between apexes S2 and S3 and the inner surface between the apexes S4 and S5). The distance between these inner wall surfaces decreases toward the bottom of the groove portion 34. Consequently, in the state shown in FIG. 25(b), the biasing portion 72a of the biasing member 72 is flexed as described above. This flexure generates a biasing force that urges the base member 73 against the walls 32 near the opening portion 33. As a result, the slide connection device 71 composed of the biasing member 72 and the base member 73 is fixed at an arbitrary position on the beam 3.

Then, the pole 2 on which the joint 70 is attached is connected to the slide connection device 71 fixed on the beam 3 by screwing screws into screw holes 73b on the slide connection device 71 through the through holes 70c provided on the support portion 70d of the joint 70. In this way, it is possible to connect the pole 2 to the beam 3 at an arbitrary position thereon like in the space structure shown in FIG. 1. In connection with this, the slide connection device 71 constitutes the connection means according to the present invention.

Here, a description will be made of how to change the fixed position of the slide connection device 71 that has once been fixed at a some position with reference to FIGS. 26(a) and 26(b). First, as shown in FIG. 26(a), the base member 73 on which biasing force is exerted by the biasing member 72 is displaced in the direction indicated by an arrow to a position at which it receives no biasing force from the biasing member 72. FIG. 26(b) is a cross sectional view of the groove portion 34 in this state. With the detachment of the base member 73, the biasing member 72 assumes the posture shown in FIG. 26(b). In this state, the base member 73 is in a space in the groove portion 34 other than the space in which the biasing member 72 is present.

However, in this state the base member 73 can interfere with the projecting portion 72c of the biasing member 72 in the groove portion 34 as will be seen from FIG. 26(b). This means that even though biasing force exerted on the base member 73 by the biasing member 72 has been removed, the base member cannot move freely in the groove 34, but its movement is limited by the biasing member 72. This is of importance when the slide connection device 71 is used in the groove portion 24 of a pole 2. The pole 2 extends vertically from the floor, and the gravitational force acts on the base portion 72 on which no biasing force is exerted. Accordingly, the base member 73 can fall down to the lower portion of the pole 2. However, by setting the slide connection device 71 in the groove portion 24 while arranging the projecting portion 72b on the downside and the projecting portion 72c on the upside, the fall of the base member 73 can be avoided for sure by the above described limitation of movement of the base member 73 by the projecting portion 72c.

After the biasing force exerted on the base member 73 by the biasing member 72 has been removed, it is possible to fix the slide connection device 71 by taking out the base member 73 through the opening portion 33, moving the biasing member 72 to a different position and inserting the base member 73 into the groove portion 24, 34 again.

Figure 27:
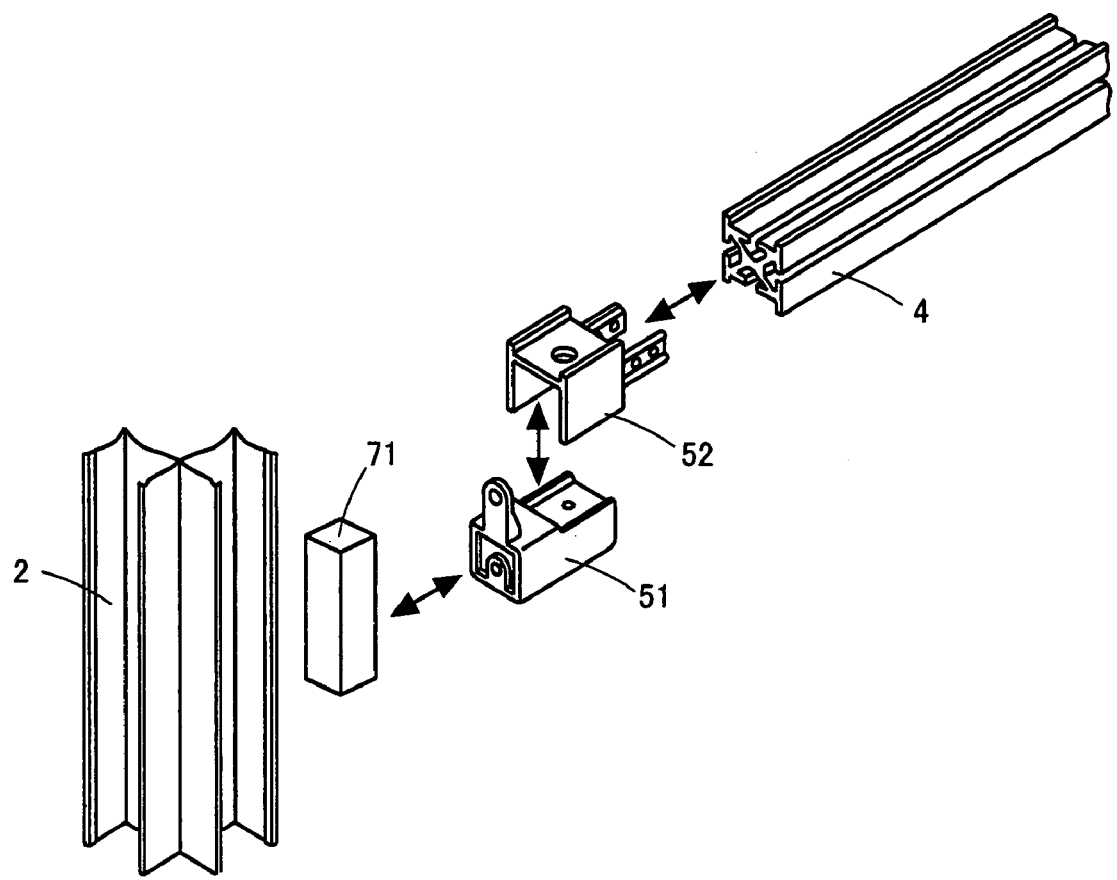
FIG. 27 illustrates how a short beam and a pole are connected using the slide connection device in the space structure according to the embodiment of the present invention.

Next, a description will be made of a method of joining a short beam 4 to a pole 2 at some position thereon in the space structure 1 with reference to FIG. 27. As shown in FIG. 27, the pole 2 and the short beam 4 are connected by means of the above described joints 51, 52 and the slide connection device 71. Specifically, the slide connection device 71 is inserted into the groove portion 24 of the pole 2 in the above described manner and fixed at an arbitrary position. Then, the short beam 4 on which the joint 51 and the joint 52 are attached is connected to the slide connection device 71 using the through holes of the joint 51 and the screw holes 73b of the slide connection device 71.

Next, a description will be made how to mount a projector 8 on a beam 3 in the space structure 1 with reference to FIGS.

Figure 28:
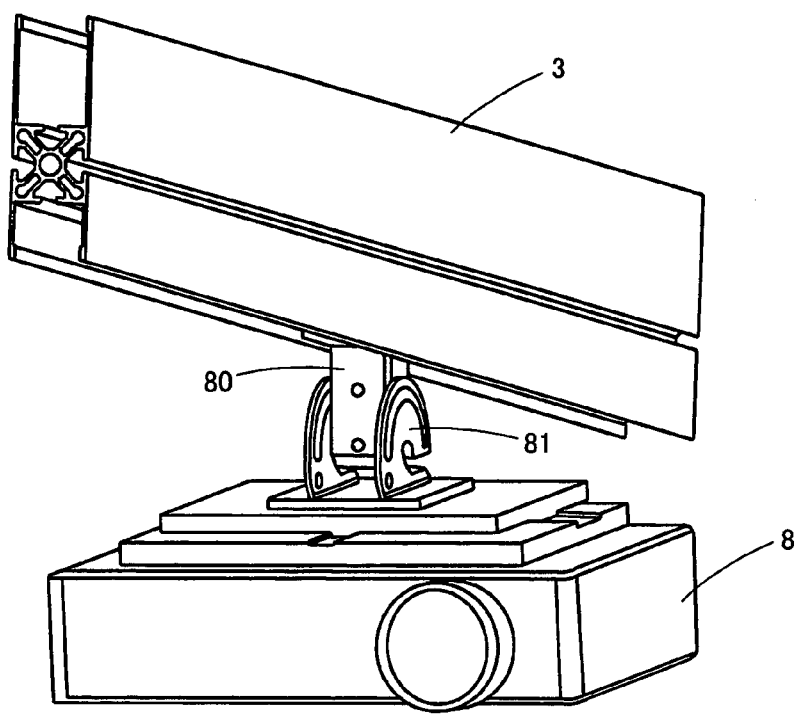
FIGS. 28(a) and 28(b) illustrate a projector that is connected in such a way as to be suspended from a beam in the space structure according to the embodiment of the present invention.
Figure 28:
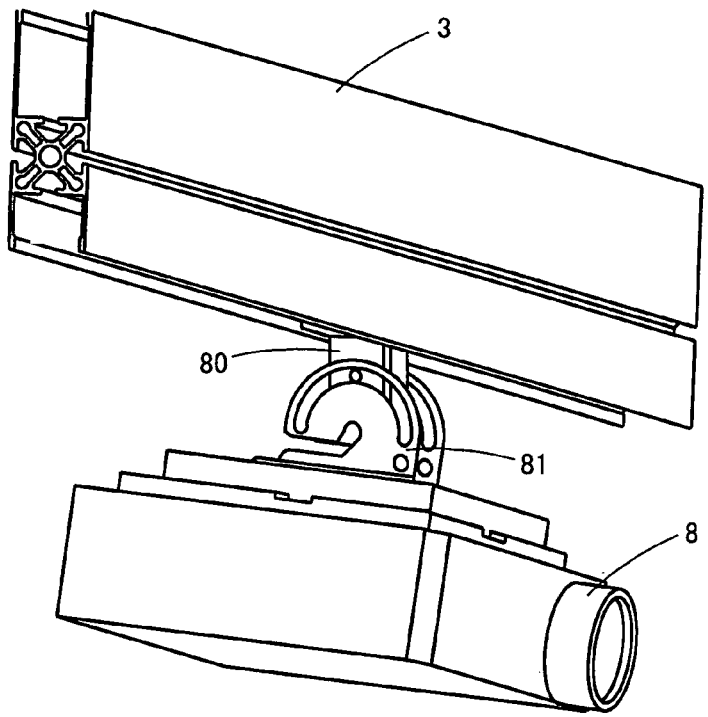

28(*a*), 28(*b*) and 29. As shown in FIGS. 28(*a*) and 28(*b*), the projector 8 is mounted on the beam 3 by means of joints 80, 81. The above described slide connection device 71 is inserted into the groove portion 34 on the vertically lower side of the beam 3 in advance. In other words, the projector 8 is mounted on the beam 3 in a suspended manner by attaching the joint 80 and the joint 81 to the screw holes 73*b* of the slide connection device 71 in the fixed state in the groove portion 34 and attaching the projector 8 to the joint 81.

Figure 29:
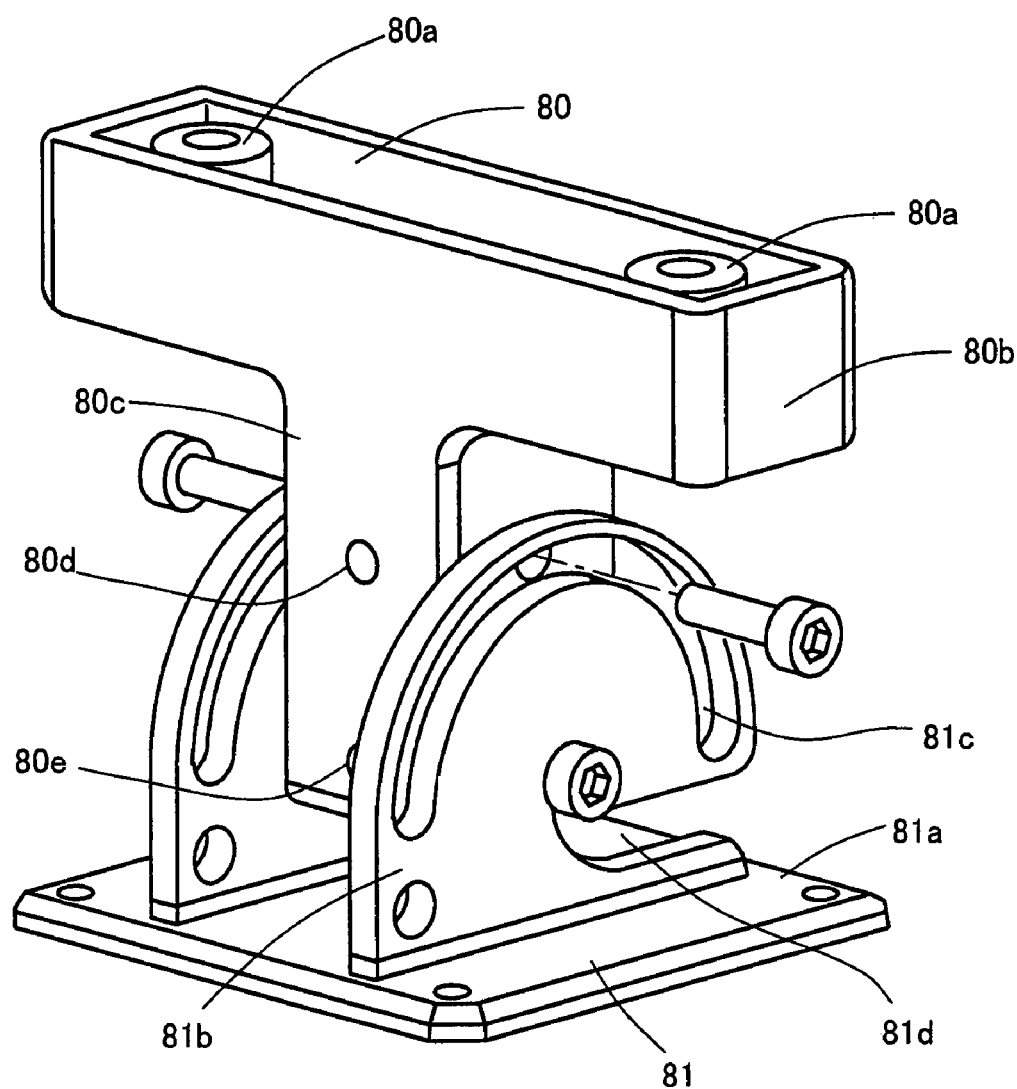
FIG. 29 shows the structure of two joints used in the connection shown in FIGS. 28(a) and 28(b).

Here, a description will be made of the structure of the joints 80 and 81 with reference to FIG. 29. The joint 80 is of a T-shape. The upper horizontal portion 80*b* thereof has through holes 80*a* provided near its both ends. The joint 80 also has a vertical portion 80*d* extending downwardly from the center of the horizontal portion 80*b*. The vertical portion 80*d* is of a rectangular column shape and has eight screw holes on four side surfaces, that is, screw holes 80*d* on the central portion thereof and screw holes 80*e* on the lower portion thereof. The joint 81 has a base plate 81*a* on which the upper portion of a projector 8 is to be attached and two angle adjustment plate 81*b* provided parallel to each other on the base plate 81*a*. Each of the angle adjustment plate 81*b* has an arc-shaped adjustment slot 81*c* provided therethrough. The angle adjustment plate 81*c* also has a support slot 81*d* provided on the lower portion thereof.

In the joints 80, 81 having the above described structure, the vertical portion 80*c* of the joint 80 is inserted between the two angle adjustment plates 81*b*. Screws are screwed into screw holes 80*d* provided on the central portion of the vertical portion 80*c* through the adjustment slots 81*c* of the joint 81. In addition, screws are screwed into the screw holes 80*e* provided on the lower portion of the vertical portion 80*c* through the bottom portion of the support slots 81*d*. In this structure, it is possible to change the position of the joint 80 relative to the joint 81 by swinging it about the lower screw holes 80*e*, and to retain it in an arbitrary position by tightening the screws. By fixedly attaching the joints 80, 81 that have been adjusted to a desired position to the slide connection device 71, it is possible to fixedly mount the projector 8 on the beam 3 in a suspended manner with an adjusted tilt angle.

Each of the four side surfaces of the vertical portion 80*c* has screw holes 80*d*, 80*e*. Therefore, it is possible to change the orientation of the projector 8 by an angle of 90 degrees by selectively using one of the two pairs of surfaces of the vertical portion 80*c* in coupling the joint 80 and the joint 81 as shown in FIGS. 28(*a*) and 28(*b*).

Figure 30:
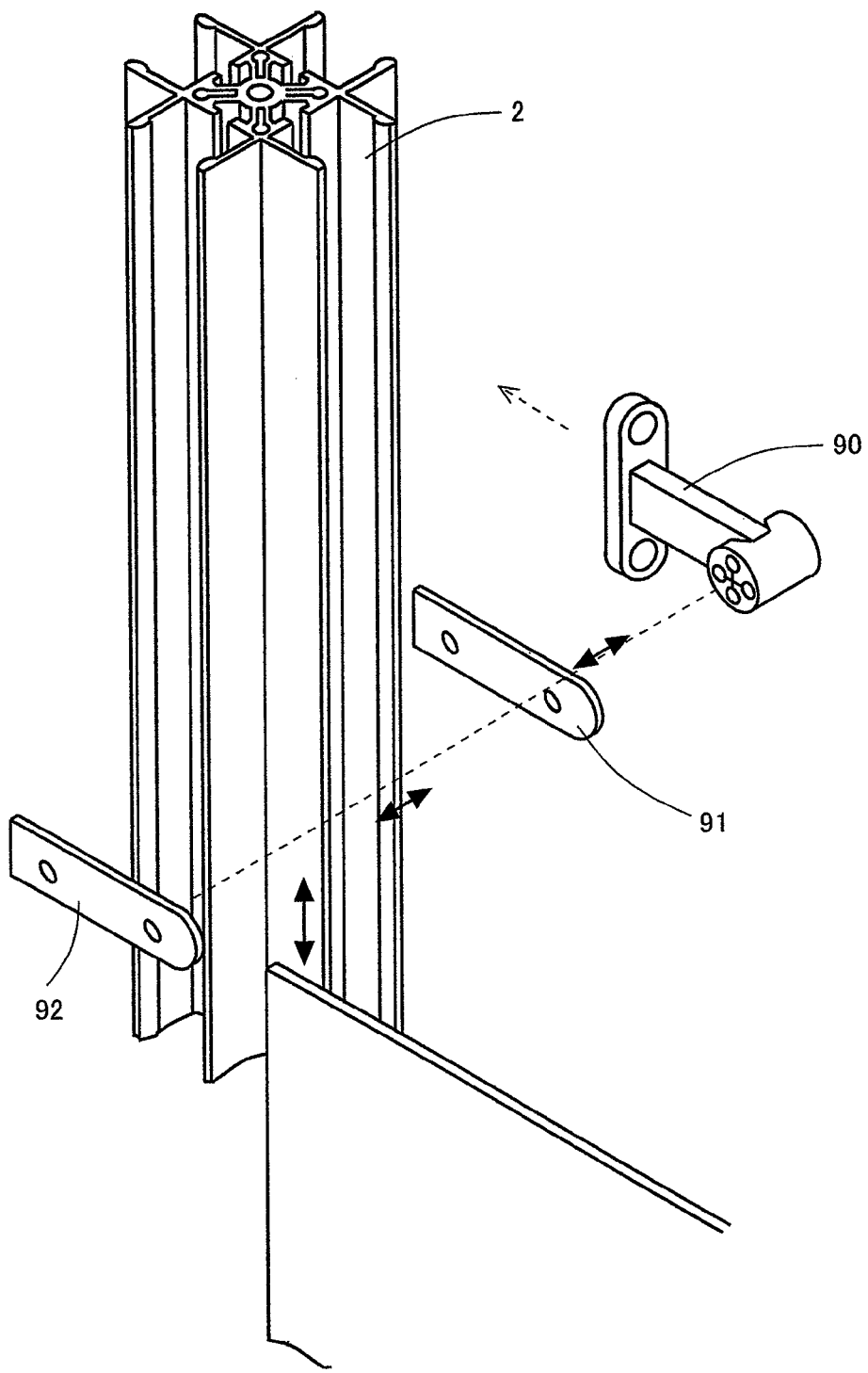
FIG. 30 illustrates how a glass panel is mounted on a pole in the space structure according to the embodiment of the present invention.
Figure 31:
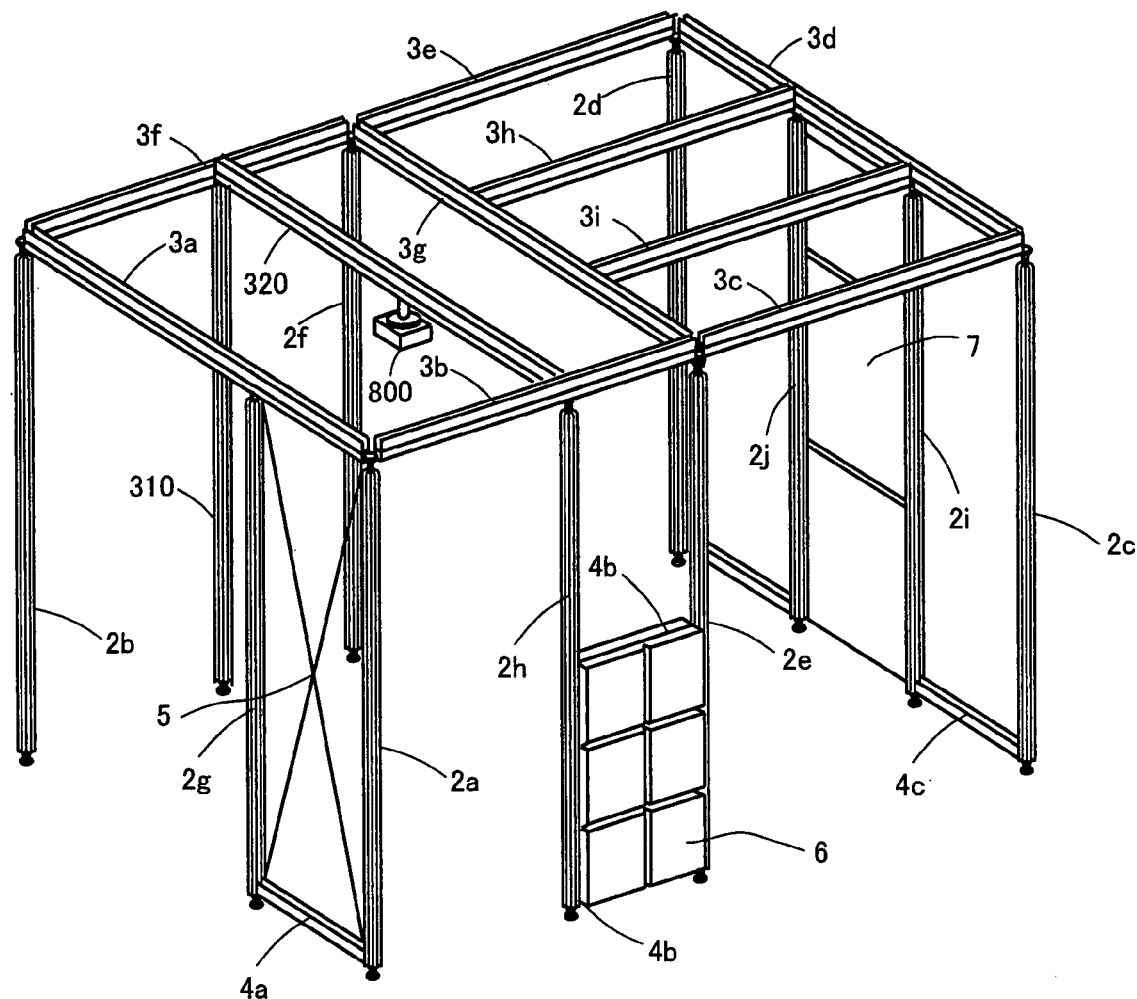
FIG. 31 schematically shows the configuration of the space structure shown in FIG. 1 to which a modification is made upon replacing a projector.

A flat panel such as a screen 8 or a glass plate, may be attached to a pole 2 or a beam 3 in a manner as shown in FIG. 30, if desired. Specifically, one of pieces of mounting hardware 91, 92 (or a back piece 91 and a front piece 92) for holding the panel therebetween to mount it is fixedly attached to a slide connection device 71 that is in the fixed state in the groove portion 24, 34 of a pole 2 or a beam 3 using a bracket that can be fixedly attached to the screw holes 73*b* of the slide connection device 71 by screws. Thus, the plate is attached to the pole 2 or the beam 3 at a desired position. Attachment of a flat panel such as a screen 8 or a glass plate will be described in detail later.

In the space structure having the above descried structure, it is easily possible, with the use of the slide connection device 71, to connect an additional pole 2 to a beam 3 or change the position of an already connected pole. This is also the case with connection of a pole 2 and a short beam 4 and with connection of beams 3 by means of the joints 60, 61 and 62.

As a concrete example, it is assumed here that to update a projector 8 as an information apparatus used in the space structure 1 shown in FIG. 1, it is replaced by a new projector 800. The new projector 800 has a focal length longer than that of the previous projector 8 and is heavier than it. In this case, an additional beam 300 is provided between beam 3*b* and beam 3*f* in the space structure 1 using the joints 60, 61 and 62. In addition, a pole 310 is additionally provided to support the connecting portion of the beam 300 and the beam 3*f* using the slide connection device 71 to add strength. In the space structure 1 according to the present invention, a pole(s) 2, a beam(s) 3 and/or a short beam(s) 4 that constitute it can be added or the position thereof can be changed easily upon various occasions such as replacement of an information apparatus.

Figure 32:
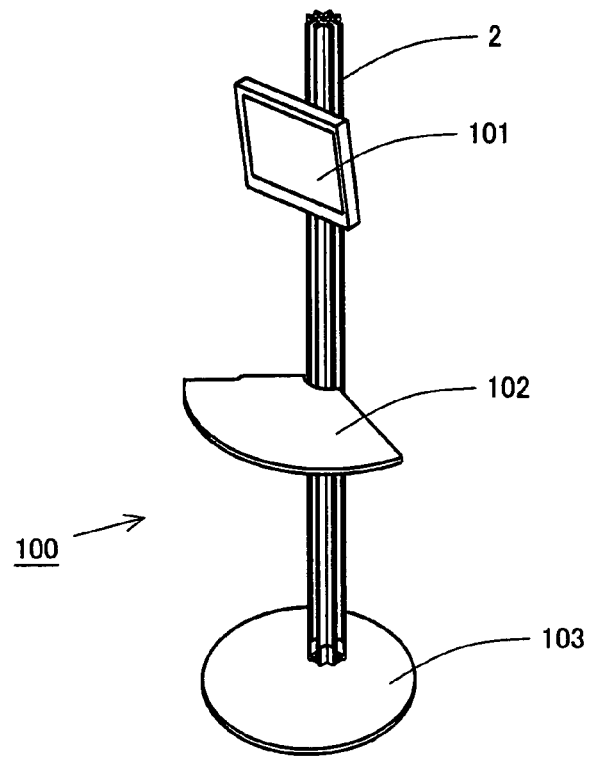
FIG. 32 schematically shows the configuration of a second space structure according to an embodiment of the present invention.
Figure 33:
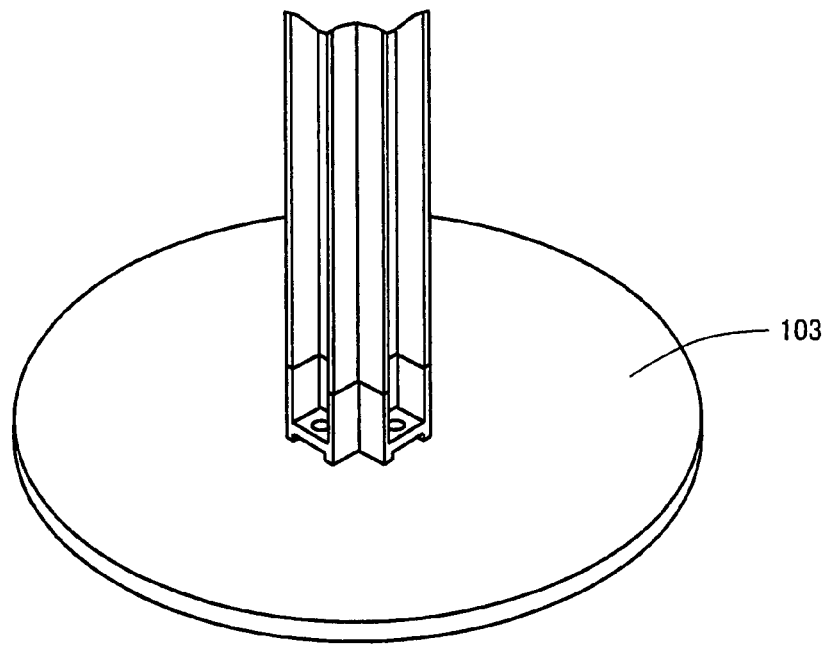
FIG. 33 shows a base support used in the space structure shown in FIG. 32.

As described before, structures other than the space structure 1 shown in FIG. 1 can also be constructed using the above described pole(s) 2, beam(s) 3 and short beam(s) 4 in combination. Some examples thereof are shown in FIGS. 32 to 35. FIG. 32 shows a space structure 100 that is constructed by one pole 2. To the space structure 100 are attached a display 101 and a table 102. In attaching these element, the above described slide connection devices 71 are used, thereby making it possible to fix the display 101 and the table 102 at arbitrary positions on the pole 2. FIG. 33 shows a disk-like base plate 103 as a base support for the pole 2. The diameter of the base plate 103 is determined in accordance with the length of the pole 2 and the weight of the articles fixedly attached to it.

Figure 34:
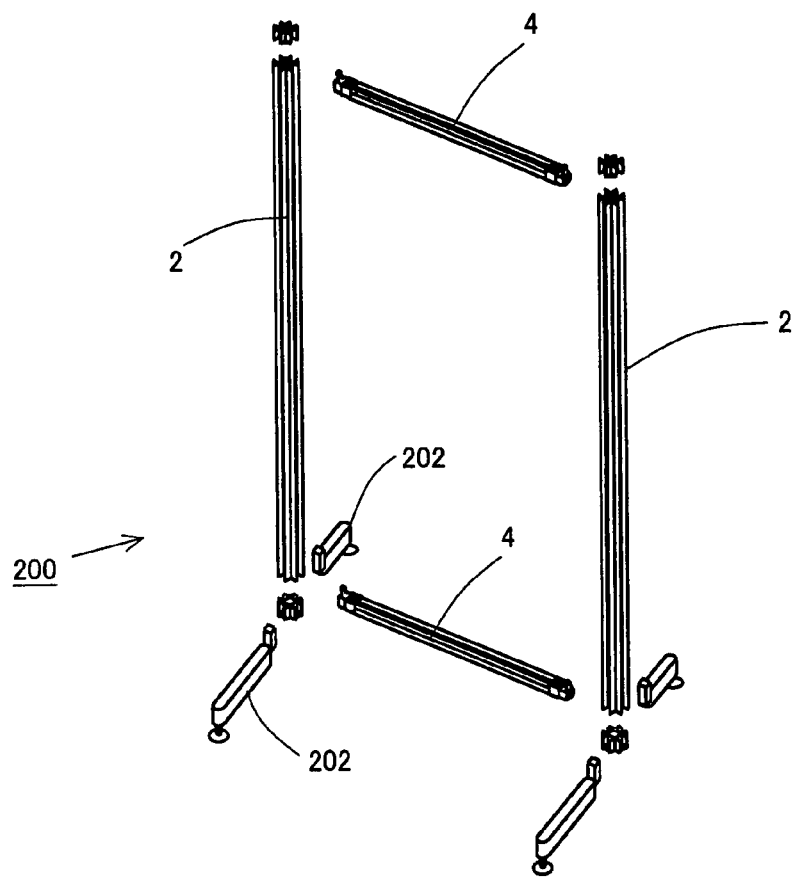
FIG. 34 schematically shows the configuration of a third space structure according to an embodiment of the present invention.

FIG. 34 shows a flat space structure 200 constructed by two poles 2 and two short beams 4. The poles 2 and the upper short beam 4 are connected using the above described slide connection device 71. The poles 2 and the lower short beam 4 are connected using anchor bases 201. The anchor base 201 is a joint attached to an end face of the pole 2. The anchor base 201 can be attached to the short beam 4 on which the aforementioned joint 52 is attached, via the aforementioned joint 51.

Figure 35:
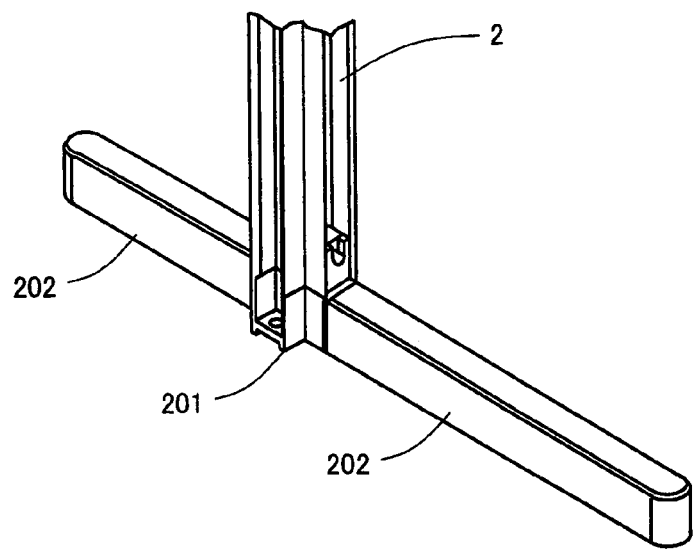
FIG. 35 shows a base support used in the space structure shown in FIG. 34.

Since a flat structure like this space structure 200 can easily fall down, support members 202 as shown in FIG. 35 are attached to the sides of the anchor bases 201 that are not used in attachment to the short beam 4. The support members 202 attached to the poles 2 can prevent the space structure 200 from falling down.

SECOND EMBODIMENT

A brace that can be used in the space structure 1 described in the first embodiment will be described with reference to drawings.

Figure 36:
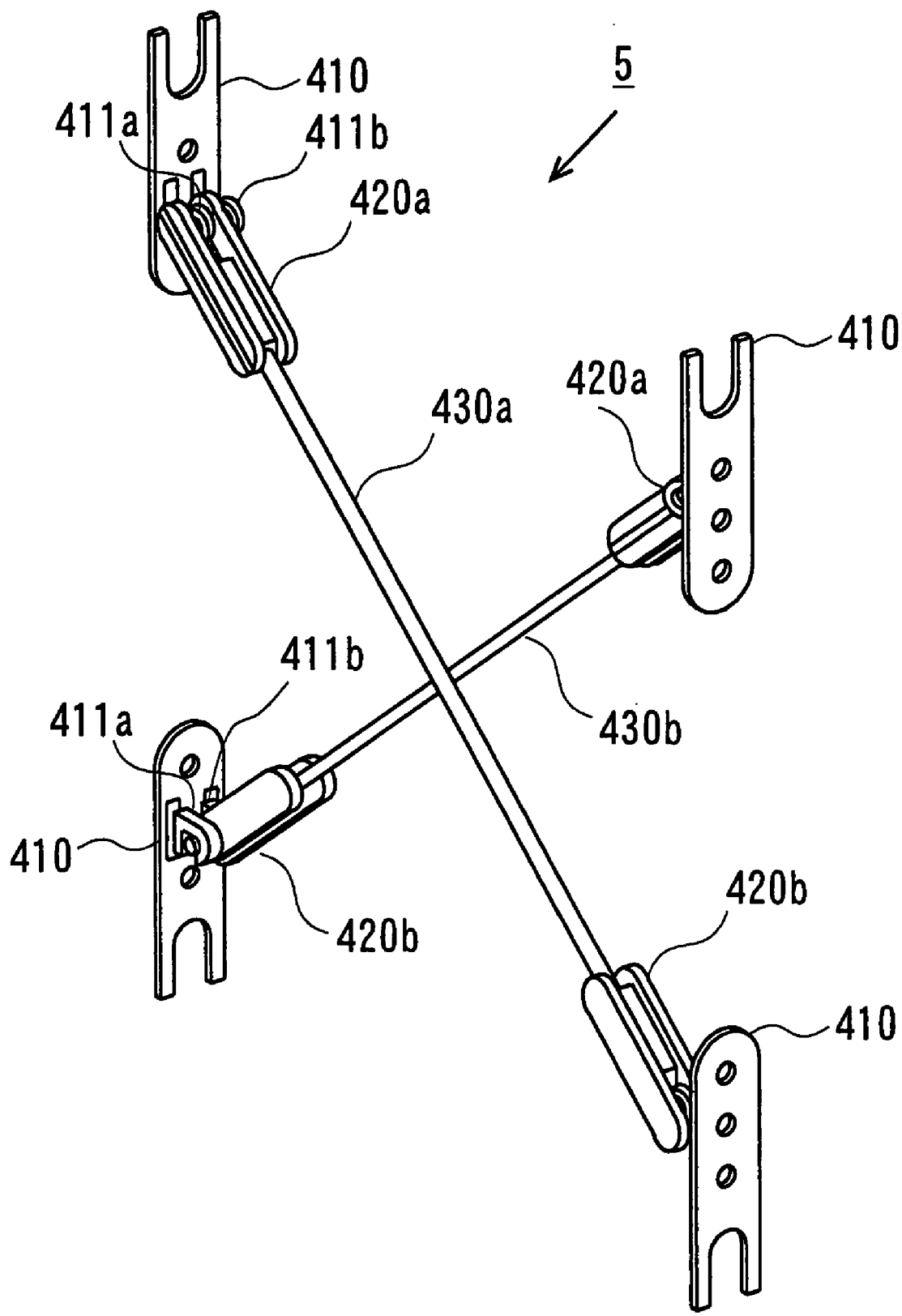
FIG. 36 illustrates how brace receiving members, brace connection members and a brace structure using them are arranged according to the embodiment.

FIG. 36 shows a configuration of a brace receiving member, a brace connection member and a brace structure 5 using them according to the present invention. As shown in FIG. 36, the brace structure 5 according to the present invention is constructed by two braces 430*a*, 430*b* arranged crosswise, brace connection members 420*a*, 420*b* attached to both ends of the braces 430*a*, 430*b*, and brace receiving members 410 attached to the brace connection members 420*a*, 420*b*. The brace receiving member 410 is attached to a pole having a rectangular frame structure or the like. Referring to details of the configuration of the braces 430*a*, 430*b*, one brace 430*a* is connected to the hooks 411*a* that are depicted as the front side hooks of the brace receiving members 410 (see the upper left member in FIG. 36) by means of the brace connection members 420*a*, 420*b*. The other brace 430*b* is connected to the rear side hooks 411*a* of the brace receiving members 410 (see the lower left member in FIG. 36) by means of the brace connection member 420*a*, 420*b*. In this embodiment, when seen in the state in which the end of the brace receiving member 410 having an open portion is oriented upward, the hook on the left will be referred to as hook 411*a* and the hook on the right will be referred to as hook 411b. In this embodiment, spiral threads provided on the respective end portions of each brace 430a, 430b are formed in different spiral directions. Accordingly, two types of brace connection members, to be connected thereto, having spiral threads formed in different spiral directions are prepared. To distinguish the two types of brace connection members easily from their appearance, one type of brace connection member 420a is marked with a line.

As per the above, the brace structure 5 according to this embodiment is provided with brace receiving members 410 each of which has hooks 411a and 411b arranged side by side, whereby the braces 430a and 430b are arranged without interfering with each other. Thus, reinforcement of a rectangular frame structure can be realized.

In the following, the brace receiving member 410 and the brace connection member 420a, 420b that constitutes the above described brace structure 5 will be described in more detail with reference to drawings.

Figure 37:
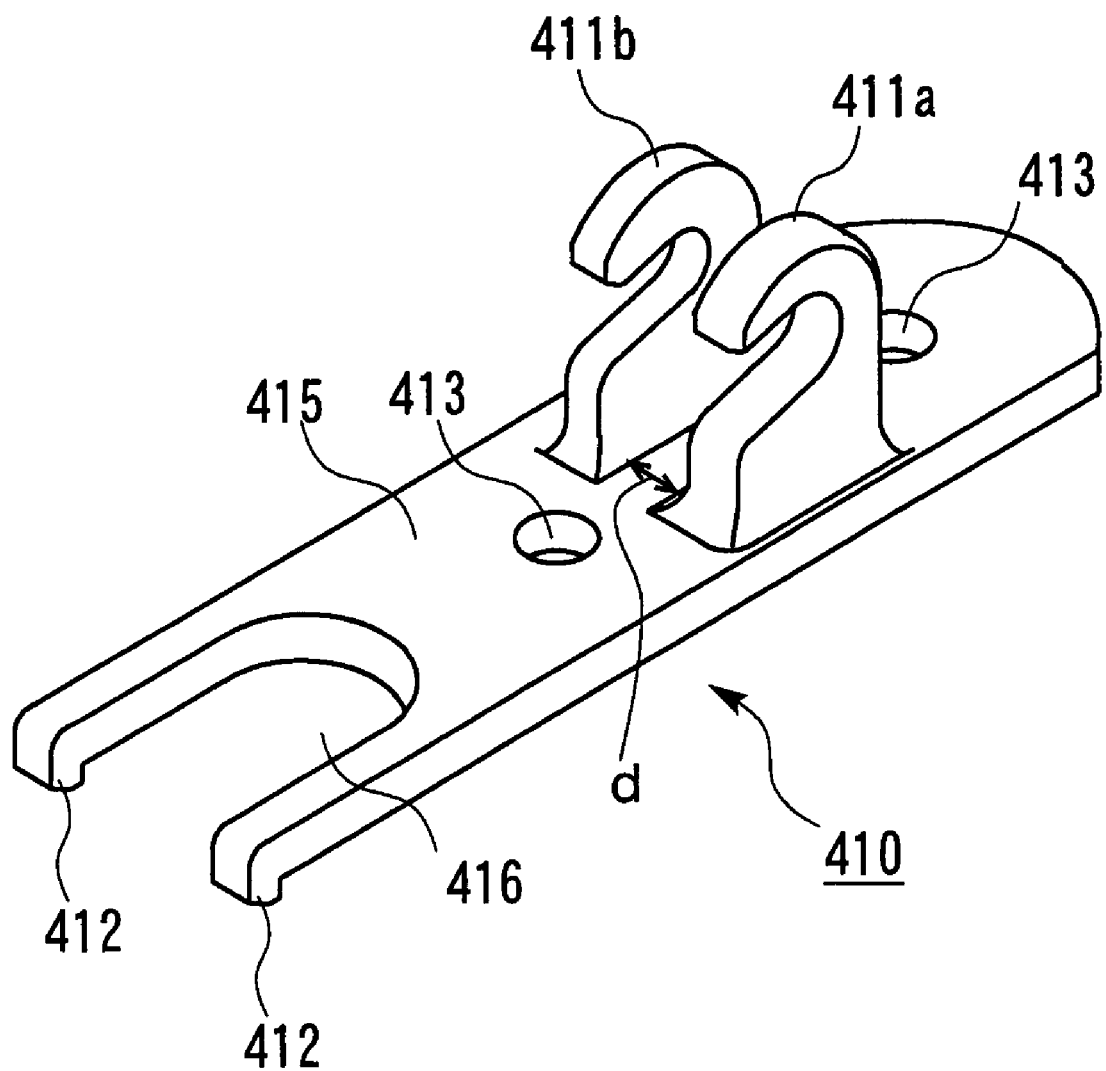
FIG. 37 is a perspective view of the brace receiving member according to the embodiment.

FIG. 37 is a perspective view of the brace receiving member 410 according to the present invention. As shown in this drawing, the brace receiving member 410 according to this embodiment is composed of a base plate 415 and hooks 411a and 411b provided on the base plate 415. The hooks 411a and 411b are arranged side by side with a predetermined distance therebetween and oriented in the same direction. With this structure, in a diagonal pair of brace receiving members 410, the front side hooks 411a are used, while in the other diagonal pair of brace receiving members 410, the back side hooks 411b are used, so that it is possible to set the braces 430a and 430b easily in the rectangular frame structure while preventing them from coming into contact with each other. Furthermore, by using the brace receiving members 410 according to the present invention, it is possibly not only to set the braces 430a and 430b easily in the rectangular frame structure, but also to achieve sufficient strength without depending on the skill of the builder of the structure, since the positioning of the two braces 430a, 430b used in a cross pattern is achieved.

As illustrated in FIG. 37, the brace receiving member 410 according to this embodiment is further provided with a hole 413 through which a securing member such as a bolt is to be inserted, tongues 412 and a U-shaped open portion 416. Thus, it is possible to fix it on a pole or the like by inserting a securing member such as a bolt through the hole 413. The tongues 412 can be used in positioning the brace receiving member 410 on a pole for fixation by, for example, providing in advance recesses that correspond to the tongues 412 arranged with a predetermined distance therebetween along the longitudinal direction on the pole on which the brace receiving member 410 is to be fixedly attached. In addition, by providing the U-shaped open portion 416 in the longitudinally upper portion of the base plate 415 as shown in FIG. 37, the weight of the brace receiving member 410 can be reduced. Furthermore, by providing the U-shaped open portion 416 on the side toward which the ends of the aforementioned hooks 411a and 411b are directed, the orientation of the brace receiving member 410 or the orientation of the hooks 411a, 411b can be easily judged by checking the position of the open portion 416.

Figure 38:
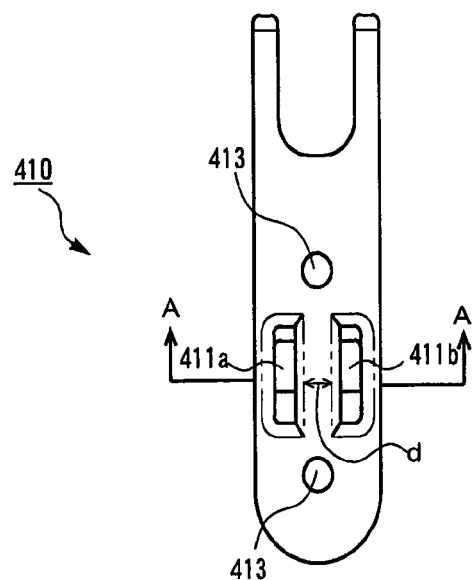
FIG. 38 shows the brace receiving member according to the embodiment.
Figure 38:
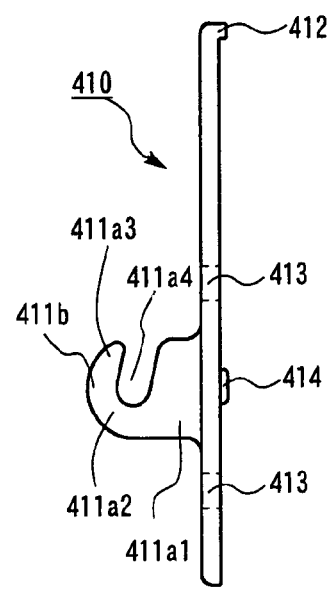
Figure 38:
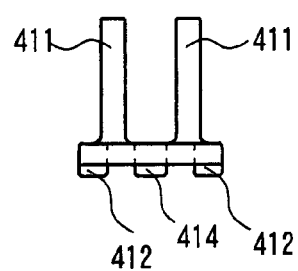

FIGS. 38(a) to 38(c) show the brace receiving member 410 according to this embodiment. FIG. 38(a) is a plane view, FIG. 38(b) is a side view, and FIG. 38(c) is a cross sectional view taken along line A-A in FIG. 38(a). As will be seen in FIGS. 38(a) and 38(b), the hooks 411a and 411b are provided on the base plate 415 with a certain distance d therebetween. It is preferred that the distance d be larger than the diameter of the braces 430a, 430b so that contact of the brace 430a and brace 430b with each other can be prevented. Referring to the shape of the hook 411a, 411b as shown in FIG. 38(b), it has a base portion 411a1 provided on the base plate 415 and a curved portion 411a2 that extends from the base portion 411a1 to an end portion 411a3 in a curved manner. In addition, an open portion 411a4 extending toward the curved portion 411a2 is provided between the base portion 411a1 and the end portion 411a3. In this embodiment, the hooks 411a, 411b and the base plate 415 are fastened together using a fastening member 414. The backside portion of the fastening member 414 projects beyond the backside surface of the base plate 415. By providing a recess corresponding to the backside portion of the fastening member 414 on the surface of the pole to which the brace receiving member 410 is to be fixedly attached, it is possible to position the brace receiving member 410 on the pole more precisely utilizing the backside potion of the fastening member 414 in addition to the tongues 412.

Figure 39:
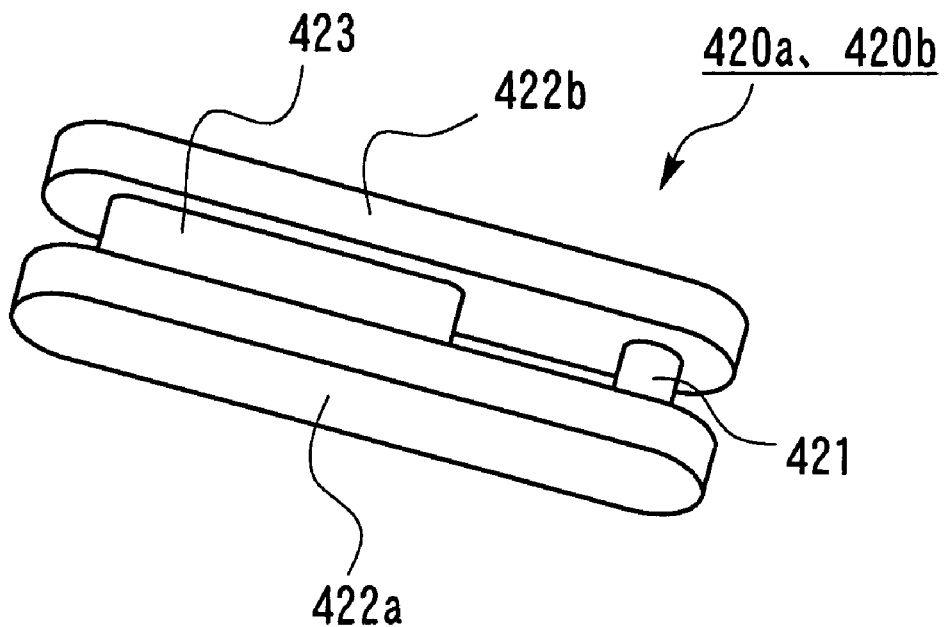
FIGS. 39(a) and 39(b) show the brace connection member according to the embodiment.
Figure 39:
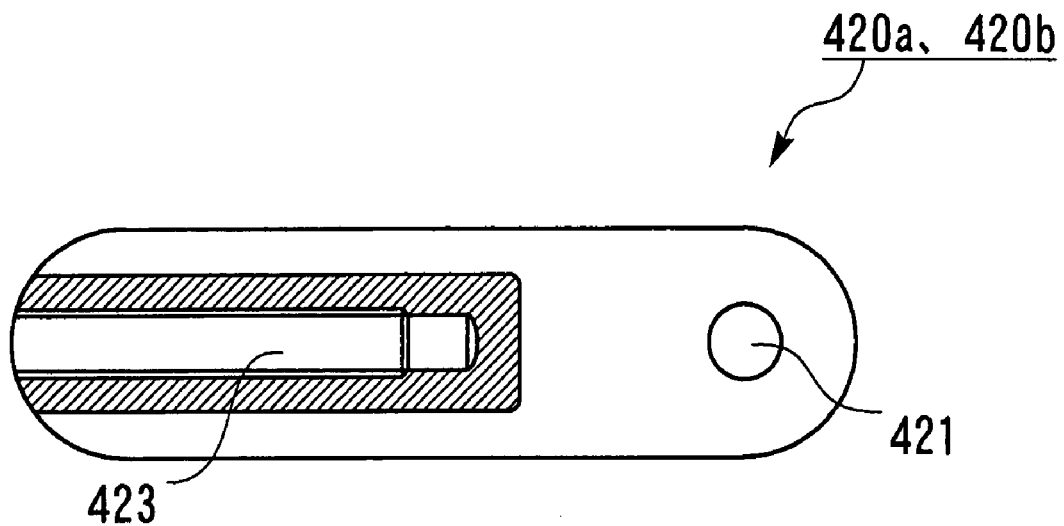

FIGS. 39(a) and 39(b) show the brace connection member 420a, 420b according to this embodiment. FIG. 39(a) is a perspective view of the brace connection member 420a, 420b according to this embodiment, and FIG. 39(b) is a cross sectional view thereof. As shown in FIG. 39(a), the brace connection member 420a, 420b according to this embodiment has an engaging portion 421 for engaging a hook 411a, 411b of a brace receiving member 410 and a length adjustment portion 423 to be connected with a brace 430a, 430b to adjust the length of the brace 430a, 430b. In this embodiment, the engaging portion 421 in the form of a rod-like member is fixedly attached between a pair of plate-like members 422a, 422b perpendicularly thereto. As shown in FIG. 39(b), the length adjustment portion 423 has a bore, and a spiral thread complementary to one of the spiral threads (coupling portions) formed on the surface of both end portions of the brace 430a, 430b is provided on the inner circumferential surface of the bore so that it can engage said one of the spiral threads. With this feature, it is possible to adjust the length of the brace 430a, 430b easily by rotating the brace 430a, 430b and the brace connection member 420a, 420b relative to each other. The spiral direction of the spiral thread provided on the length adjustment portion 423 of the brace connection member 420a is different from that of the brace connection member 420b in accordance with the feature that the spiral directions of the spiral threads respectively provided on the surface of both end portions of each brace 430a, 430b are different from each other.

Figure 40:
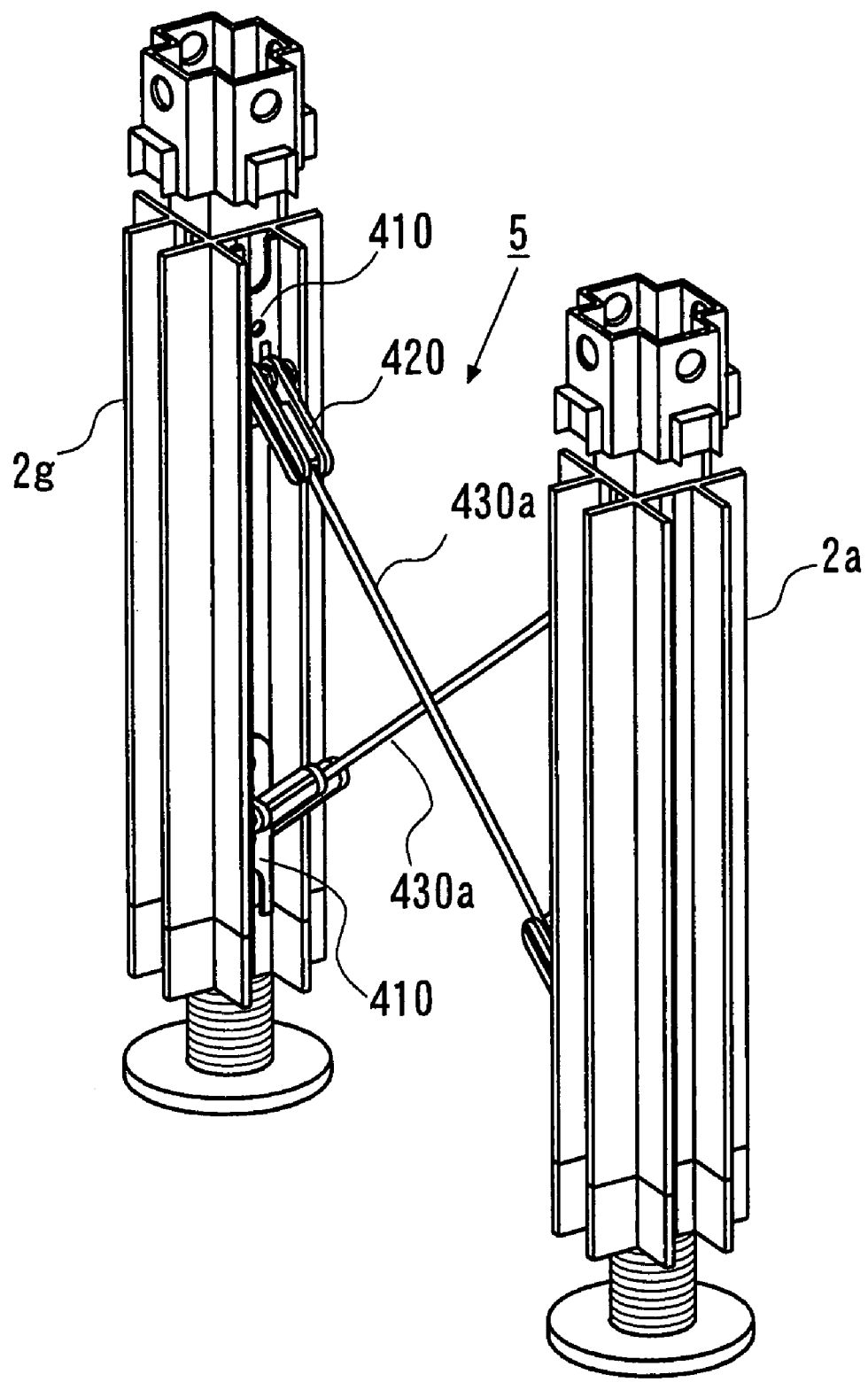
FIG. 40 is an enlarged view of the brace structure according to the embodiment.

FIG. 40 is an enlarged view of the brace structure 5 according to the present invention that is used in the space structure 1 shown in FIG. 1. As shown in FIG. 1, the brace structure 5 according to this embodiment can be used in a space structure 1 constructed in an office to effectively reinforce the space structure 1. By connecting the braces 430a and 430b respectively to the hooks 411a and 411b of the corresponding brace receiving members 410 via the brace connection members 420a and 420b, it is possible to arrange the braces 430a and 430b while preventing their contact with each other.

Next, a description will be made of how to construct the brace structure 5 according to this embodiment with reference to FIGS. 36, 37 and 40. First, four brace receiving members 410 are fixedly attached on the poles 2a and 2g. It is preferred that recesses corresponding to the tongues 412 (see FIG. 37) are provided in advance on each pole 2a, 2g with a predetermined distance. This makes it possible to easily position the brace receiving members 410 by fitting the tongues 412 into the recesses. The brace receiving members 410 may be fixedly attached on the poles 2a, 2g using fastening members such as bolts. The brace receiving members 410 attached on the upper portions of the poles 2a, 2g are oriented in such a way that the ends of the hooks face upward. The brace receiving members 410 attached on the lower portions of the poles 2a, 2g are oriented in such a way that the ends of the hooks face downward. In other words, the brace receiving members 410 that are attached at diagonal positions or at both ends of one brace 430a, 430b are oriented in the directions opposite to each other. Since the brace receiving member 410 according to this embodiment is provided with an open portion 416, the vertical orientations thereof can be easily distinguished.

After attachment of the brace receiving members 410 to the poles 2a, 2g is finished, the braces 430a, 430b are connected to the brace receiving members 410. One end of the rear (in FIGS. 36 and 40) brace 430b, among the braces 430a, 430b that are set in a cross pattern, is connected with the hook 411b of the upper left (in FIGS. 36 and 40) brace receiving member 410 and the other end thereof is connected with the hook 411b of the lower right (in FIGS. 36 and 40) brace receiving member 410 respectively via the engaging portions 421 of the brace connection members 420a, 420b. After connection of the brace 430b is finished, the front (in FIGS. 36 and 40) brace 430a is connected in a similar way. In these process, the length of the brace 430a, 430b including the brace connection members 420a, 420b has been adjusted to be larger than the distance between the diagonal hooks in advance, and after hooking the engagement portions 421 of the brace connection members 420a, 420b coupled to both ends of the brace 430a, 430b on the hooks 411a, 411b, the brace connection members 420a, 420b and the brace 430a, 430b are rotated relative to each other so that the length thereof is shortened to an appropriate length that is suitable in reinforcing the rectangular frame structure including the poles 2a, 2g. In this way, it is possible to build, by an easy process, the brace structure 5 that provides sufficient reinforcement and in which the braces 430a and 430b do not come into contact with each other.

Although a preferred embodiment of the present invention has been described, the brace receiving member, brace connection member and brace structure using them are not limited to those described herein, but they include any possible combination thereof.

THIRD EMBODIMENT

Next, a detailed description will be made of a way of attaching a flat panel such as a screen 8 or a glass plate to poles 2 and/or beams 3 of the space structure 1 according to the first embodiment using a flat plate mounting device.

Figure 41:
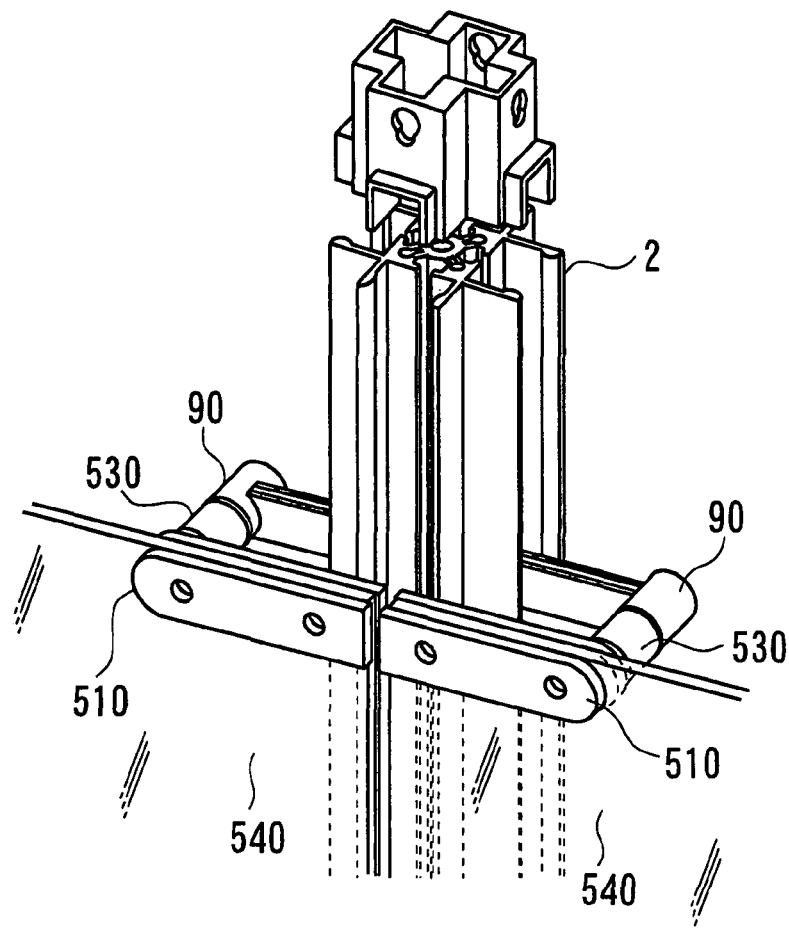
FIG. 41 is a perspective view showing how a flat plate fixing device according to the embodiment is connected to a pole.
Figure 42:
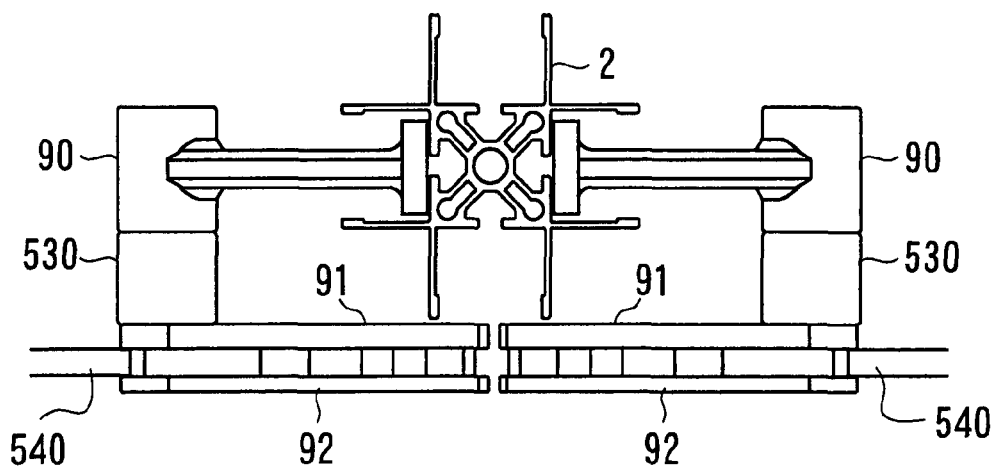
FIG. 42 is a top view showing how the flat plate fixing device according to the embodiment is connected to a pole.

FIG. 41 is a perspective view showing a state in which flat plate mounting devices are attached to a pole 2. FIG. 42 is a plan view showing the same state. As shown in FIG. 41, each flat plate mounting device is composed of a flat plate holding member 510, a bracket 90 fixedly attached on the pole 2 and an adjuster 530 set between the flat plate holding member 510 and the bracket 90. Here, the flat plate is a glass panel 540, which is held by the flat plate holding member 510. The flat plate holding member 510 is connected to the adjuster 530, which in turn is connected to the bracket 90. In the illustrated case, two brackets 90 are respectively attached to opposite sides of the pole 2, and two glass panels 540 are arranged on the front side of the pole 2 in such a way that their lateral edges are adjacent to each other.

As shown in FIG. 42, the flat plate holding member 510 is composed of a front plate 92 and back plate 91, and the glass panel 540 is held between these plates. The back plate 91 of the flat plate holding member 510 has a plurality of through holds through which a bolt is inserted for connection with the adjuster 530. The position at which the back plate 91 is connected with the adjuster 530 can be changed by changing the through hole through which the bolt is inserted. Details of the back plate 91 will be described later. The through holes constitute the adjusting means according to the present invention.

In this flat plate mounting device, it is possible to change the mounting position of the glass plate 540 by changing the position at which the back plate 91 is connected with the adjuster 530 and by changing the axial length of the adjuster 530 without changing the position at which the bracket 90 is fixedly attached on the pole 2. More specifically, it is possible to change the position of the glass panel 540 laterally by changing the position of connection of the back plate 91 and the adjuster 530. In addition, it is possible to change the position of the glass panel 540 backward and forward by changing the axial length of the adjuster 530.

Next, a detailed description will be made of the flat plate holding member 510, the bracket 90 and the adjuster 530 that constitute the flat plate mounting device 510 with reference to drawings.

Figure 43:
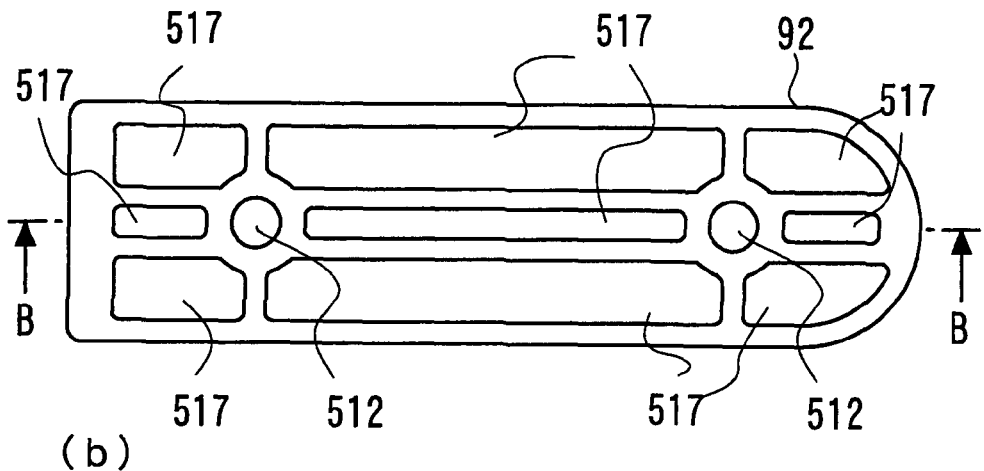
FIGS. 43(a) to 43(c) show a front plate that composes the flat plate holding member according to the embodiment.
Figure 43:
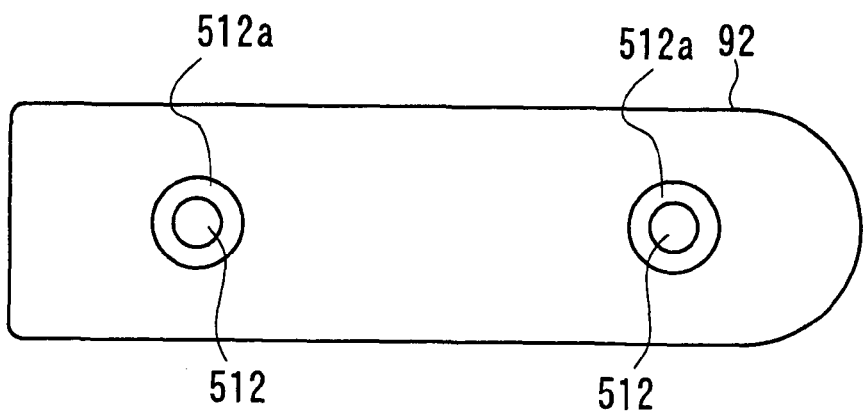
Figure 43:
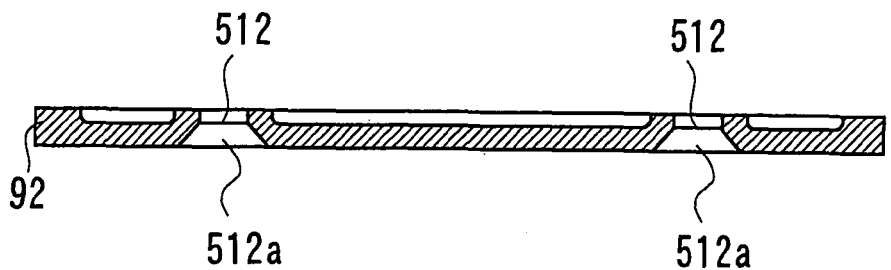

FIGS. 43(*a*), 43(*b*) and 43(*c*) show the front plate 92 of the flat plate holding member 510. FIG. 43(*a*) is a front view of the front plate 92, FIG. 43(*b*) is a rear view of the front plate 92 and FIG. 43(*c*) is a cross sectional view taken along line B-B in FIG. 43(*a*). As shown in FIG. 43(*a*), the front plate 92 has two holes 512 provided in the vicinity of the longitudinal center line thereof with a predetermined distance there between, through which screws serving as fastening members are to be inserted to fixedly attaching the front plate to the glass panel 540. One end of the front plate 92 has a semicircular shape. By this feature one can easily know the orientation of the front plate 92.

As shown in FIGS. 43(*b*) and 43(*c*), a plurality of recesses are provided on the backside of the front plate 92. This helps in reducing the weight of the front plate 92 and enhancing its strength. In addition, a head receiving recess 512a complementary to the shape of the screw head is also provided to prevent the head of the screw inserted into the hole 512 from projecting beyond the surface of the front plate 92.

Figure 44:
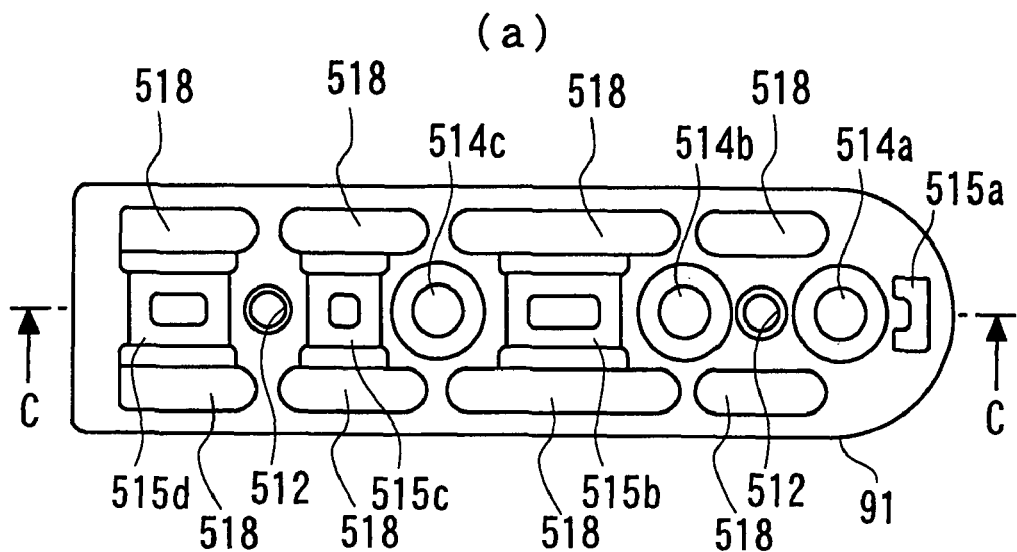
FIGS. 44(a) to 44(c) show a back plate that composes the flat plate holding member according to the embodiment.
Figure 44:
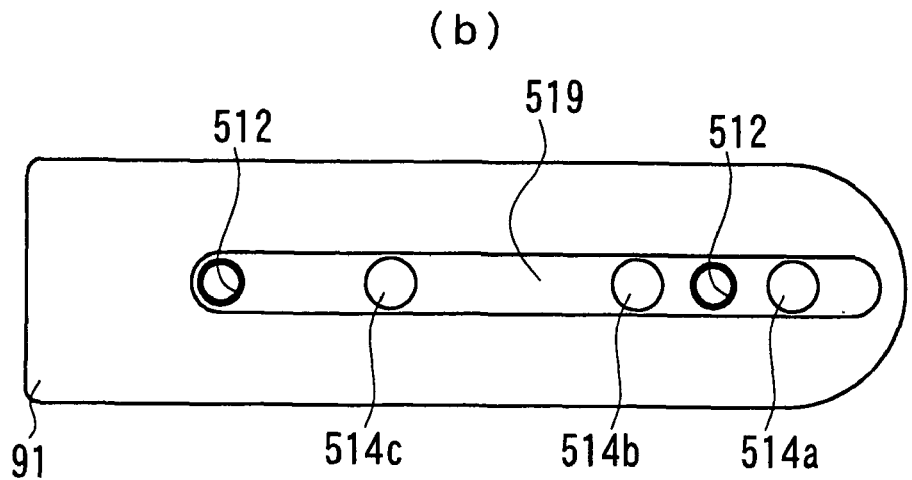
Figure 44:
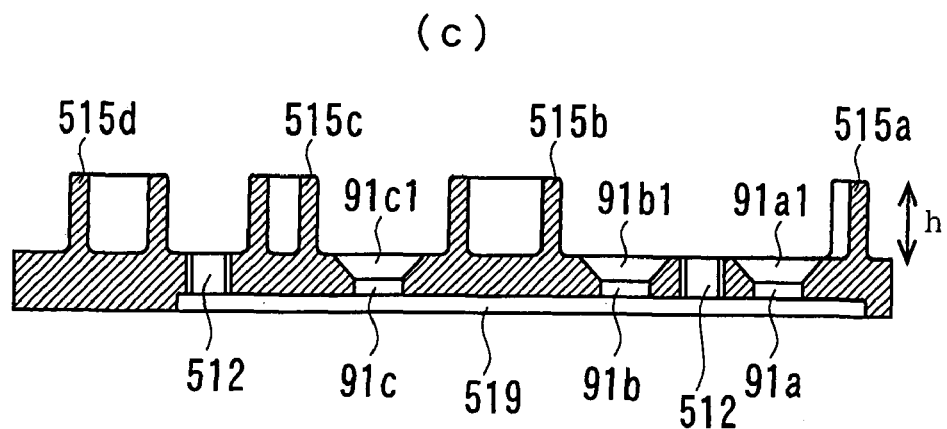

FIGS. 44(*a*), 44(*b*) and 44(*c*) shows the back plate 91 of the flat plate holding member 510. FIG. 44(*a*) is a front view of the back plate 91, FIG. 44(*b*) is a rear view of the back plate 91, and FIG. 44(*c*) is a cross sectional view taken along line C-C in FIG. 44(*a*). It will be understood that the front view of the back plate 91 presented as FIG. 44(*a*) shows the surface of the back plate 91 that is to be in contact with the glass panel 540. As shown in FIG. 44(*a*), the back plate 91 has two holes 512 provided at the positions corresponding to the holes on the above descried front plate 92. The holes on the back plate 91 are used in securing it on the glass plate 540 held between the front and rear plates by means of screws. Through holes 514a, 514b, 514c are holes used in connecting the back plate 91 with the adjuster 530 using bolts and constitute the adjusting means according to the present invention. When the back plate 91 and the adjuster 530 are connected at the through hole designated by reference sign 514a, the glass panels 540 can be positioned in such a way that their lateral edges are adjacent to each other in front of the pole 2 (see FIG. 41). When the back plate 91 and the adjuster 530 are connected at the through hole designated by reference sign 514b, the glass plates 540 can be mounted at a position displaced away from the pole 2 in the lateral direction (see FIG. 48 (*a*)). The through hole designated by reference sign 514c may be used in the case that the glass plates 540 is to be mounted at positions displaced further away from the pole 2 in the lateral direction than in the case where the through hole 514b is used, namely in the case where the distance between the glass panels 540 is to be made larger.

As per the above, by changing the through hole 514*a*, 514*b*, 514*c* used (the through holes 514*a*, 514*b* and 514*c* constituting the adjusting means according to the present invention), it is possible to change the horizontal position of the glass panels 540 freely. This is very advantageous when, for example, another member is placed in front of the pole. For example, in the case where the original design that glass panels 540 are arranged with their lateral edges being adjacent to each other like constituting a single wall is to be changed to meet a later requirement such as to provide a display etc. on the pole.

On the back plate 91 are provided a plurality of projecting portions 515*a*, 515*b*, 515*c*, 515*d* to pass through the glass panel 540 to hold it. On the glass panel 540 also are provided holes corresponding to these projecting portions 515*a*, 515*b*, 515*c*, 515*d* so that the glass panel 540 is held between the back plate 91 and the front plate 92, whereby load on the back plate 91 can be partly relieved. It is preferred that the shapes of the above mentioned projecting portions 515*a*, 515*b*, 515*c*, 515*d* be substantially rectangular, and their height be equal to the thickness of the glass plate 540. The back plate 91 is also provided with a plurality of recesses 518. This helps in reducing the weight of the back plate 91 and enhancing its strength.

FIG. 44(*b*) is a rear view of the back plate 91, and FIG. 44(*c*) is a cross sectional view taken along line C-C in FIG. 44(*a*). As shown in these drawings, the back plate 91 is provided with holes 512 for allowing attachment of the back plate 91 to the glass panel 540 and through holes 514*a*, 514*b*, 514*c* for allowing connection with the adjuster 530 using bolts. The back plate 91 is further provided with a groove portion 519 that conform with the width and height of a projecting portion 532 (which will be described later) provided on the connection surface of the adjuster 530. This facilitates positioning when connecting the groove portion 519 and the projecting portion 532 of the adjuster 530. This also makes it possible to prevent rotation of the adjuster 530 after connected. As shown in FIG. 44(*c*), by providing recesses or countersinks 91*a*1 to 91*c*1 around the through holes 91*a* to 91*c* respectively, the heads of bolts or nuts can be received therein.

Figure 45:
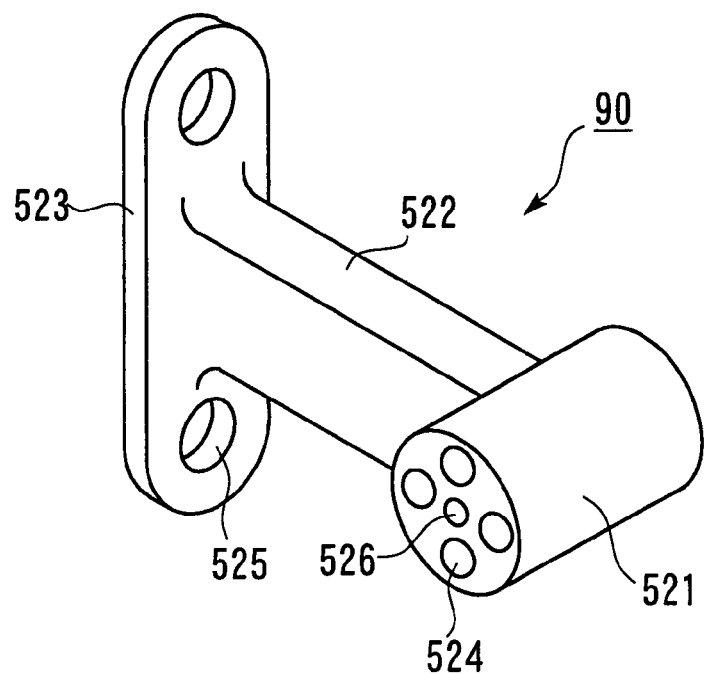
FIGS. 45(a) and 45(b) are perspective views of a bracket and an adjuster according to the embodiment.
Figure 45:
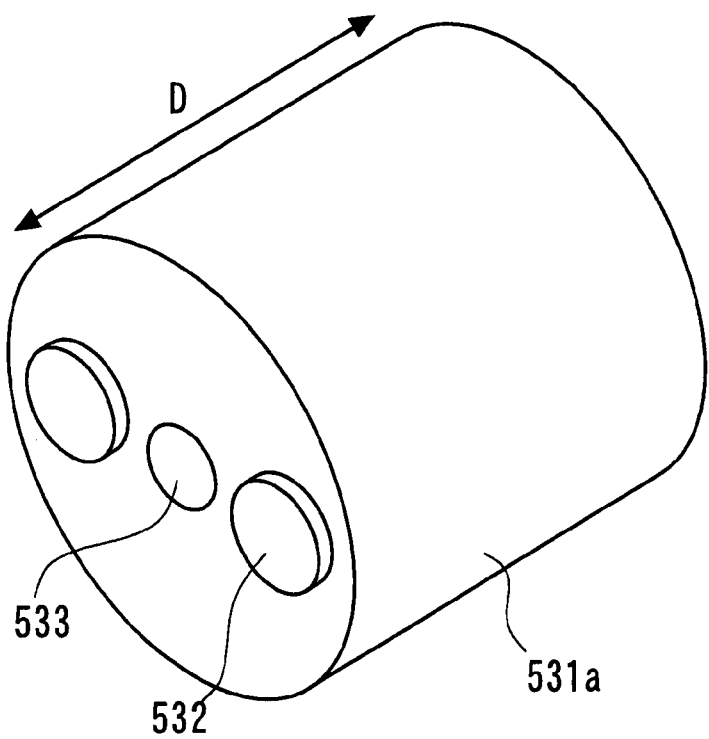
Figure 46:
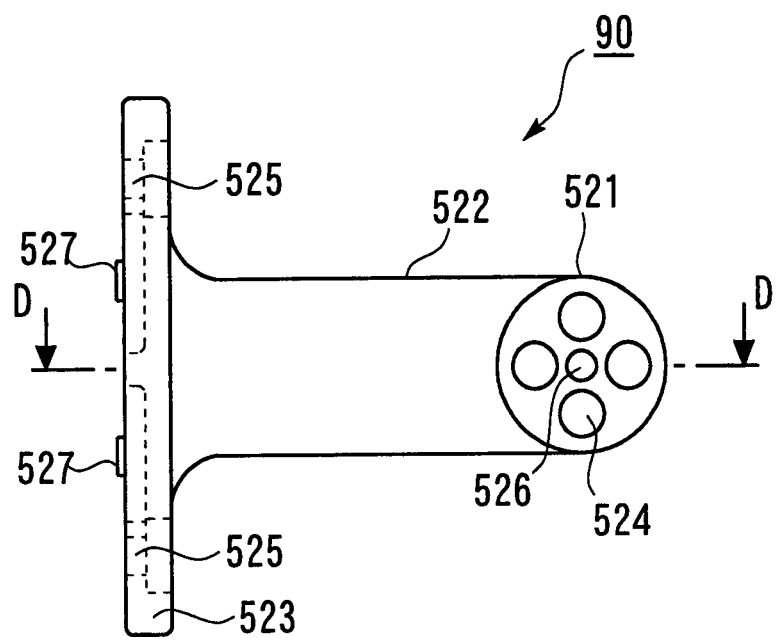
FIGS. 46(a) to 46(c) show details of the bracket according to the embodiment.
Figure 46:
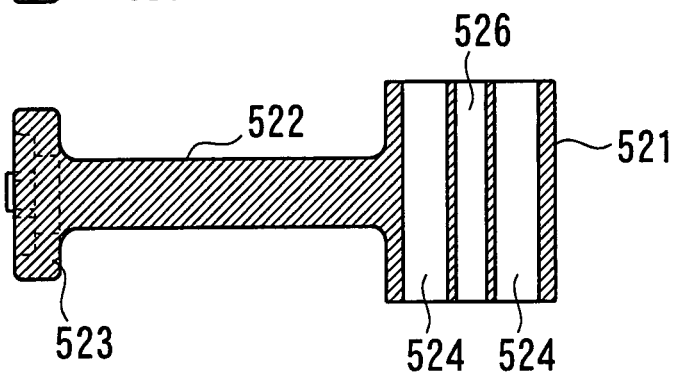
Figure 46:
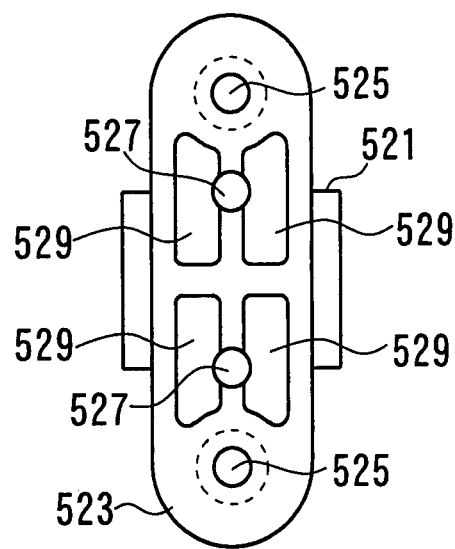
Figure 47:
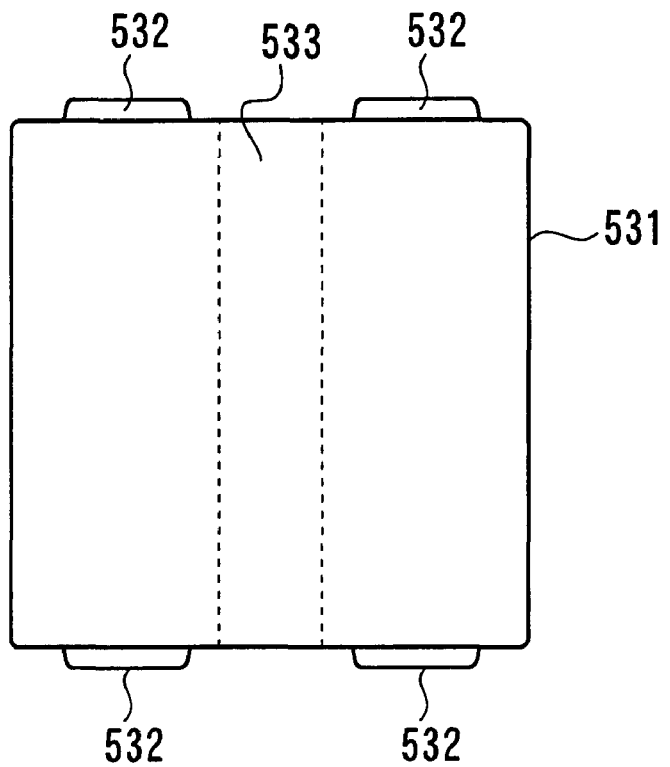
FIGS. 47(a) and 47(b) show details of the adjuster according to the embodiment.
Figure 47:
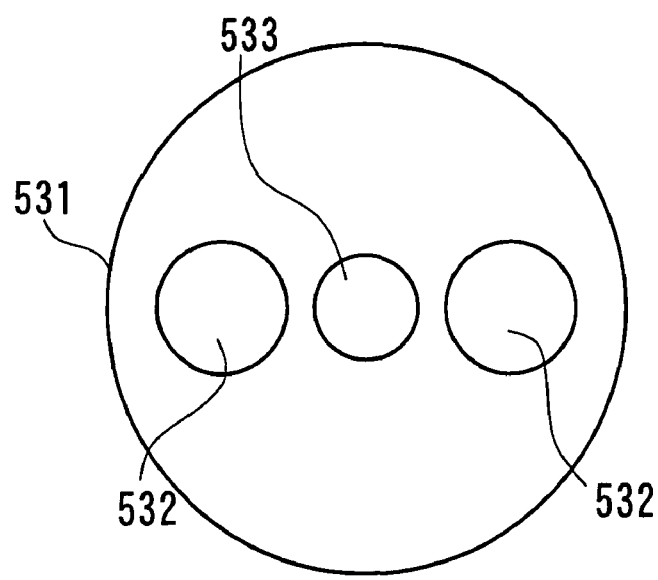

FIGS. 45(*a*) and 45(*b*) are perspective views of the bracket 90 and the adjuster 530 respectively. FIGS. 46(*a*) to 46(*c*) illustrate the bracket 90 in detail. FIGS. 47(*a*) and 47(*b*) illustrate the adjuster 530 in detail. More specifically, FIG. 46(*a*) is a front view, FIG. 46(*b*) is a cross sectional view taken along line D-D in FIG. 46(*a*) and FIG. 46(*c*) is a side view as seen from left of FIG. 46(*a*). FIG. 47(*a*) is a top view, and FIG. 47(*b*) is a front view.

As shown in FIG. 45(*a*), the bracket 90 is comprised of a fixed portion 523 to be fixed on the pole 2, a connection portion 521 to be connected with the adjuster 530 and an arm portion 522 extending between the fixed portion 523 and the connection portion 521. As shown in FIGS. 46(*a*) and 46(*b*), the arm portion 522 and the connection portion 521 of the bracket forms a T-shape, the connection portion 521 provided at the end of the arm portion 522 is horizontally symmetrical with respect to the axis of the arm portion 522, and the fixed portion 523 adjacent to the arm portion 522 is also vertically symmetrical with respect to the axis of the arm portion 522. With these features, it is possible to use the bracket without paying attention to its orientation when attaching it to the pole 2. The connection portion 521 has a cylindrical shape, though the shape thereof is not limited to this.

The fixed portion 523 has holes 525 through which fastening members such as bolts are to be inserted through in order to fix it on the pole 2. The connection portion 521 has a hole 526 through which a bolt is inserted in order to connect it with the adjuster 530 and four recessed portions 524 to be fitted with the projecting portions 532 provided on the connection surface of the adjuster 530. In this embodiment, the recessed portions 524 provided on both the opposite connection surfaces are in communication with each other to form through holes. The connection portion 521 may be connected with another member. The another member may be, for example, a beam. In this case, projecting portion complementary to the recessed portions 524 may be provided on the connecting sectional surface of the beam. Thus, the bracket 90 can be connected to other members such as a beam.

As shown in FIGS. 46(*a*) and 46(*c*), projecting portions 527 are provided on the fixed portion 523. By providing a groove associate with the projecting portions 527 extending in the vertical and/or horizontal direction of the pole 2, positioning of the bracket 90 on the pole 2 can be achieved easily. Reference numerals 529 in FIG. 46(*c*) designate recessed portions, with which the weight of the fixed portion 523 can be reduced and its strength can be enhanced.

As shown in FIG. 45(*b*), the adjuster 530 is comprised of an adjuster member 531*a* having an axial length D. The adjuster member 531*a* has a hole 533 provided about its center axis thereof, through which a fastening member such as a bolt is inserted to connect it with the back plate 91. On the connection surface of the adjuster member 531*a* are provided projecting portions 532 to be fitted with the connection portion 521 of the bracket 90 and the groove portion 519 of the back plate 91. This facilitates positioning upon connecting the adjuster to these elements.

By changing the axial length D of the adjuster 530, it is possible to change the position of the glass panel 540 frontward and rearward. In this embodiment, the axial length D is made larger than the distance between the connection surface of the back plate 91 with the adjuster 530 and the connection surface of the bracket 90 with the adjuster 530. Thus, the glass panel 540 can be disposed in front of the pole 2.

Next, another embodiment of the flat plate mounting device will be described with reference to drawings. The elements same as those described before will be designated by the same reference numerals, and detailed descriptions thereof will be omitted.

Figure 48:
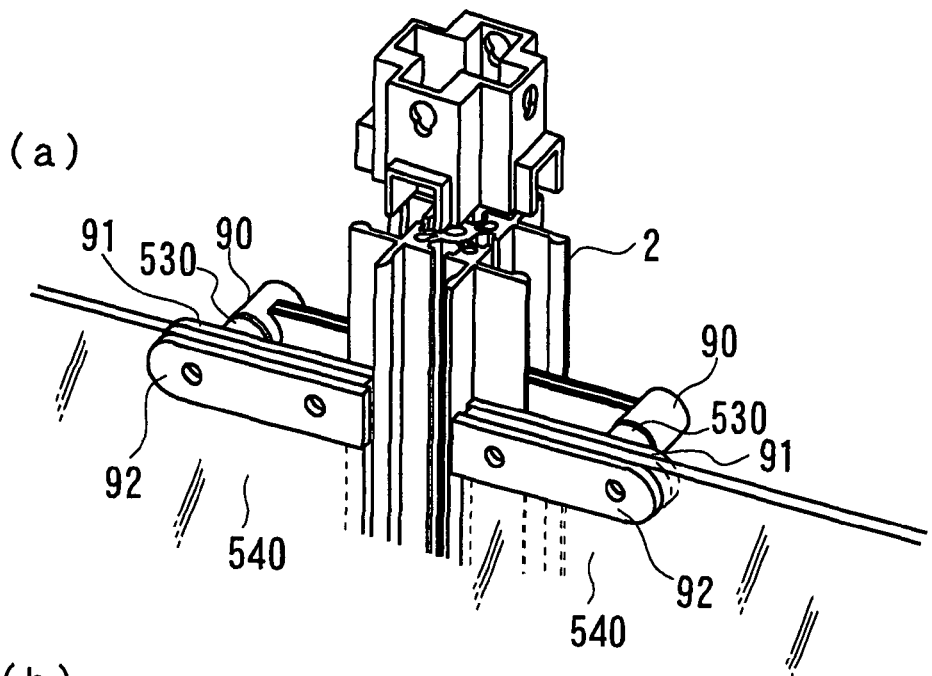
FIGS. 48(a) to 48(c) illustrate the flat plate fixing device according to the embodiment.
Figure 48:
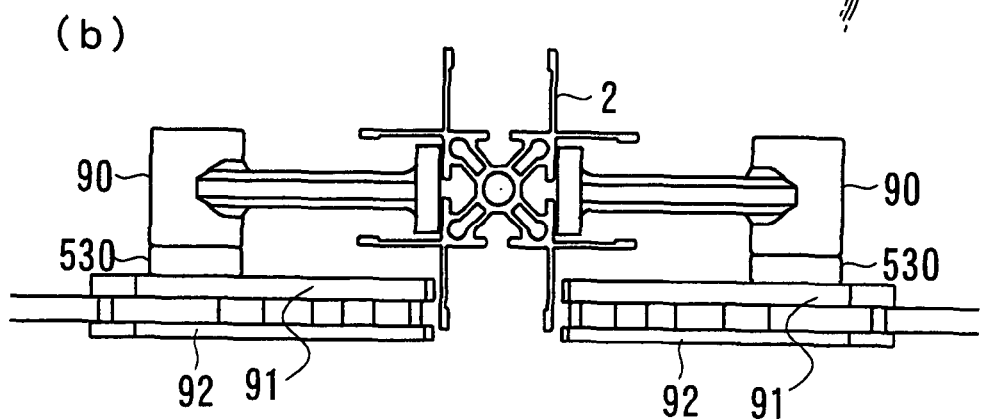
Figure 48:
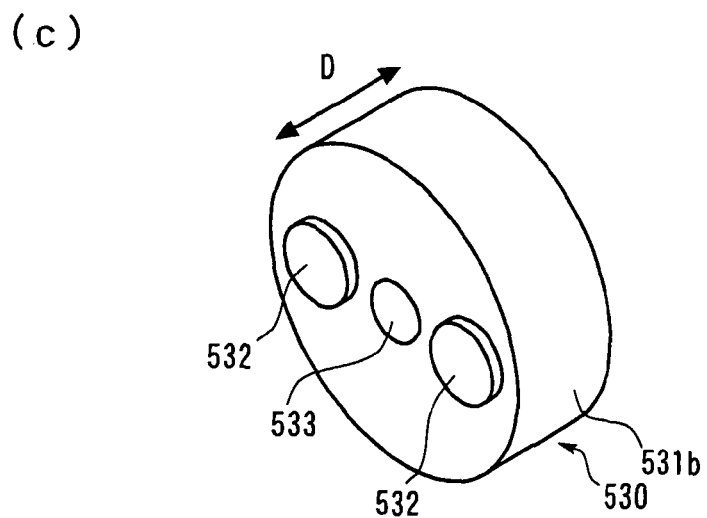

FIGS. 48(*a*), 48(*b*) and 48(*c*) show a flat plate mounting device according to this embodiment. FIG. 48(*a*) is a perspective view showing a state in which the flat plate mounting device is attached to a pole 2. FIG. 48(*b*) is a top view showing the same state as FIG. 48(*a*), and FIG. 48(*c*) is a perspective view of an adjuster 530. What is different in this embodiment from the above described flat plate mounting device is the position at which the glass panels 540 are mounted. In this embodiment, the glass panels 540 are horizontally displaced from the pole 2, while in the above described embodiment, the lateral edges of the glass panels 540 are adjacent to each other in front of the pole 2. This arrangement allows, for example, to connect another member to the front surface of the pole 2. In addition, while in the above described embodiment, the front surfaces of the glass panels extend beyond the frontmost edge of the pole 2, in this embodiment, the frontmost edge of the pole 2 and the front surfaces of the glass panels 540 are kept substantially flush with each other. Thus, it is possible to effectively utilize the limited space partitioned by the glass panels 540.

In this embodiment, since the positions at which the glass panels 540 are mounted are displaced horizontally from the pole 2, the axial length of the adjuster 530 is made shorter than that in the above described embodiment, and the position of connection of the adjuster 530 and the back plate 91 is made closer to the pole 2. More specifically, the through hole used in the back plate 91 is one designated by reference sign 514b, and the adjuster 530 used is one comprised of an adjuster member 531b that has an axial length D shorter than the distance between the connection surface of the back plate 91 with the adjuster 530 and the connection surface of the bracket 90 with the adjuster 530. In this way, by preparing a plurality of adjusters 530 having predetermined axial lengths and selecting one of them in combination with a mount position determined by the adjusting means of the flat panel holding member 510, it is possible to change the mounting position of the glass panel 540 without changing the fixing position of the bracket 90.

Figure 49:
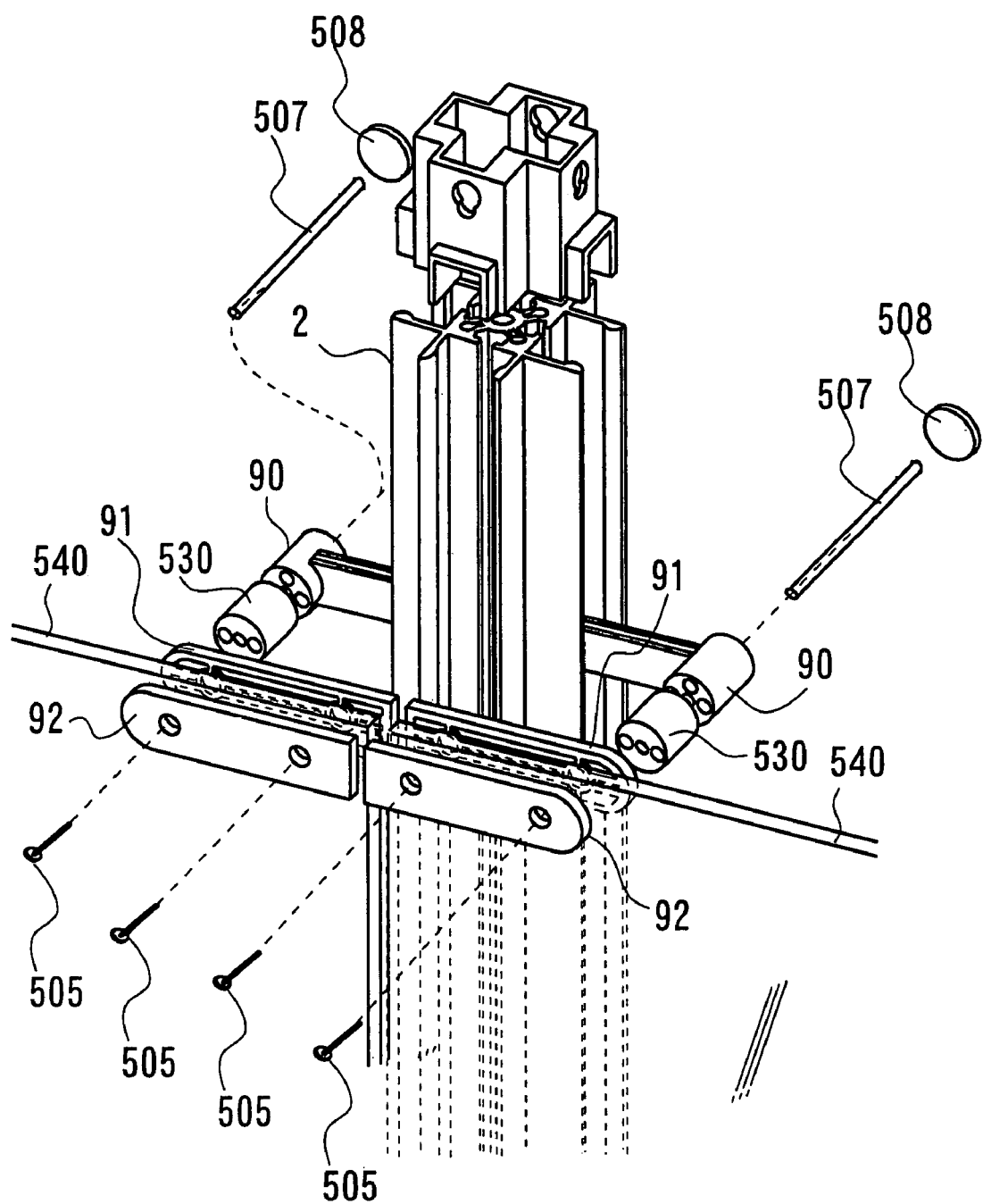
FIG. 49 is a perspective view showing the flat plate fixing device according to the embodiment in an exploded state.

Next, a description will be made of how the flat plate mounting device according to the present invention is used with reference to FIG. 49. FIG. 49 is an exploded perspective view of the flat plate mounting device according to the above described embodiment.

First, the brackets 90 are fixed on the respective lateral side surfaces of the pole 2 at a predetermined height. The flat plate mounting device is characterized in that the mount position of the glass panel 540 can be changed without changing the fixing position of the bracket 90 fixed on the pole 2 or the position of the pole 2 itself. Therefore, the following description will be directed to a case where the fixing position of the bracket 90 is not changed in principle, but the mount position of the glass panel 540 may be changed along the vertical direction by changing the fixing position of the bracket 90.

The front plate 92 and the back plate 91 are attached to the upper corner of each glass panel 540 in such a way as to sandwich the glass panel 540 therebetween, and fastened by screws 505. After that, the adjuster 530 is set between the back plate 91 and the connection portion 521 of the bracket 90, then a bolt 507 is inserted through these parts to fasten them, and then a cap 508 is attached. In this embodiment, the through hole of the back plate used is one designated by reference sign 514a, and the adjuster 530 used is one comprised of the adjuster member 531a. By these choices, the glass panels 540 are arranged in front of the pole 2 with their lateral edges being adjacent to each other (see FIG. 41). In this embodiment, a special bolt 507 having no head is inserted from the backside in FIG. 49, but the invention is not limited by this particular feature. A bolt 507 may be inserted into the through hole 514a from the side of the back plate 91 that is in contact with the glass panel 540 (i.e. from the front in FIG. 49).

Next a description will be made of the way of changing the mount position of the glass panel 540 horizontally away from the pole 2. First, the bolt 507 is removed to separate the back plate 91, the adjuster 530 and the bracket 90. This time, the through hole of the back plate 91 used is one designated by reference sign 514b and the adjuster 530 used is comprised of the adjuster member 531b. Then, the adjuster 530 is set between the back plate 91 and the connection portion 521 of the bracket 90, then a bolt 507 is inserted through these parts to fasten them again. In this way, the mount position of the glass panel can be changed freely by a very simple process. In the case where the bolt 507 for securing is inserted from the side of the back plate 91 that is in contact with the glass panel 540, the back plate 91 is once detached from the glass panel 540, then the bolt 507 is inserted into the through hole 514b and fastened to the bracket 90 with the adjuster 530 being set therebetween, and finally they are fixedly attached to the glass panel 540 again.

Although preferred embodiments of the present invention has been described in the foregoing, the flat plate mounting apparatus according to the present invention is not limited to the illustrated embodiments, but may include any possible combination thereof.

INDUSTRIAL APPLICABILITY

As per the above, in a space structure constructed with information apparatuses used therein, it is possible to design new space structure easily to flexibly adapt it to newly developed information apparatuses or replacement of information apparatuses.

What is claimed is:

1. A space structure comprising:
   at least one post member extending upwardly from a floor and each post member having at least one post member groove portion each of which constitutes a semi-closed space having a bottom and having an opening portion that faces in a direction perpendicular to an axial direction of the post member, each post member groove portion extending along at least a portion of the axial direction of the post member, each post member groove portion including opposing inner wall surfaces, angled such that the distance between said opposing inner wall surfaces decreases in a direction away from the opening portion and toward the bottom of the post member groove portion;
   at least one horizontal beam member extending parallel to the floor and each horizontal beam member having at least one horizontal beam member groove portion which constitutes a semi-closed space having an opening portion that faces in a direction perpendicular to an axial direction of the horizontal beam member, each horizontal beam member groove portion extending along at least a portion of the axial direction of the horizontal beam member, each horizontal beam member groove portion including opposing inner wall surfaces;
   connection means for connecting said post member to said horizontal beam member, the connection means being configured to be moved axially inside one of the post member groove portion and the horizontal beam member groove portion to any selected position along the axial direction thereof and being configured to be fixed at said selected position;
   wherein said connection means can be slid axially along said one of the post member groove portion and the horizontal beam member groove portion, and can be fixed at said selected position along said one of the post member groove portion and the horizontal beam member groove portion;
   wherein said connection means includes a first part and a second part, the first part being positioned inside said open portion of one of the post member groove portion and the horizontal beam member groove portion, a protruding portion of the second part protruding out from the opening portion of said one of the post member groove portion and the horizontal beam member groove portion such that said protruding portion is graspable for moving the connection means along said one of the post member groove portion and the horizontal beam member groove portion, when the connection means is fixed all of the second part is contained inside said one of the post member groove portion and the horizontal beam member groove portion;
   wherein said connection means comprises a base member that can be moved inside said post member groove portion or said horizontal beam member groove portion and a biasing member that biases said base member against a portion in the vicinity of the opening portion of said post member groove portion or said horizontal beam member groove portion, wherein said base member and said biasing member can be separated from each other; and wherein said base member and said biasing member are operable to be placed in a non-separated state in the fixing state and are operable to be placed in a separated state in the sliding state.

2. A space structure according to claim 1 further comprising an optional member other than said post members and said horizontal beam members, said optional member constituting a part of said space structure, wherein in the case where said connection means is present in said post member groove portion, said connection means is connected to said optional member through the opening portion of the post member groove portion, and in the case where said connection means is present in said horizontal beam member groove portion, said connection means is connected to said optional member through the opening portion of the horizontal beam member groove portion.

3. A space structure according to claim 2, wherein said optional member is a member that is suspended downwardly, said horizontal beam member has a horizontal beam member groove portion having said opening portion that opens vertically downwardly, and said connection means is present in said horizontal beam member groove portion and connected to said optional member through the opening portion of said horizontal beam member groove portion.

4. A space structure according to claim 3, wherein said at least one horizontal beam member has at least two horizontal beam member groove portions with said opening portions opening vertically upwardly and vertically downwardly, each of said two horizontal beam member groove portions has opposed walls opposed to each other that extend along the axial direction of said horizontal beam member and project beyond said horizontal beam member groove portions, and the height of the opposed walls of the horizontal beam member groove portion that opens vertically upwardly is higher than the height of the opposed walls of the horizontal beam member groove portion that opens vertically downwardly.

5. A space structure according to claim 2, wherein said at least one horizontal beam member has at least two horizontal beam member groove portions with said opening portions opening vertically upwardly and vertically downwardly, each of said two horizontal beam member groove portions has opposed walls opposed to each other that extend along the axial direction of said horizontal beam member and project beyond said horizontal beam member groove portions, and the height of the opposed walls of the horizontal beam member groove portion that opens vertically upwardly is higher than the height of the opposed walls of the horizontal beam member groove portion that opens vertically downwardly.

6. A space structure according to claim 1, wherein in the sliding state said biasing member limits a free movement of said base member in said post member groove portion or in said horizontal beam member groove portion.

7. A space structure according to claim 1, wherein said connection means comprises a first contact portion that is in contact with one end face that constitutes one end of the opening portion of said post member groove portion or said horizontal beam member groove portion, a second contact portion that is in contact with the other end face that constitutes the other end opposed to said one end of the opening portion, and urging means for urging said first contact portion against said one end face and simultaneously urging said second contact portion against said other end face.

8. A space structure according to claim 1, wherein said horizontal beam member has at least two horizontal beam member groove portions with said opening portions opening vertically upwardly and vertically downwardly, each of said two horizontal beam member groove portions has opposed walls opposed to each other that extend along the axial direction of said horizontal beam member and project beyond said horizontal beam member groove portions, and the height of the opposed walls of the horizontal beam member groove portion that opens vertically upwardly is higher than the height of the opposed walls of the horizontal beam member groove portion that opens vertically downwardly.

9. A space structure according to claim 1, wherein said at least one horizontal beam member has at least two horizontal beam member groove portions with said opening portions opening vertically upwardly and vertically downwardly, each of said two horizontal beam member groove portions has opposed walls opposed to each other that extend along the axial direction of said horizontal beam member and project beyond said horizontal beam member groove portions, and the height of the opposed walls of the horizontal beam member groove portion that opens vertically upwardly is higher than the height of the opposed walls of the horizontal beam member groove portion that opens vertically downwardly.

* * * * *